US008560282B2

(12) United States Patent
Macready et al.

(10) Patent No.: US 8,560,282 B2
(45) Date of Patent: Oct. 15, 2013

(54) QUANTUM PROCESSOR-BASED SYSTEMS, METHODS AND APPARATUS FOR SOLVING PROBLEMS AS LOGIC CIRCUITS

(75) Inventors: William G. Macready, Vancouver (CA); Geordie Rose, Vancouver (CA); Peter Love, Haverford, PA (US)

(73) Assignee: D-Wave Systems Inc., Burnaby (CA)

(*) Notice: Subject to any disclaimer, the term of this patent is extended or adjusted under 35 U.S.C. 154(b) by 599 days.

(21) Appl. No.: 12/849,588

(22) Filed: Aug. 3, 2010

(65) Prior Publication Data

US 2011/0047201 A1 Feb. 24, 2011

Related U.S. Application Data

(60) Continuation-in-part of application No. 12/848,764, filed on Aug. 2, 2010, which is a division of application No. 11/484,368, filed on Jul. 10, 2006, now Pat. No. 7,844,656, application No. 12/849,588, which is a continuation-in-part of application No. PCT/US2010/038867, filed on Jun. 16, 2010.

(60) Provisional application No. 60/698,362, filed on Jul. 11, 2005, provisional application No. 61/187,987, filed on Jun. 17, 2009, provisional application No. 61/238,043, filed on Aug. 28, 2009, provisional application No. 61/330,789, filed on May 3, 2010.

(51) Int. Cl.
*G06J 1/00* (2006.01)

(52) U.S. Cl.
USPC .......................................................... 703/3

(58) Field of Classification Search
USPC ............................................ 708/3, 801
See application file for complete search history.

(56) References Cited

U.S. PATENT DOCUMENTS

| 6,838,694 B2 | 1/2005 | Esteve et al. ............ 257/34 |
| 7,161,385 B2 | 1/2007 | Haikonen ............ 326/56 |
| 7,418,283 B2 | 8/2008 | Amin ............ 505/170 |

(Continued)

FOREIGN PATENT DOCUMENTS

| WO | 2009/143166 | 11/2009 |
| WO | 2010/148120 | 12/2010 |

OTHER PUBLICATIONS

Agrawal et al., "PRIMES is in P," manuscript available from the Indian Institute of Technology, http://www.cse.iitk.ac.in/news/primality.html, pp. 1-9, 2002.

(Continued)

*Primary Examiner* — Tan V. Mai
(74) *Attorney, Agent, or Firm* — Seed IP Law Group PLLC

(57) ABSTRACT

Systems, methods and apparatus for factoring numbers are provided. The factoring may be accomplished by creating a factor graph, mapping the factor graph onto an analog processor, initializing the analog processor to an initial state, evolving the analog processor to a final state, and receiving an output from the analog processor, the output comprising a set of factors of the number. The factoring may be accomplished by generating a logic circuit representation of the factoring problem, such as a multiplication circuit, encoding the logic circuit representation as a discrete optimization problem, and solving the discrete optimization problem using a quantum processor. Output(s) of the logic circuit representation may be clamped such that the solving involves effectively executing the logic circuit representation in reverse to determine input(s) that corresponds to the clamped output(s).

11 Claims, 34 Drawing Sheets

(56) References Cited

U.S. PATENT DOCUMENTS

| | | | |
|---|---|---|---|
| 7,844,656 B2 | 11/2010 | Macready et al. | 708/801 |
| 2005/0082519 A1 | 4/2005 | Amin et al. | 257/13 |
| 2005/0224784 A1 | 10/2005 | Amin et al. | 257/14 |
| 2005/0250651 A1 | 11/2005 | Amin et al. | 505/846 |
| 2005/0256007 A1 | 11/2005 | Amin et al. | 505/170 |
| 2006/0075365 A1* | 4/2006 | Hershenson et al. | 703/2 |
| 2006/0147154 A1 | 7/2006 | Thom et al. | 385/37 |
| 2007/0080341 A1 | 4/2007 | Macready et al. | 257/31 |
| 2009/0070402 A1* | 3/2009 | Rose et al. | 709/201 |
| 2011/0010412 A1 | 1/2011 | Macready et al. | 708/835 |

OTHER PUBLICATIONS

Amin, "Effect of Local Minima on Adiabatic Quantum Optimization," *Physical Review Letters*, 100:130503-1-130503-4, 2008.

Averin et al., "Variable Electrostatic Transformers," U.S. Appl. No. 11/100,931, filed Apr. 6, 2005, 41 pages.

Averin et al., "Variable Electrostatic Transformer: Controllable Coupling of Two Charge Qubits," *Physical Review Letters* 91(5):057003-1-057003-4, Aug. 1, 2003.

Burges, "Factoring as Optimization," *Microsoft Technical Report MSR-TR-2002-83*, pp. 1-18, 2002.

Cohen et al., "Primality Testing and Jacobi Sums," *Mathematics of Computation*, 42(165):297-330, 1984.

Cormen et al., *Introduction to Algorithms*, Second Edition, MIT Press, Cambridge, MA, 2001, pp. 887-896.

Eades et al., "Algorithms for Drawing Graphs: An Annotated Bibliography," *Technical Report CS-89-09*, Department of Computer Science, Brown University, Providence, RI, 1989, pp. 1-49.

Farhi, E. et al., "Quantum Adiabatic Evolution Algorithms versus Simulated Annealing," *arXiv:quant-ph/0201031* 1:1-16, Jan. 8, 2002.

Feynman, R., "Simulating Physics with Computers," *International Journal of Theoretical Physics* 21(6/7): 467-488, May 1982.

Gallop et al., "SQUIDs and their applicataions," *Journal of Physics E: Scientific Instruments*, 9:417-429, 1976.

Garey et al., "Computers and Intractability: A Guide to the Theory of NP-Completeness," W. H. Freeman and Company, San Francisco, CA, 1979, pp. 1-15.

Hilton et al., "Factoring on an Optimization Type Quantum Computer," U.S. Appl. No. 60/698,362, filed Jun. 6, 2005.

Jung et al., "A rapid single flux quantum 1 bit arithmetic logic unit constructed with a half-adder cell," *Superconductor Science and Technology*, 17:770-774, 2004.

Kleiner et al., "Superconducting Quantum Interference Devices: State of the Art and Applications," *Proceedings of the IEEE*, 92(10):1534-1548, 2004.

Lenstra, "Integer Factoring," *Designs, Codes and Cryptography*, 19:101-128, 2000.

Macready, "Factoring on an Optimization Type Quantum Computer," U.S. Appl. No. 60/698,362, filed Jul. 11, 2005, 86 pages.

Macready et al., "System and Methods for Solving Computational Problems," U.S. Appl. No. 61/187,987, filed Jun. 17, 2009, 39 pages.

Macready et al., "Systems and Methods for Solving Factoring Problems," U.S. Appl. No. 61/238,043, filed Aug. 28, 2009, 44 pages.

Macready et al., "Systems and Methods for Solving Computational Problems," U.S. Appl. No. 61/330,789, filed May 3, 2010, 56 pages.

Macready et al, "Systems, Methods and Apparatus for Factoring Numbers," Office Action mailed Jun. 29, 2010 for U.S. Appl. No. 11/484,368, 4 pages.

Macready et al, "Systems, Methods and Apparatus for Factoring Numbers," Amendment filed Jul. 16, 2010 for U.S. Appl. No. 11/484,368, 13 pages.

Makhlin, Y. et al., "Quantum-state engineering with Josephson-junction devices," *Reviews of Modern Physics* 73(2):357-400, Apr. 2001.

Mehlhorn et al., "LEDA, a Platform for Combinatorial and Geometric Computing," *Communications of the ACM*, 38:96-102, 1995.

Nielsen, M. et al., *Quantum Computation and Quantum Information*, Cambridge University Press, Cambridge, 2000, p. 343-345.

Shor, P., "Polynomial-Time Algorithms for Prime Factorization and Discrete Logarithms on a Quantum Computer," *SIAM J. Comput.* 26(5):1484-1509, Oct. 1997.

Shor, "Polynomial-Time Algorithms for Prime Factorization and Discrete Logarithms on a Quantum Computer," *SIAM J. Comput.*, 26(5):1484-1509, 1997.

Vandersypen et al., "Experimental realization of Shor's quantum factoring algorithm using nuclear magnetic resonance," *Nature*, 414:883-887, 2001.

\* cited by examiner

|   |   |   |   |   |   |   |     |
|---|---|---|---|---|---|---|-----|
| 1 |   | 1 | $y_3$ | $y_2$ | $y_1$ | 1 | ← 310 |
|   |   | × |       | 1     | $x$   | 1 | ← 314 |
| 1 | $y_3 x$ | 1 | $y_3$ | $y_2$ | $y_1$ | 1 | ← 318 |
| $x$ | $y_3 x$ | $y_2 x$ | $y_1 x$ |   |       |   | ← 322 |
| $y_3$ | $y_2$ | $y_1$ | 1 |   |       |   | ← 326 |
| 1 | 1 | 0 | 1 | 1 | 1 | 1 | ← 330 |

FIG. 3

| | | |
|---|---|---|
| (1) $y_1 + x$ | = | 1 |
| (2) $y_2 + y_1 x + 1$ | = | $1 + 2z_1$ |
| (3) $y_3 + y_2 x + y_1 + z_1$ | = | $0 + 2z_2 + 4z_3$ |
| (4) $1 + y_3 x + y_2 + z_2$ | = | $1 + 2z_4$ |
| (5) $x + y_3 + z_3 + z_4$ | = | $1 + 2z_5$ |
| (6) $1 + z_5$ | = | 1 |

↙ 413

| | | |
|---|---|---|
| (1) $y_1 + x$ | = | 1 |
| (2) $y_2 + 1$ | = | 1 |
| (3) $y_3 + y_2 x + y_1$ | = | $0 + 2z_2 + 4z_3$ |
| (4) $1 + y_3 x + y_2 + z_2$ | = | $1 + 2z_4$ |
| (5) $x + y_3 + z_3 + z_4$ | = | 1 |
| (6) 1 | = | 1 |

↙ 416

| | | |
|---|---|---|
| (1) $y_1 + x$ | = | 1 |
| (2) 1 | = | 1 |
| (3) $y_3 + y_1$ | = | $0 + 2z_2$ |
| (4) $1 + y_3 x + z_2$ | = | $1 + 2z_4$ |
| (5) $x + y_3 + z_4$ | = | 1 |
| (6) 1 | = | 1 |

↙ 419

| | | |
|---|---|---|
| (1) $(y_1 + x - 1)^2$ | = | 0 |
| (2) 0 | = | 0 |
| (3) $(y_3 + y_1 - 2z_2)^2$ | = | 0 |
| (4) $(w + z_2 - 2z_4)^2$ | = | 0 |
| (5) $(x + y_3 + z_4 - 1)^2$ | = | 0 |
| (6) 0 | = | 0 |

$$E = \mu_1(y_1 + x - 1)^2 + \mu_2(y_3 + y_1 - 2z_2)^2 + \mu_3(w + y_3 + z_2 - 2z_4)^2 + \mu_4(x + y_3 + z_4 - 1)^2 +$$
$$\lambda_1(w - y_3 + s_1)^2 + \lambda_2(w - x + s_2)^2 + \lambda_3(y_3 + x - w + s_3 - 1)^2$$

— 501

$$Q = \frac{1}{2} \begin{bmatrix} 0 & \mu_2 & 0 & \mu_2 & 0 & 0 & 0 & 0 & 0 \\ \mu_2 & 0 & \lambda_3 + \mu_4 & \mu_2 & -\lambda_1 - \lambda_3 & 0 & \lambda_3 & -\lambda_3 & 0 \\ \mu_4 & \lambda_3 + \mu_4 & 0 & 0 & 0 & \mu_4 & 0 & -\lambda_2 & \lambda_3 \\ 0 & \mu_2 & 0 & \mu_3 & -2\mu_3 & \mu_4 & 0 & \lambda_2 & -\lambda_3 \\ -2\mu_2 & -\lambda_1 - \lambda_3 & 0 & -2\mu_3 & \lambda_1 & \lambda_2 & 0 & 0 & 0 \\ 0 & 0 & \mu_4 & \mu_4 & \lambda_2 & -\lambda_3 & 0 & 0 & 0 \\ 0 & -\lambda_2 & 0 & -2\mu_3 & 0 & -2\mu_3 & 0 & 0 & 0 \\ 0 & \lambda_3 & -\lambda_2 & 0 & \lambda_2 & 0 & 0 & 0 & 0 \\ 0 & 0 & \lambda_3 & 0 & -\lambda_3 & 0 & 0 & 0 & 0 \end{bmatrix}$$

— 505

$$\mathbf{r} = \begin{bmatrix} \mu_4 - \mu_2 \\ \mu_2 - \mu_4 + \lambda_1 + \lambda_2 - \lambda_3 \\ -\mu_4 + \lambda_1 + \lambda_2 + 3\lambda_3 \\ \mu_2 + \lambda_1 + \lambda_2 - \lambda_3 \\ 4\mu_2 + \mu_3 \\ 4\mu_3 - \mu_4 \\ \lambda_1 \\ \lambda_2 \\ -\lambda_3 \end{bmatrix}$$

— 507

$$\mathbf{x} = \begin{bmatrix} y_1 \\ y_3 \\ x \\ w \\ z_2 \\ z_4 \\ s_1 \\ s_2 \\ s_3 \end{bmatrix}$$

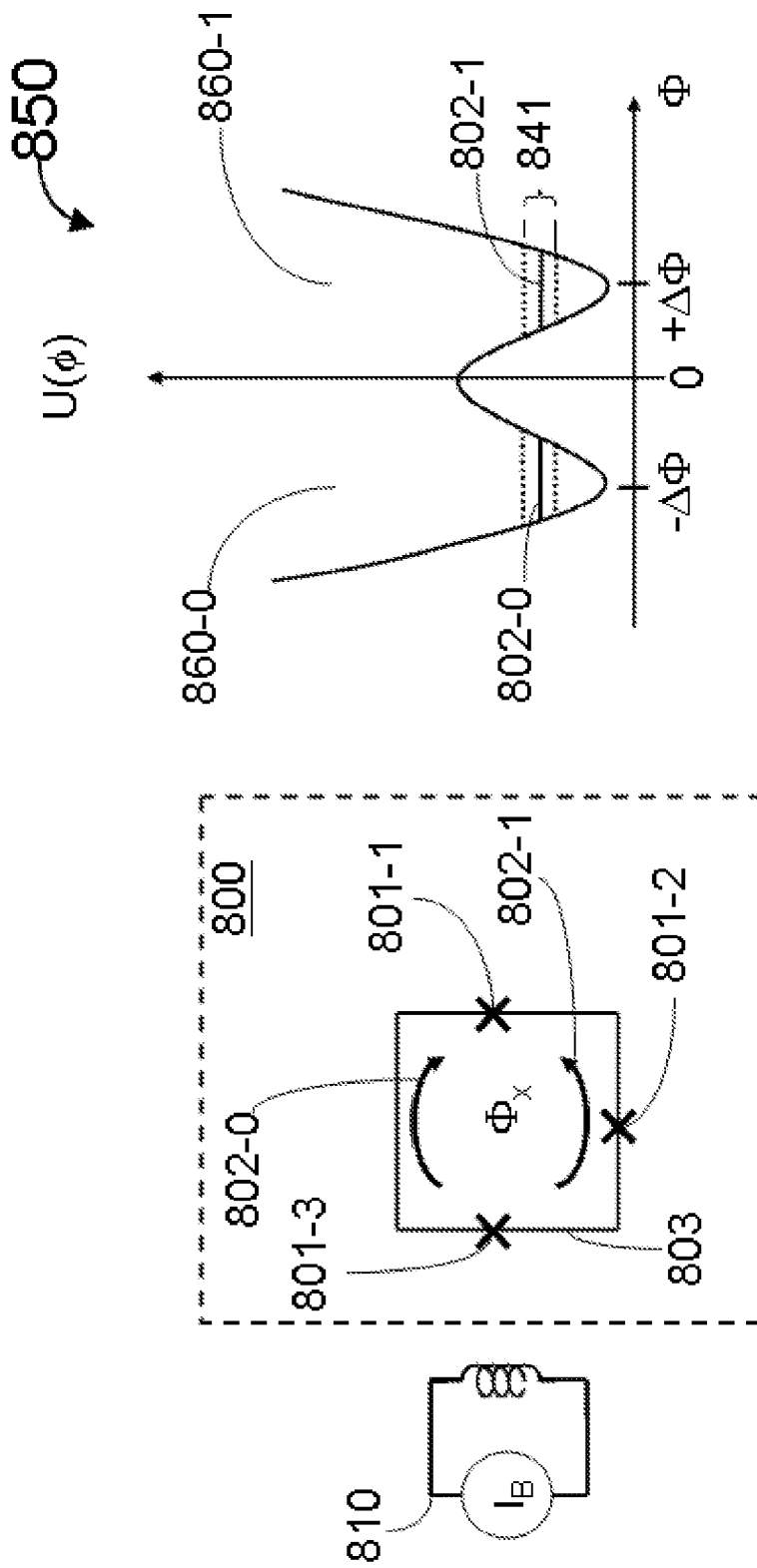

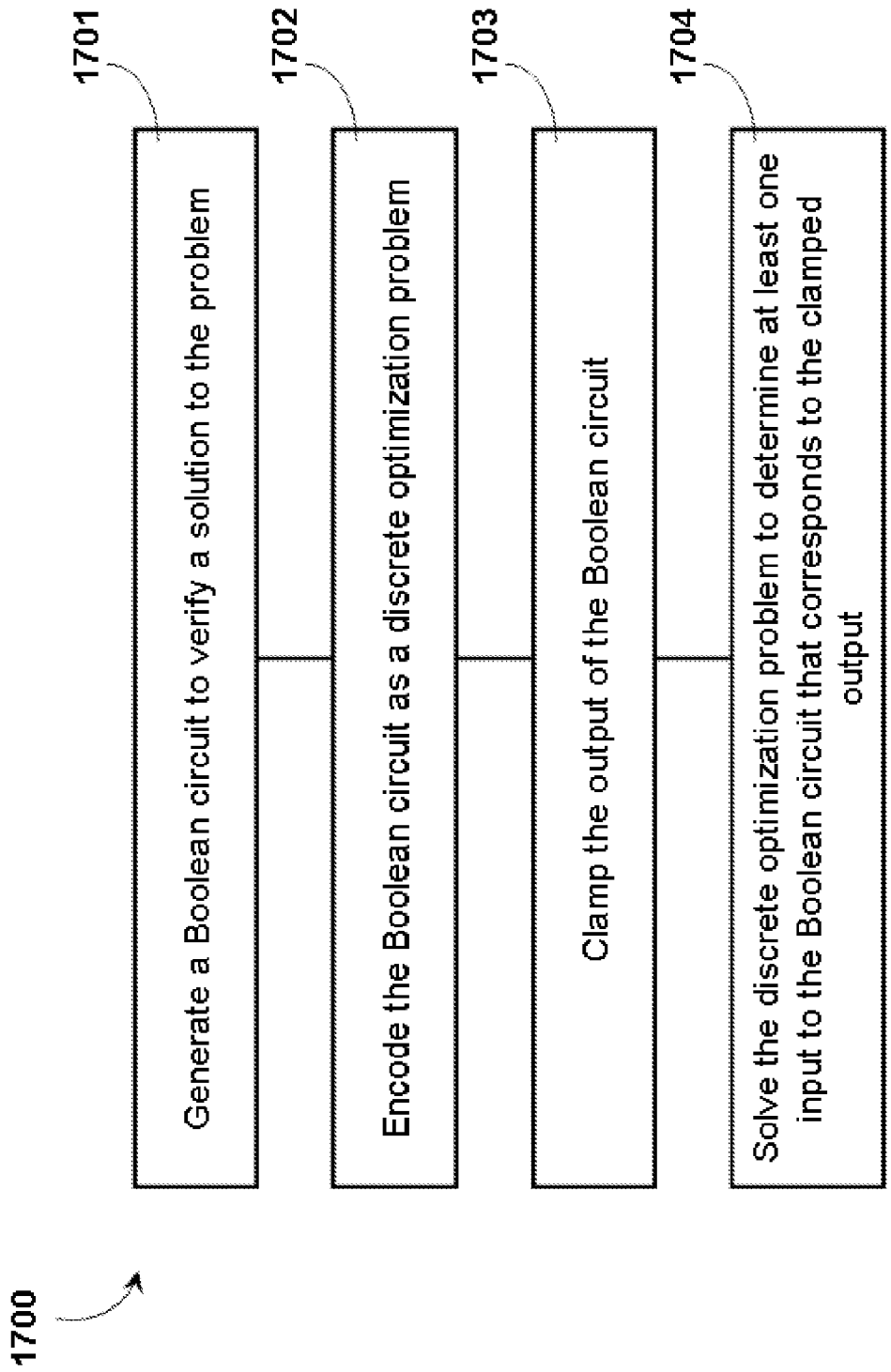

|       |       | $a_0b_0$ |          |          |          |          |          | $p_0$ |
|-------|-------|----------|----------|----------|----------|----------|----------|-------|
| $a_1$ | $b_1$ | $a_1b_0$ | $a_0b_1$ |          |          |          |          | $p_1$ |
| $a_2$ | $b_2$ | $a_2b_0$ | $a_1b_1$ | $a_0b_2$ |          |          |          | $p_2$ |
| $a_3$ | $b_3$ | $a_3b_0$ | $a_2b_1$ | $a_1b_2$ | $a_0b_3$ |          |          | $p_3$ |
|       |       |          | $a_3b_1$ | $a_2b_2$ | $a_1b_3$ |          |          | $p_4$ |
|       |       |          |          | $a_3b_2$ | $a_2b_3$ |          |          | $p_5$ |
|       |       |          |          |          | $a_3b_3$ |          |          | $p_6$ |
|       |       |          |          |          |          |          |          | $p_7$ |

(b) Full-adder detail (a) Half-adder detail

QUANTUM PROCESSOR-BASED SYSTEMS, METHODS AND APPARATUS FOR SOLVING PROBLEMS AS LOGIC CIRCUITS

CROSS REFERENCE TO RELATED APPLICATIONS

This application is a continuation-in-part of U.S. patent application Ser. No. 12/848,764, filed Aug. 2, 2010 which is itself a divisional of U.S. patent application Ser. No. 11/484,368, filed Jul. 10, 2006, which claims benefit under 35 U.S.C. 119(e) of U.S. Provisional Patent Application No. 60/698,362, filed Jul. 11, 2005. This application is also a continuation-in-part of PCT Patent Application Serial No. PCT/US2010/038867 filed Jun. 16, 2010, which claims benefit under 35 U.S.C. 119(e) of U.S. Provisional Patent Application Ser. No. 61/187,987, filed Jun. 17, 2009; U.S. Provisional Patent Application Ser. No. 61/238,043, filed Aug. 28, 2009; and U.S. Provisional Patent Application Ser. No. 61/330,789, filed May 3, 2010. All of the above-listed patent applications are incorporated herein by reference in their entirety.

FIELD

The present methods, system and apparatus relate to the factoring of numbers using a quantum processor.

BACKGROUND

Factoring large integer numbers is a difficult mathematical problem. The problem of integer factorization can be formulated as: given a positive integer, find all the prime factors of the integer. Every positive integer has a unique prime factorization. For small numbers, such as 16, factoring is quite simple. However, as the number increases, in general, finding the factors becomes increasingly difficult. In fact, the problem becomes intractable on known computing devices for large numbers. Conversely, however, confirming that a set of primes is the prime factorization of a number is easy.

One particular set of integers that is interesting to factor are biprimes. Biprimes are integers that are the direct product of two, not necessarily distinct, prime factors. For example, 15 is a biprime since 3 and 5 are the only prime factors and it can be derived by multiplying them together. The factoring of biprimes is of interest in the fields of cryptography and cryptanalysis, among other fields. Some cryptography schemes use the difficulty of factoring large biprimes as the basis for their encryption system. For example, a large biprime is used to encrypt data such that decryption of the data is only possible through the identification of the prime factors of the biprime. Such an encryption scheme is not absolutely secure because it is possible to identify prime factors, albeit through considerable effort. Thus, security of data encrypted in such a manner is only ensured for the period of time that it would take a third party to identify the prime factors for the biprime used to encrypt the data. Thus, such encryption schemes are useful when the amount of time it would take an unauthorized third party to find the prime factors of the encryption is much longer than the amount of time the information would be useful.

Complexity Classes

Complexity theory is the quantitative study of the time it takes for a computer to solve a decision problem and the resources required to solve the decision problem. In logic, a decision problem is determining whether or not there exists a decision procedure or algorithm for a class S of questions requiring a Boolean value (i.e., a true or false, or yes or no). These are also known as yes-or-no questions. Such problems are assigned to complexity classes, the number and type of which is ever changing, as new complexity classes are defined and existing ones merge through the contributions of computer scientists. One exemplary complexity class involves those decision problems that are solvable in polynomial time by a Turing machine (P, herein poly). Another exemplary complexity class involves those decision problems that are solvable in non-deterministic polynomial-time, or problems whose solution is verifiable in polynomial time (NP). Still another complexity class is NP-hard (non-deterministic polynomial-time hard; NPH), which includes decision problems that have been shown to be hard to solve. More specifically, NP-hard refers to the class of decision problems that contains all problems H such that for every decision problem L in NP there exists a polynomial-time many-one reduction to H, written L≤H. Informally, this class can be described as containing the decision problems that are at least as hard as any problem in NP. A decision problem is NP-Complete (NPC) if it is in NP and it is NP-hard.

A problem is equivalent, or harder to solve, than a known problem in NPC if there exists a polynomial time reduction to the instant problem from the known problem in NPC. Reduction can be regarded as a generalization of mapping. The mappings can be a one-to-one function, a many-to-one function, making use of an oracle, etc. The concept of complexity classes and how they define the intractability of certain decision problems is found in, for example, M. R. Garey, D. S. Johnson, 1979, *Computers and Intractability: A Guide to the Theory of NP-Completeness*, Freeman, San Francisco, ISBN: 0716710455, pp. 1-15.

It is not exactly known which complexity classes the integer factorization problem falls under. It is widely believed to be outside P, since there have been many attempts to find a polynomial-time solution but none have worked. It is also suspected to be outside NPC. The integer factorization problem, expressed as a decision problem, where it suffices to answer whether an integer N has a factor less than M, is a known NP problem. Also, the determination of whether an integer is prime, expressed as a decision problem, is a known P problem. In the field of quantum computing, Shor's algorithm for factoring numbers (discussed below) proved that factoring biprimes is in the bounded-error, quantum, polynomial (BQP) complexity class. This means it can be solved by a quantum computer in polynomial time with an error probability of at most 0.25 for all instances.

Quantum Computers

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

An analog processor is a processor that employs the fundamental properties of a physical system to find the solution to a computation problem. In contrast to a digital processor, which requires an algorithm for finding the solution followed by the execution of each step in the algorithm according to Boolean methods, analog processors do not involve Boolean methods.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers" International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms" arXiv.org:quant-ph/0005003 (2001), pp. 1-27. The art is still hampered by an inability to increase the coherence of qubits to acceptable levels for designing and operating practical circuit model quantum computers.

Another approach to quantum computation, called thermally-assisted adiabatic quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, and quantum annealing, and are described, for example, in Farhi, E. et al., "*Quantum Adiabatic Evolution Algorithms versus Simulated Annealing*" arXiv:quant-ph/0201031 (2002), pp 1-16.

To test for primality (that is, whether a factor is prime), a classical algorithm may be used. For example, there are several known approximate primality algorithms, all of which run in polynomial time, which can determine without 100% certainty if a number is prime. There is also an exact classical algorithm that can determine primality with 100% certainty, and it is believed to run in polynomial time. The density of primes of length n is approximately nlog(n). Randomized polynomial time algorithms for determining if a number is prime include the Miller-Rabin primality test. Approximate primality tests include inverted Fermat's little theorem tests: if $2^{n-1}=1$ mod n then, with high probability, n is prime. Deterministic algorithms for determining primality include the Cohen-Lenstra test and the Agrawal-Kayal-Saxena test. The Agrawal-Kayal-Saxena test is exact and runs in O((log (n))$^{12}$). See, for example, Cormen et al., 2001, *Introduction to Algorithms*, 2$^{nd}$ *Edition*, MIT Press, Cambridge, pp. 887-896; Cohen and Lenstra, 1984, "Primality testing and jacobi sums," *Mathematics of Computation* 42(165), pp. 297-330; Agrawal et al., 2002, "PRIMES is in P," manuscript available from the Indian Institute of Technology, http://www.cse.iitk.ac.in/inews/primality.html.

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components. The quantum nature of a qubit is largely derived from its ability to exist in a coherent superposition of basis states. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regains its similarity to a conventional bit. The actual state of the qubit after it has collapsed depends on the probabilities $|a|^2$ and $|b|^2$ immediately prior to the readout operation.

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference is superconducting phase between two regions of the phase device. Recently, hybrid devices using two or more of charge, flux and phase degrees of freedom have been developed. See e.g., U.S. Pat. No. 6,838,694 and U.S. Pat. No. 7,335,909, where are hereby incorporated by reference in their entireties.

Classical Factoring Algorithms

There are many known classical algorithms that exist for computing the prime factorization of integers. These classical algorithms fall into two main categories: special-purpose algorithms and general purpose algorithms. The efficiency of special purpose algorithms is number dependent. That is, depending on the properties of the number, the time it takes for the special-purpose algorithm to find the factors greatly varies. If the algorithm gets "lucky" and gets a number that works well with it, the solution can be found fairly quickly. For some numbers, special purpose algorithms can fail to find a solution.

In contrast to special purpose algorithms, general purpose algorithms are almost guaranteed to work for any number. The run-time of general purpose algorithms depends solely on the size of the number being factored. For more information, see Lenstra, 2000, *Designs, Codes, and Cryptography* 19, 101-128.

Some examples of special purpose algorithms include Pollard's rho algorithm, William's p+1 algorithm, and Fermat's factorization method. Examples of general purpose algorithms include Dixon's algorithm, quadratic sieve, and general number field sieve. See Lenstra for more information about how factorization algorithms work. For very large numbers, general purpose algorithms are preferred. Currently, the largest RSA challenge biprime to be factored is a 200 digit number. The general number field sieve method was used to solve this number.

Known classical algorithms for prime factorization require substantial amounts of computational power. For example such problems typically require powerful computing architectures such as supercomputers, massively parallel computing systems, and distributed computing systems that operate over a network such as the Internet. Even with such powerful computing architectures, the run time of the algorithms is very long. For example, the 200 digit number took approximately 1.5 years to factor with a cluster of 80 computers operating at a clock speed of 2.2 GHz. For larger biprimes such as those used in encryption, which can be 300 digits or more, the calculation would require prohibitively large computational power and very long run times.

Quantum Factoring Algorithms

In 1994, Peter Shor developed an algorithm for factoring integers that is intended to be run on a quantum computer. Using the special properties of quantum computers, the algorithm is able to probabilistically factor in $O((\log N)^3)$ time using $O(\log N)$ space, where space refers to the amount of computational memory needed and where N is the number to be factored. This polynomial run time was a significant improvement over the best classical algorithms, which ran in sub-exponential time. See Shor, 1997, *SIAM J. Comput.* 26, pp. 1484-1509. Recently, a group from IGM experimentally realized Shor's Algorithm by factoring the number fifteen using a rudimentary 7-qubit nuclear magnetic resonance (NMR) quantum computer. The group used circuit model quantum computing to implement their algorithm. See Vandersypen et al., 2001, *Nature* 414, 883. However, the Vandersypen et al. method utilized a priori knowledge of the answers. In addition, NMR computers, such as those used by Vandersypen et al. are not scalable, meaning that larger, more interesting numbers cannot be factored using the methods taught by Vandersypen et al.

A classical model of factoring, expressed as an optimization problem, is disclosed in Burges, 2002, Microsoft Technical Report MSR-TR-2002-83. That is, the method of Burges is different from other proposed algorithms because it attempts to map the prime factorization problem to an optimization problem rather than a decision problem. Optimization problems are a class of problems where the aim is the maximize or minimize one or more variables of the problem. In the case of Burges, the biprime and its factors are represented in bit form, with the factor bits being variables. Then, by using long multiplication of the factors to get the biprime, one can derive a set of factor equations. The factor equations are then reduced as much as possible and then cast into an optimization of coefficients in a single equation. The solution of the optimization problem should give the proper bit values of the factors, thus effectively factoring the biprime.

However, the drawback of the Burges algorithm is that it is limited to use on a classical computer. Optimization problems, though a different type of problem than prime factorization, can also take up a tremendous amount of computing power. Thus, the obstacle of sufficient resources still has not been solved.

Accordingly, there remains a need in the art for improved methods for prime factorization of large numbers.

Discrete Optimization

In mathematics and computer science, an optimization problem is one in which an optimal value of at least one parameter is sought. Typically, the parameter in question is defined by an objective function which comprises at least one variable. The optimal value of the parameter is then achieved by determining the value(s) of the at least one variable that maximize or minimize the objective function.

Discrete optimization is simply a special-case of optimization for which the variables used in the objective function are restricted to assume only discrete values. For example, the variables in the objective function may be restricted to all or a subset of the integers.

Constraint Satisfaction

The maximization or minimization of the objective function in an optimization problem (discrete or otherwise) is typically subject to a set of constraints, where a valid result may be required to satisfy all, or at least a subset, of the constraints. In some applications, simply finding a solution that satisfies all, or a subset, of the constraints may be all that is desired (i.e., there may be no additional objective function requiring maximization or minimization). Such problems are known as "constraint satisfaction problems" and may be viewed as a class of optimization problems in which the objective function is a measure of how well the constraints are (or are not) satisfied. Thus, throughout the remainder of this specification, the term "optimization problem" is used to encompass all forms of optimization problems, including constraint satisfaction problems.

Quadratic Unconstrained Binary Optimization Problems

A quadratic unconstrained binary optimization ("QUBO") problem is a form of discrete optimization problem that involves finding a set of N binary variables $\{x_i\}$ that minimizes an objective function of the form:

$$E(x_1, \ldots, x_N) = \sum_{i \leq j}^{N} Q_{ij} x_i x_j$$

where Q is typically a real-valued upper triangular matrix that is characteristic of the particular problem instance being studied. QUBO problems are known in the art and applications arise in many different fields, for example machine learning, pattern matching, economics and finance, and statistical mechanics, to name a few.

Logic Circuits

For any problem that can be solved, a solution may be reached by following a prescribed set of steps. In many cases, the prescribed set of steps may be designed to include a set of logical steps called "logical operations." Logical operations are the fundamental steps that are typically implemented in digital electronics and most classical computer algorithms.

For many computational problems, a sequence of steps that leads to a solution can be described by a logic circuit representation. A logic circuit representation includes at least one logical input that is transformed to at least one logical output through at least one logical operation. A logic circuit representation may include any number of logical operations arranged either in series or in parallel (or a combination of series and parallel operations), where each logical operation has a corresponding set of at least one intermediate logical input and at least one intermediate logical output. Throughout this specification and the appended claims, the terms "intermediate logical input" and "intermediate logical output" are often used. Unless the specific context requires otherwise, the term "intermediate" here is intended to denote an input to/output from an individual logic gate which is an intermediate input/output with respect to the overall logic circuit. However, those of skill in the art will appreciate that a logical input to a logic circuit may correspond to an intermediate logical input to a particular logic gate, and similarly a logical output from a logic circuit may correspond to an intermediate logical output from a particular logic gate. For a first logical operation arranged in series with a second logical operation, at least one intermediate logical output from the first logical operation may correspond to at least one intermediate logical input to the second logical operation.

Each logical operation in a logic circuit is represented by a logic gate, for example, the NAND gate or the XOR gate, or a combination of logic gates. A logical operation may include any number of logic gates arranged either in series or in parallel (or a combination of series and parallel gates), where each logic gate has a corresponding set of at least one intermediate logical input and at least one intermediate logical output. For a first logic gate arranged in series with a second logic gate, at least one intermediate logical output from the first logic gate may correspond to at least one intermediate logical input to the second logic gate. The complete logic circuit representation of a computational problem may include any number of intermediate logical operations which themselves may include any number of intermediate logic gates. Furthermore, the at least one logical input to the logic circuit representation may traverse any number of intermediate logical inputs and intermediate logical outputs in being transformed to the at least one logical output from the logic circuit representation. Unless the specific context requires otherwise, throughout the remainder of this specification and the appended claims the terms "logical input" and "logical output" are used to generally describe any inputs and outputs in a logic circuit representation, including intermediate inputs and outputs.

In some implementations, one or more logical inputs may produce a plurality of logical outputs. For example, if the circuit, an operation, or a gate produces an N-bit number as the result, then N logical outputs may be required to represent this number. Alternatively, one or more logical inputs may produce a single logical output. For example, if the circuit, an operation, or a gate produces TRUE or FALSE as the result, then only one logical output may be required to convey this information. A circuit that produces TRUE or FALSE as the result embodies "Boolean logic" and is sometimes referred to as a "Boolean circuit." Boolean circuits are commonly used to represent NP-complete constraint satisfaction problems.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in U.S. Pat. No. 7,533,068, US Patent Publication 2008-0176750, US Patent Publication 2009-0121215, and PCT Patent Publication 2009-120638.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems, methods, and apparatus, an "adiabatic" evolution is considered to be an evolution that satisfies the adiabatic condition:

$$\dot{s} |\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly. It is known that the solution to a hard problem, such as a combinatorial optimization problem, may be encoded in the ground state of a system Hamiltonian and therefore quantum annealing may be used to find the solution to such hard problems. Adiabatic quantum computation is a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing is an algorithm that uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D.$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in a local minimum close to the exact solution; the slower the evolution, the better the solution that will be achieved. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

BRIEF DESCRIPTION OF THE DRAWINGS

FIG. 3 is a schematic diagram illustrating an embodiment of long bit-wise multiplication of two numbers.

FIG. 4 is a schematic diagram illustrating an embodiment of row reduction of a set of factor equations.

FIG. 5 is a schematic diagram illustrating an embodiment of an energy function and corresponding matrices.

FIGS. 8A and 8B are schematic diagrams showing an existing quantum device and associated energy landscape, respectively.

FIG. 17 is a flow-diagram of an embodiment of yet another method for solving a computational problem in accordance with the present systems and methods.

FIG. 26 is a multiplication table showing the 8-bit product of two 4-bit integers.

Figure 1:
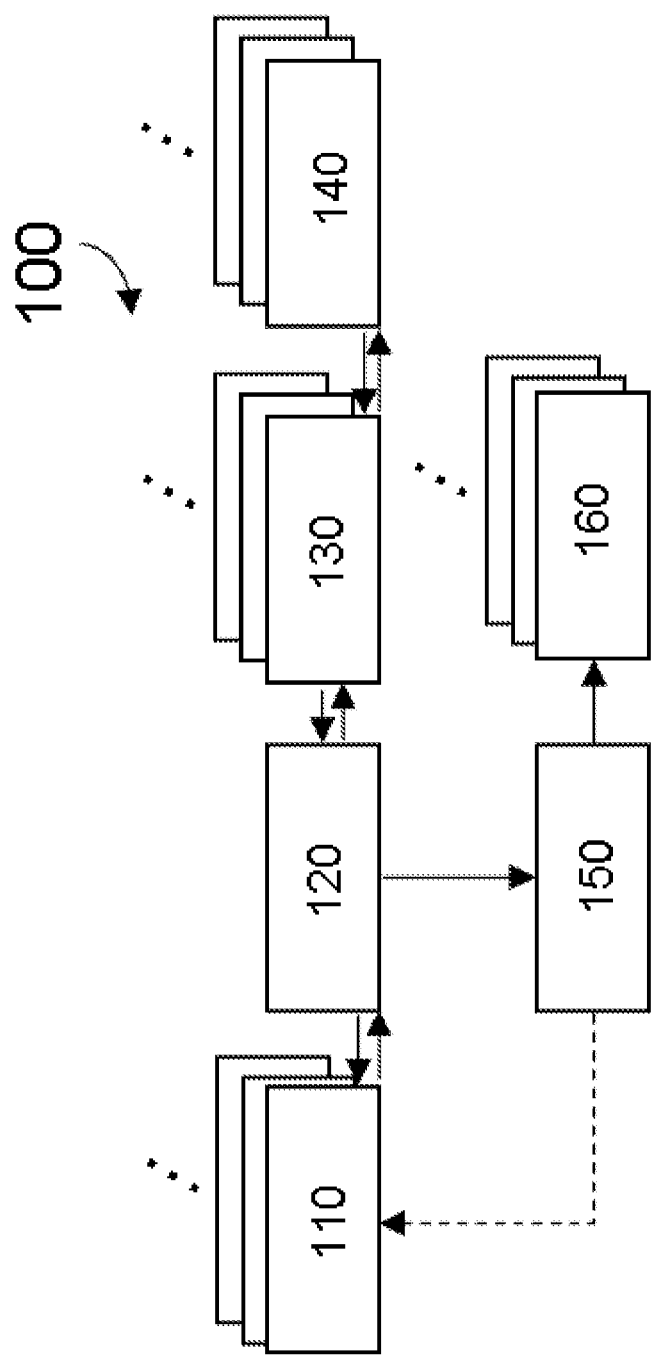
FIG. 1 is a schematic diagram showing an operational flow of a factoring device in accordance with an aspect of the present systems, methods and apparatus.

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve legibility. Further, the particular shapes of the elements as drawn are not intended to convey any information regarding the actual shape of the particular elements and have been solely selected for ease of recognition in the figures. Furthermore, while the figures may show specific layouts, one skilled in the art will appreciate that variations in design, layout, and fabrication are possible and the shown layouts are not to be construed as limiting the layout of the present systems, methods and apparatus.

SUMMARY

A method of factoring a number may be summarized as including creating a factor graph; mapping the factor graph onto an analog processor; initializing the analog processor to an initial state; evolving the analog processor from the initial state to a final state; and receiving an output from the analog processor, the output comprising a set of factors of the number.

A method of factoring a number may be summarized as including constructing a set of possible factor bit length combinations for the number; deriving a set of factor equations for each factor bit length combination; converting a selected set of factor equations into a factor graph; embedding the factor graph onto an analog processor; evolving the analog processor from an initial state to a final state; measuring the final state of the analog processor; and constructing a set of factors of the number based on the final state of the analog processor.

A computer program product for use with a computer system for factoring a number may be summarized as including a computer readable storage medium and a computer program mechanism embedded therein, the computer program mechanism includes instructions for creating a factor graph; instructions for mapping the factor graph onto an analog processor; instructions for initializing the analog processor to an initial state; instructions for evolving the analog processor from the initial state to a final state; and instructions for receiving an output from the analog processor, the output comprising a set of factors of the number.

A computer system for factoring a number may be summarized as including a central processing unit; and a memory, coupled to the central processing unit, the memory storing at least one program module, the at least one program module encoding: instructions for creating a factor graph; instructions for mapping the factor graph onto an analog processor; instructions for initializing the analog processor to an initial state; instructions for evolving the analog processor from the initial state to a final state; and instructions for receiving an output from the analog processor, the output comprising a set of factors of the number.

A computer program product for use with a computer system for factoring a number may be summarized as including a computer readable storage medium and a computer program mechanism embedded therein, the computer program mechanism includes instructions for constructing a plurality of possible factor bit length combinations for the number; instructions for deriving a set of factor equations for each factor bit length combination; instructions for converting a selected set of factor equations into a factor graph; instructions for embedding the factor graph as input to an analog processor; instructions for evolving the analog processor from an initial state to a final state; instructions for receiving the final state of the analog processor; and instructions for constructing a set of factors of the number based on the final state of the analog processor.

A data signal embodied on a carrier wave, may be summarized as including a set of factors of a number, the set of factors obtained according to a method includes creating a factor graph; mapping the factor graph onto an analog processor; initializing the analog processor to an initial state; evolving the analog processor from the initial state to a final state; and receiving an output from the analog processor, the output comprising the set of factors.

A system for factoring a number may be summarized as including an analog processor; a graph module for creating a factor graph; a mapper module for mapping the factor graph onto the analog processor; an initialization module for initializing the analog processor to an initial state; an evolution module for evolving the analog processor from the initial state to a final state; and a receiver module for receiving an output from the analog processor, the output comprising a set of factors of the number.

A graphical user interface for depicting a set of factors of a number may be summarized as including a first display field for displaying the set of factors, the set of factors obtained by a method includes creating a factor graph; mapping the factor graph onto an analog processor; initializing the analog processor to an initial state; evolving the analog processor from the initial state to a final state; and receiving an output from the analog processor, the output comprising the set of factors.

A method of factoring a product may be summarized as including setting an initial condition of a multiplication circuit, wherein: the multiplication circuit includes a plurality of quantum devices arranged in a two-dimensional grid; and a plurality of coupling devices between pairs of quantum devices; and the initial condition includes: a local bias value for at least one quantum device; a coupling value for at least one coupling device; and a binary value of the product to be factored; performing a backwards evolution of the multiplication circuit; and reading out a final state of at least one of the quantum device, thereby determining a factor of the product.

A computer system for factoring a product may be summarized as including a central processing unit; a multiplication circuit in communication with the multiplication circuit, the multiplication circuit comprising a plurality of bitwise multipliers, each bitwise multiplier including: a plurality of quantum devices; a plurality of coupling devices, each of the coupling devices coupling a pair of the quantum devices; a plurality of inputs; a plurality of outputs; and a memory coupled to the central processing unit, the memory storing at least one program module encoding: instructions for setting an initial condition of the multiplication circuit, the initial condition including: a local bias value for at least one of the quantum devices; a coupling values for at least one coupling devices; and a binary value of the product to be factored; instructions for performing a backwards evolution of the multiplication circuit; and instructions for reading out a final state of at least one of the quantum devices, thereby determining a factor of the product.

A method may be summarized as including converting a factoring problem into an optimization problem; mapping the optimization problem onto an analog processor; initializing the analog processor to an initial state; evolving the analog processor from the initial state to a final state, the final state representing a solution to the optimization problem; and determining a solution to the factoring problem from the solution to the optimization problem.

A method of solving a problem may be summarized as including generating a logic circuit representation of the problem using a computer processor; encoding the logic circuit representation as a discrete optimization problem using the computer processor; and solving the discrete optimization problem using a quantum processor. The computer processor may include a classical digital computer processor, generating a logic circuit representation may include generating a logic circuit representation using the classical digital computer processor, and encoding the logic circuit representation may include encoding the logic circuit representation using the classical digital computer processor. The method may also include mapping the discrete optimization problem from the computer processor to the quantum processor. Solving the discrete optimization problem may include operating the quantum processor to perform at least one of an adiabatic quantum computation and an implementation of quantum annealing. Solving the discrete optimization problem may include configuring the quantum processor to clamp at least one output of the logic circuit representation. Solving the discrete optimization problem may then include operating the quantum processor to determine at least one input to the logic circuit representation that corresponds to the at least one clamped output. Generating a logic circuit representation may include generating a Boolean logic circuit representation using the computer processor. Solving the discrete optimization problem may include solving a quadratic unconstrained binary optimization problem using the quantum processor. In some embodiments, the problem may be a factoring problem. The logic circuit representation of the factoring problem may include a constraint satisfaction problem.

A processor system for solving a computational problem may be summarized as including a first processing subsystem that generates a logic circuit representation of the computational problem, wherein the logic circuit representation includes at least one logical input, at least one logical output, and at least one logical operation that includes at least one logic gate, and for encoding the logic circuit representation as a discrete optimization problem; and a second processing subsystem that solves the discrete optimization problem, the second processing subsystem including a plurality of computational elements; a programming subsystem that maps the discrete optimization problem to the plurality of computational elements by programming the computational elements of the second processing subsystem; and an evolution subsystem that evolves the computational elements of the second processing subsystem. The first processing subsystem may include a classical digital computer processor and at least one of the computational problem, the logic circuit representation of the computational problem, and the discrete optimization problem may be stored in a computer-readable storage medium in the classical digital computer processor. The second processing subsystem may include a quantum processor and the plurality of computational elements may include at least two qubits and at least one coupler. The quantum processor may include a superconducting quantum processor, the at least two qubits may include superconducting qubits, and the at least one coupler may include a superconducting coupler.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

FIG. 1 illustrates the relationship between entities according to one embodiment of the present systems, methods and apparatus. A system 100 includes an input queue 110 holding an ordered list of numbers to be factored. A preprocessor 120 obtains a target number from input queue 110, and processes it. Depending on the value of the target number, the preprocessor 120 may discard the number or create a set of factor equations and corresponding factor graphs. Such factor graphs are held in a queue 130 and they are supplied as input to a computing device 140 (for example, an analog processor including a number of quantum devices). The result returned by the computing device is sent to preprocessor 120 which, in turn, passes such results to a checker 150. The checker 150 verifies that the factors obtained are factors of the target number and that they are prime. If a factor is not prime, the checker 150 adds the factor to the input queue 110. If a factor is prime, it is placed in results in the queue 160.

To test for primality (that is, whether a factor is prime), a classical algorithm may be used. For example, there are several known approximate primality algorithms, all of which run in polynomial time, which can determine without 100% certainty if a number is prime. There is also an exact classical algorithm that can determine primality with 100% certainty, and it is believed to run in polynomial time. The density of primes of length n is approximately n log(n). Randomized polynomial time algorithms for determining if a number is prime include the Miller-Rabin primality test. Approximate primality tests include inverted Fermat's little theorem tests: if $2^{n-1}=1$ mod n then, with high probability, n is prime. Deterministic algorithms for determining primality include the Cohen-Lenstra test and the Agrawal-Kayal-Saxena test. The Agrawal-Kayal-Saxena test is exact and runs in $O((\log(n))^{12})$. See, for example, Cormen et al., 1990, *Introduction to Algorithms*, MIT Press, Cambridge, pp. 801-852; Cohen and Lenstra, 1984, "Primality testing and jacobi sums," *Mathematics of Computation* 42(165), pp. 297-330; Agrawal et al., 2002, "PRIMES is in P," manuscript available from the Indian Institute of Technology, http://www.cse.iitk.ac.in/news/primality.html.

Figure 2:
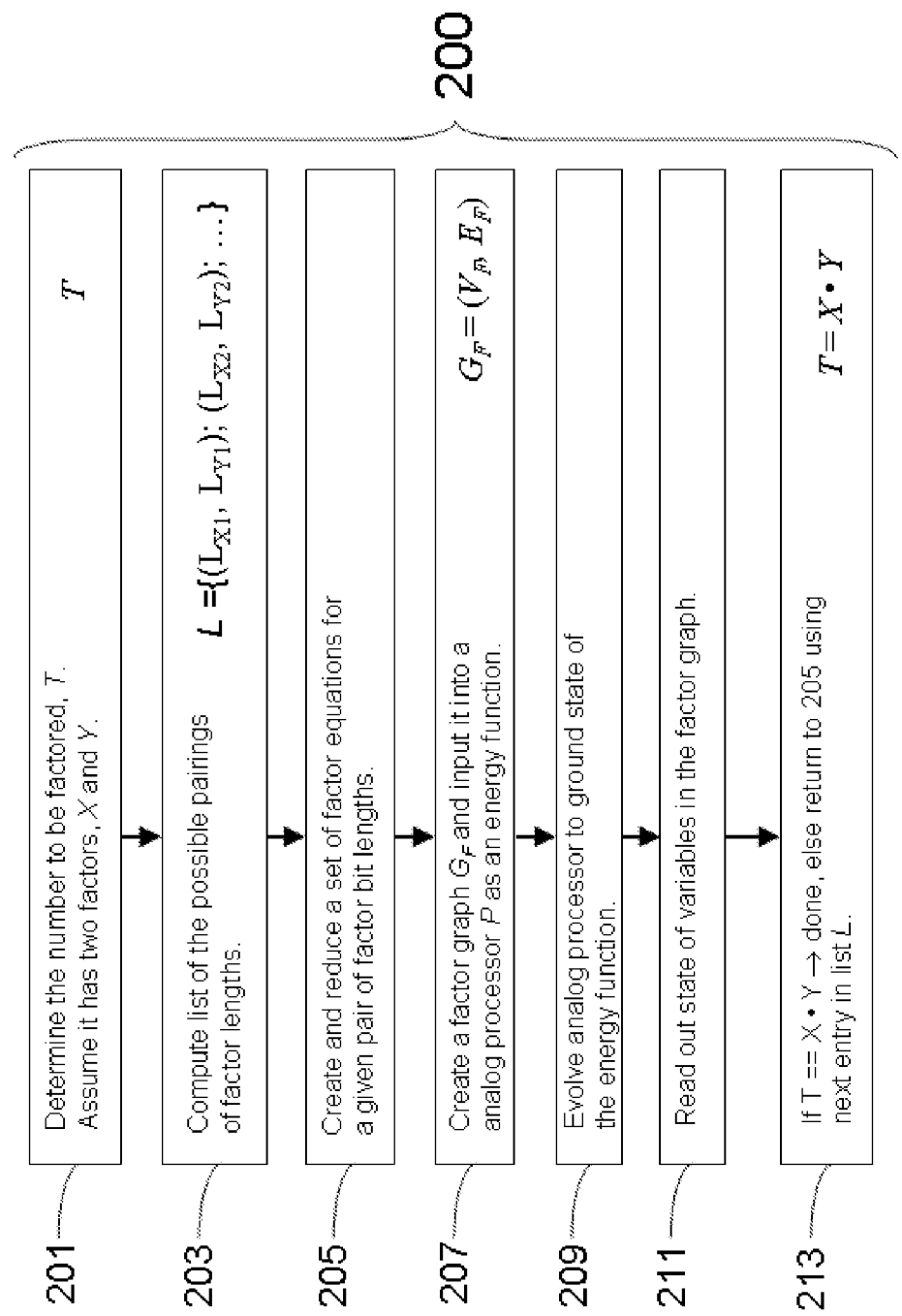
FIG. 2 is a flow diagram showing a series of acts for defining and computing the solution to a set of equations in accordance with an aspect of the present systems, methods and apparatus.

FIG. 2 illustrates a process 200 for determining the prime factors of an integer in accordance with an aspect of the present systems, methods and apparatus.

At 201, a number to be factored, T, is chosen, by e.g. drawing a number from input queue 110 (FIG. 1). As illustrated in FIG. 2, it is assumed that T is a biprime (that is, having only two prime factors; X and Y). Typically, at this point, the identity of the two prime factors, X and Y, is not known. While in FIG. 2 it is assumed that T is a biprime, those of skill in the art will appreciate that T may alternatively be a general composite number (i.e. has more than two prime factors), and process 200 may be used to factor T by, for example, not assuming the numbers are even, or by recasting the problem by removing a factor of $2^n$, where n>0. The process may be recursively applied to the factors obtained. Pre-processing to remove small prime factors may also be employed. Primality testing may be used to determine if recursion is needed. Alternatively, a set of factor equations may be created assuming that there are three or more factors, and bitwise multiplication employed, which is detailed elsewhere.

To further illustrate an embodiment of the present systems, methods and apparatus, the number 119 will be factored using the process described in reference to FIG. 2. 119 is large enough to not be immediately factorable by inspection, but is small enough to readily show the details of the present systems, methods and apparatus. First, the number to be factored is represented in binary form as 1110111, which is $L_T$=7 bits long. The factors, typically unknown at the outset of the computation, are labeled X and Y. It is assumed that the number to be factored is not prime. However, there are classical methods of checking whether or not a number is prime, that can be used to test the number before the factoring process begins.

At 203, the list of possible factor bit lengths L (the number of bits required to represent a number) for T is constructed. This means that, for a given T having bit length $L_T$, where it is assumed that the leading bit of T is 1, a set of bit length combinations ($L_X$, $L_Y$) is created, where each $L_X$ is the bit length of a corresponding X, each $L_Y$ is the bit length of a corresponding Y, and, for each bit length combination ($L_X$, $L_Y$), the following conditions apply: $1<L_X<L_T$; and $1<L_Y<L_T$. The bit lengths of factors sum to the bit length of the product or the bit length of the product plus one. In some cases, it may be assumed that Y is the larger factor, such that $L_X \leq L_Y$, in order to avoid double-counting. For example it may be desirable to avoid considering both (3, 4) and (4, 3), which in actuality represent the same combination of bit lengths. The set of bit length combinations may be ordered such that the combinations most likely to be the factors are tested first.

The set of bit length combinations ($L_X$, $L_Y$) for the factors X and Y of the number 119 may be constructed by taking combinations of bit lengths from 2 to $L_T$. The set does not include permutations of bit lengths, like (2, 3) and (3, 2), since they are the same. In this example, the entire set of bit lengths is $\{(2, 2), (2, 3), (2, 4), (2, 5), (2, 6), (2, 7), (3, 3), (3, 4), (3, 5), (3, 6), (3, 7), (4, 4), (4, 5), (4, 6), (4, 7), (5, 5), (5, 6), (5, 7), (6, 6), (6, 7), (7, 7)\}$. Bit lengths of one are not considered since a single bit can only encode 0 and 1. It is assumed that the most significant and least significant bits are 1. The first way of reducing the set of bit length pairs is to eliminate all pairs that, when multiplied, cannot give an answer that is 7 bits long (with a leading 1). This can easily be done on a classical computer. After this is done, the set of bit lengths is reduced to $\{(2, 5), (2, 6), (3, 4), (3, 5), (4, 4)\}$. One or more pairs from this set can contain the factors, if T is composite. If T is biprime, then only one pair of bit lengths can contain the factors. If T is prime, then no pairs will contain the factors.

In some cases, the entire set of bit lengths may not be constructed. Instead, a set of bit lengths is constructed initially by taking all pairs of bit lengths that add up to $L_T$ or $L_T+1$. For the number 119, one such pair is (2, 5). Any pair of bit lengths that cannot fulfill this condition cannot produce a number that is $L_T$ bits long. Using this method for 119, the same reduced set of bit lengths listed above is produced.

At 205, a set of factor equations is derived for one or more combinations of bit lengths ($L_X$, $L_Y$) generated, with T being represented by its bit string. The X and Y bit strings are represented as $(1, x_{L_X-2}, \ldots, x_1, 1)$ and $(1, y_{L_Y-2}, \ldots, y_1, 1)$ respectively. Then, the bit-wise long multiplication of the factors is written out, creating a set of binary equations for each bit position. The carries are represented as $z_i$, where i denotes the $i^{th}$ carry. For example, T could be the number 213, having the bit string (1, 1, 0, 1, 0, 1, 0, 1). The bit string for the unknown factors would be $(1, x_3, x_2, x_1, 1)$ and $(1, y_2, y_1, 1)$, where the variables are bits. An example of bit-wise multiplication of factors is shown in FIG. 3.

In some cases, it may be desirable to reduce the set of factor equations. For instance, the factor equations may be reduced by eliminating variables that are redundant or have obvious assignments. The reduction can take many forms including, but not limited to, row reduction over binary numbers, row reduction over the positive integers, row reduction over the integers, row reduction over real numbers, etc., as detailed below.

In other cases, it may be desirable to detect inconsistent factor equations. An example of inconsistent factor equations is provided in the example below in which the number 119 is factored into two prime numbers. If, while reducing the equations, or in a separate process, an inconsistency appears, the bit length combination is then determined to not provide a viable solution. The calculation stops and moves on to the next bit length combination. This proceeds until the set of bit length combinations is shortened to only include those combinations that could produce the bit length of T when multiplied. A method for detecting inconsistency includes reducing factor equations until an inconsistent equation or set of equations in a set of factor equations is identified, e.g., 0=1, or $x_1=0$ and $x_1=1$.

Where row reduction is used to identify inconsistent sets of factor equations, the complexity of each form of row reduction (over binary numbers, positive integers, integers and real numbers) decreases. Binary numbers are a subset of positive integers which, in turn, are a subset of the integers which, in turn, are a subset of the real numbers. If a set of equations does not have a solution over the real numbers, it will not have a solution over the binary numbers. Likewise for integers and positive integers. Therefore, sets of equations not having a solution over the binary numbers may be identified by row reduction over a superset of numbers, e.g., positive integers, integers and real numbers. This test can be generalized.

The degree of reduction may vary, and in some cases, the amount of reduction performed is monitored closely, since if reduction proceeds for too long the benefits of the reduction may be lost. On the other hand, if the reduction is terminated early, the size of the resulting problem may be unwieldy. Those of skill in the art will appreciate that it may be desirable to trade off between the benefits of factor reduction and the length of time required for such factor reduction.

In one simplification method, a series of reduction rules is applied to each equation, independent of the rest of the system, to try and determine the values of some of the variables. For example, the reduction rules may include the following:

a) If $x_i=1$ then $I_{ij}=y_j$, where $I_{ij}=x_iy_j$;

b) If $x_i=0$ then $I_{ij}=0$ c) If $x_i+y_j=2z_k$ then $x_i=y_j=z_k$ d) If all coefficients in a factor equation in the set of factor equations are positive and the constant term is zero, then every variable in the factor equation in the set of factor equations is zero.

e) If all coefficients in a factor equation in the set of factor equations are positive and the sum of the coefficients equals the constant term then every variable in the factor equation in the set of factor equations is one.

f) If the sum of all the positive coefficients and the constant term in a factor equation in the set of factor equations is less than the absolute value of a negative carry variable coefficient then an associated negative carry variable is zero.

In these rules, $x_i$ is the $i^{th}$ variable of the factor X; $y_i$ is the $i^{th}$ variable of the factor Y; $I_{ij}$ is the i, $j^{th}$ product of variables $x_i$ and $y_j$; and $s_{ij}$ is a slack variable to account for any carrying associated with product $I_{ij}$.

In addition to factoring problems, the present systems, methods and apparatus may be applied to solve other types of problems. Persons of skill in the art will appreciate that factor equations can be non-linear equations and that the identification of the solution to many problems relies upon identifying answers to sets of non-linear equations. In some cases, a set of factor equations is not used. Rather, a set of general non-linear equations is used. In such cases, at 205, the set of non-linear equations is assumed, or is taken as input and thus acts 201 and 203 are not needed and are skipped. Sets of non-linear equations that may be used include equations that arise from bit-wise multiplication of bit variable strings. Terms in the nonlinear equations may include the products of two, three or more bit variables. The set of non-linear equations may be reduced as discussed above.

Thus, returning to the factoring of integer 119, factor equations are constructed from each pair of bit string lengths from the list produced ({(2, 5), (2, 6), (3, 4), (3, 5), (4, 4)}). In some cases, the order in which the bit length pairs is processed may be optimized. For example, the bit pair length (4, 4) has more products that are seven bits long compared to (2, 5), and therefore (4, 4) is tested first. In other cases, the density of prime numbers for a bit length determines which order the bit length pairs are processed. Alternatively, all bit length pairs that add to $L_T+1$ may be processed first, since those bit length pairs have more combinations that multiply to give a number with $L_T$ bits. For example, the pairs (2, 6), (3, 5), and (4, 4) may be processed before (2, 5) and (3, 4). In other cases, multiple bit length pairs may be processed simultaneously, either on the same processor, or on separate processors, such as a series of processors set up in parallel.

As an example of the processing, consider the first bit length pair (2, 5) expanded into bit variables denoted X=(1, 1) (since the most and least significant bits must be one) and Y=(1, $y_3$, $y_2$, $y_1$, 1). Next, the long multiplication of X and Y is performed. This is illustrated below.

$$\begin{array}{ccccccc}
 & & 1 & y_3 & y_2 & y_1 & 1 \\
 & & & & & 1 & 1 \times \\
\hline
 & & 1 & y_3 & y_2 & y_1 & 1 \\
 & 1 & y_3 & y_2 & y_1 & 1 & + \\
\hline
1 & 1 & 1 & 0 & 1 & 1 & 1
\end{array}$$

From the long multiplication, the set of factor equations can be constructed as follows, using $z_i$ to represent the carries:

$y_1+1=1$ $y_2+y_1=1+2z_1$ $y_3+y_2+z_1=0+2z_2+4z_3$ $1+y_3+z_2=1+2z_4$ $1+z_3+z_4=1+2z_5$ $z_5=1$

Since the set of equations is Boolean, the coefficients 2 and 4 denote relative bit position instead of a scalar multiple. For example, the coefficient $4z_3$ indicates that the carry $z_3$ is added to the equation that is two significant bits larger (as can be seen from the presence of $z_3$ in $1+z_3+z_4=1+2z_5$). From this set of equations, row reduction can be done to eliminate some of the variables. For example, from the first equation $y_i$ can be, deduced to be zero. Some rules for reduction of factor equations have been described in previous sections. Continued reduction yields the following two equations:

$y_2+1=1+2z_1$ $1+y_2+z_1=0+2+4$

As can be seen, the second equation cannot be satisfied for any value of $y_2$ and $z_1$. Therefore, since the set of factor equations is inconsistent, the bit length pair (2, 5) cannot encode the factors of 119. The process then moves on to another set of bit length pairs.

In this example, the bit length pair (3, 5) is considered. For this set, $X=(1, x, 1)$ and $Y=(1, y_3, y_2, y_1, 1)$. The long multiplication of these two numbers is shown in detail in FIG. 3. Lines 310 and 314 are the bit-wise representations of Y and X respectively. Lines 318, 322 and 326 are the intermediate multiplications resulting from multiplying line 310 by each bit in line 314 and bit-shifting the result, much like normal multiplication. Line 330 shows the result of the multiplication (the binary sum of lines 318, 322 and 326), which is the binary format of T=119.

From FIG. 3, the factor equations can be derived and are shown in FIG. 4 as the set of equations 413. The set of equations 413 can be row reduced significantly. For example, it can be readily seen that $z_5=0$. Equation set 416 shows an intermediate stage during row reduction, where $z_5$, $z_1$, and $y_1 x$ have been canceled out. After the equations are reduced as far as possible, the set of factor equations that results is shown in equation set 419. Next, the term $xy_3$ is replaced by the product variable w. All terms in each equation are moved to one side and the equations are squared, as shown in equation set 422 of FIG. 4.

At 207, the set of factor equations are converted an acceptable input, such as a factor graph or an energy function, for a computing device. The computing device may be, for example, a quantum processor composed of a number of quantum devices, such as those illustrated in FIGS. 9A and 9B ((discussed below). In some cases, the computing device may also include classical computing elements and interface elements between the classical and quantum aspects of the device.

Where the input is an energy function, when the energy function is fully minimized, it provides the bit values that satisfy the multiplication, if the correct bit length combination is selected (that is, satisfying the set of factor equations is equivalent to minimizing the energy function). If not, the process moves back to 205 and selects the next set of bit length combinations and attempts to minimize it. The energy function may be created by taking each equation and moving all variables to one side of the equation. In some cases, each equation is then squared and summed together, with a coefficient attached to each squared component. The coefficients are arbitrary and may be set to make the processing on the computing device more efficient.

It may be desirable in some cases to further process the energy function before it is provided to the computing device. For example, squared components in the energy function can contain quadratic terms, thus leading to quartic terms once squared. Where the computing device is a quantum processor that can only handle functions of quadratic power or less, quartic and cubic terms in the energy function may be reduced to quadratic terms. In some cases, the quartic and cubic terms may be reduced to second degree by the use of product and slack variables. An example of a product variable is replacing $x_i y_i$ with $I_{ij}$, where $I_{ij} \leq x_i$, $I_{ij} \leq y_j$, and $x_i + y_j \leq I_{ij} + 1$ ($x_i$, $y_i$ and $I_{ij}$ are being binary variables), thus reducing the quadratic term to a linear term, which then, when squared, is a quadratic term. In other cases, the inequality constraint produced by introducing a product variable may be converted to an equality constraint, which may be easier to map onto the computing device. When converted to an equality constraint, however, a new variable is introduced. For example, the inequality constraint $x_i + y_j \leq I_{ij} + 1$ can be turned into $x_i + y_j - 2I_{ij} - s_{ij} = 0$, where is the slack variable. The equality constraint is constructed in such a fashion that if $x_i$, $y_i$, and $I_{ij}$ satisfy the inequality, then $s_{ij}$ will assume a value that satisfies the equality. If $x_i$, $y_j$, and $I_{ij}$ do not have values that satisfy the inequality, then there is no value for $s_{ij}$ that will satisfy the equality. Thus, for every quadratic term in the original factoring equation, converting to a form that can be mapped onto the computing device requires the introduction of two new variables: one product variable and one slack variable.

In accordance with an embodiment of the present systems, methods and apparatus, at 207, a prime factorization problem may be converted into an optimization problem on an analog processor comprising a set of quantum devices. To accomplish this conversion, the energy function is first converted to a factor graph (that is, a graphical representation of quadratic interactions between variables). In such a representation, the nodes of the graph are variables while edges in the graph connect two variables that occur in the function. Where all components of the energy equation are squared, the energy function can be cast into a factor graph. Variables in a squared component of the energy equation give a connected subgraph in the factor graph. Once a factor graph is created, it can then be mapped onto the quantum processor, such as those shown in FIGS. 9A and 9B below. The nodes are the quantum devices, e.g. qubits that represent variables, and the strengths of the couplings between the nodes are chosen to represent the coefficients linking paired variables.

The energy function may then be converted into matrix form. An example of the matrix form is:

$$E(x) = x Q^T x + r^T x \tag{1}$$

where Q is the symmetric matrix of coefficients between quadratic non-identical bit pairs, r is the vector of coefficients for quadratic terms in the energy function, and x is vector of bit variables. The components of E(x) can be generated by expanding the full energy function and collecting like terms. The necessary optimization constraints for the computing device, such as coupling strengths between quantum devices, can easily be extracted from the matrix form of the energy function.

Returning to the example factoring of the integer 119, the reduced set of factor equations 422 from FIG. 4 is then summed into a single function, called the energy function, and is shown in FIG. 5 as equation 501, where $\mu_i$ and $\lambda_i$ are arbitrary positive coefficients. These coefficients may be chosen to make the computation on the computing device (such as a quantum processor) more efficient (e.g. making the evolution quicker). Also included in the energy function are the equality constraints with the slack variables $s_1$, $s_2$, and $s_3$ respectively corresponding to the inequalities $w \leq x$, $w \leq y_3$ and $x + y_3 \leq w + 1$. The corresponding equality constraints are then $$w - y_3 + s_1 = 0$$

$$w - x + s_2 = 0$$

$$x + y_3 - w + s_3 - 1 = 0$$

Energy function 501 is then put into matrix form, as described above. For this example, the matrices are shown in FIG. 5. Matrix 505 is Q, matrix 507 is $-r$, and matrix 509 is x.

Figure 6:
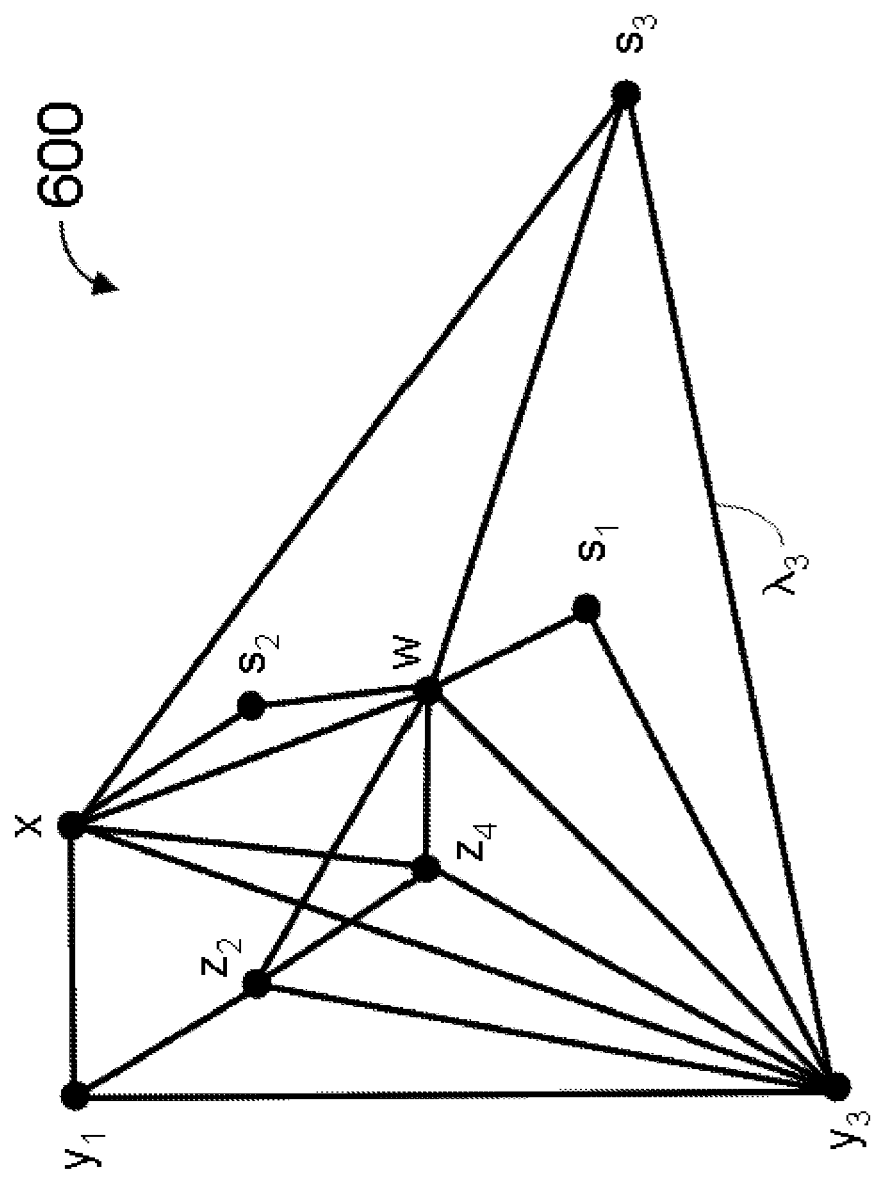
FIG. 6 is a schematic diagram of a factor graph.

With all the coefficients in matrix form, a factor graph 600 of the energy function can now be constructed, as illustrated in FIG. 6. Black circles represent the bit variables, while the edges represent quadratic bit pairings in the energy function. Each edge has a weighting associated with it, which corresponds to the coefficient pre-factor in the Q matrix. For example, the edge between $y_3$ and $s_3$ is weighted $\lambda_3$, which corresponds to the last row, second column value in Q. Likewise, the values of r are weightings for each respective vertex. In some cases, the factor graph may be constructed from the matrix using a classical computer.

Figure 7:
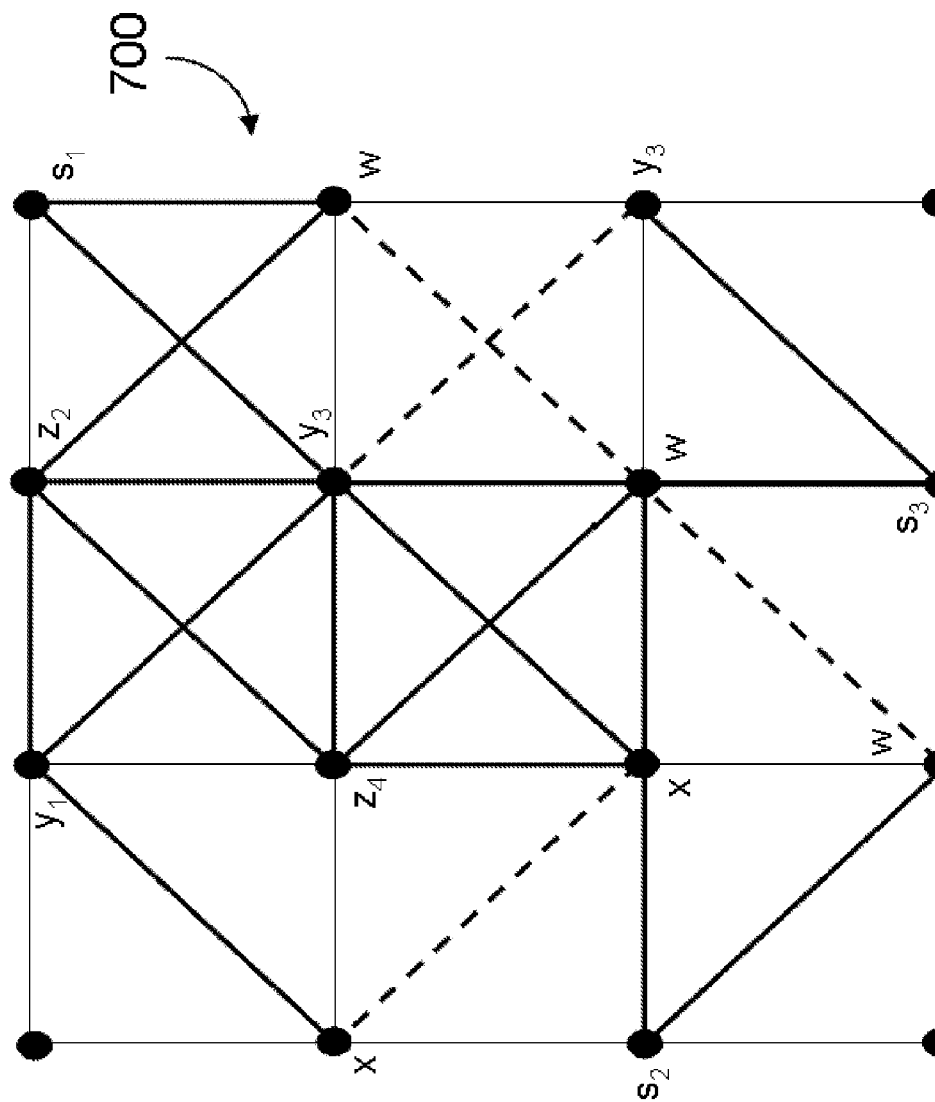
FIG. 7 is a schematic diagram of an embodiment of embedding the factor graph of FIG. 8 onto a two-dimensional grid.

Next, the factor graph is embedded onto a graph that can be applied to the analog processor. For example, where the structure of the analog processor is such that a two-dimensional grid is desirable, graph 600 may be embedded onto a two-dimensional planar grid, such as graph 700 of FIG. 7. The edges from graph 600, represented by thick black lines in graph 700, connect nearest (horizontal and vertical) or next-nearest neighbor vertices (diagonal), used vertices being represented by black circles in graph 700. Dashed lines represent multiple nodes that are effectively the same edge. For example, the variable w is copied across three nodes. This means that any other edge that would connect to w can connect to any of its three nodes. The embedding shown here may be considered to be "efficient" in that it uses the fewest nodes, the fewest vertices, and the smallest grid area (4 by 4 nodes) possible. Three nodes are not used in the mapping and therefore are not connected to any of the other nodes. However, not all embeddings may be efficient for the optimization portion of the method, and so multiple embeddings might, have to be created.

The embedding of a factor graph onto a two-dimensional grid can be done on a classical computer. There are classical algorithms in the art that can achieve graph embedding with relative efficiency, including linear time. Graph embedding algorithms take a data structure that describes which nodes of a graph are connected, e.g., an adjacency matrix, and draw the graph in a regular fashion, e.g., with horizontal, vertical, and sometimes diagonal lines. One collection of algorithms for such purpose are found in the C++ program library Library of Efficient Data types and Algorithms (LEDA). It has been developed, since 1988, by the Max-Planck-Instutut in Saarbrücken, Germany. It provides the data structures and algorithms for constructing straight-line planar-grid embeddings. See, Mehlhorn and Näher, 1995, "LEDA, a platform for combinatorial and geometric computing," Communications of the ACM 38, pp. 96-102; Eades and Tamassia, 1989, "Algorithms for Drawing Graphs: An Annotated Bibliography," Technical Report CS-89-09, Department of Computer Science, Brown University, Providence, R.I., USA.

Once completed, the embedding is applied as the initial condition of the analog processor. For example, where the analog processor is composed of a grid of quantum and coupling devices such as those shown in FIGS. 9A and 9B below, the appropriate values of coupling $J_{ij}$ for the coupling devices may be determined by the components of matrix Q, while values of local bias $h_i$ for the quantum devices are determined by the vector r. Each coupling device is initialized with a coupling strength that is proportional to the weighting of the corresponding edge in the factor graph. The coupling devices may be configurable to couple quantum devices together ferromagnetically and anti-ferromagnetically. These two types of coupling are used to distinguish coefficients with different signs. Another use of ferromagnetic coupling is to extend the number of nodes that represent a variable, such as w in FIG. 7.

At 209, with the factor graph embedded as an initial state of the analog processor, the processor is allowed to evolve. Evolution allows the set of quantum devices to find its ground state, and may include letting the Hamiltonian of the processor move away from an initial excited state and attempting to find the ground state or a lower excited state of the same Hamiltonian. The ground state is the minimum energy state of the energy function, and can be mapped to a solution to the factor equations (if there is a solution). The ground state is an assignment of values, or states, to the quantum devices in the processor. The evolution can take many forms including, but not limited to, adiabatic evolution, quasi-adiabatic evolution, annealing by temperature, annealing by magnetic field, and annealing of barrier height.

For example, the initial state of the analog processor may include a configuration of local biases for each quantum device within the processor and a configuration of couplings with associated coupling strengths between each of the quantum devices. These configurations give rise to an initial multi-device quantum state of the entire processor. In some embodiments, the local biases depend on the vector r and the couplings depend on the matrix Q. The coupling configuration of the processor produces a specific energy landscape, with the initial state occupying one point on the landscape, which may be the ground state.

The processor may be configured to perform an adiabatic evolution, that is, letting an initial quantum state evolve slowly from the ground state of an initial Hamiltonian to a final Hamiltonian. When the Hamiltonian is changed adiabatically, the quantum state of the processor will always remain in its ground state. The final Hamiltonian encodes the solution of the optimization problem. Changing of the Hamiltonian can be effected by changing the local quantum device bias or by changing the strength of the couplings. This method includes configuring the system such that the final Hamiltonian encodes the constraints that describe the energy landscape, e.g., what was referred to as the initial state. See, for example, U.S. Patent Publication Nos. 2005-0256007 (now U.S. Pat. No. 7,418,283), 2005-0250651, and 2005-0224784 (now U.S. Pat. No. 7,135,701), each entitled "Adiabatic Quantum Computation with Superconducting Qubits," which are each hereby incorporated by reference in their entirety.

Annealing is another type of evolution process and involves slowly raising or lowering a variable of the quantum system. The idea behind annealing is to start the quantum system in a highly excited state that can explore a wide range of the system's energy landscape, searching for the global minimum of the system. Then, by slowly changing a variable of the system, the movement of the quantum state is restricted. As the excitation dies down, the quantum state will, with a large probability, settle into the lowest energy minimum it can find. It is hoped that this minimum is in fact the global minimum. The one or more variables of the system that can be changed include temperature (high to low), magnetic field (high to low), and energy barrier height between minima (low to high). Each annealing process has an associated annealing time, which characterizes the rate the variable of the system is changed. In some cases, the annealing time may be selected so as to allow enough time for the quantum state to find its lowest energy configuration. If the annealing time is too short, then the quantum state may not have enough time to settle into the global minimum. If the annealing time is too long, then there is wasted time in the computation. In some cases, the quantum state does not reach the global minimum but reaches a minimum slightly above the global minimum.

Once the analog processor has reached a final state, at 211 a set of assignments for the variables in the factor graph are read out. For example, where the analog processor includes a set of quantum devices, the set of assignments may be read out by reading out the states of one or more quantum devices. These states are value assignments to the variables in the factor graph and hence the variables in the factor equations. In some cases, the states may be assignments for variables in the reduced factor equations.

At 213, the factors X and Y are constructed (using the set of variable assignments and the factor equations or reduced factor equations) and used to determine if an answer to the factorization problem has been found. If the process is successful, the final state of the analog processor encodes the value of the bit variables that satisfy the factor equations, assuming such equations can in fact be satisfied. If the factor equations are not satisfied, then the bit length combination that was used to construct the factor equations at 205 does not contain the prime factors of T, in which case the process returns to 205, selecting a different bit length combination. (Where more than one bit length combination was processed simultaneously, control may not return to 205, since the prime factors may have been found through one of the parallel runs.) In some cases, process 200 repeats initialization and evolution (207 through 213) with all input parameters unchanged and the final quantum state encoded from each of these repeated runs is used to arrive at the solution with a calculated probability, where the calculated probability is a function of the number of times acts 207 through 213 were repeated using the same input parameters.

In some cases, a new embedding of the factor graph onto the analog processor is found and the process continues from 207. In other cases, a different type of evolution may be attempted. In such cases, acts 209 through 213 may be repeated, with each repeat employing a different type of evolution. After a sufficient amount of time, the states of the nodes are measured. Sometimes, the states of the system variables can get stuck in a local minimum. Therefore, in some cases, the evolution of the analog processor may be done more than once for the same initial state, different annealing times may be used in multiple evolutions of the same initial state, or the type of evolution may differ from run to run.

In each of the examples described above, a determination is made to see whether the factor equations are satisfied at 213. When the factor equations are satisfied, the bit variables are converted to numbers X and Y and tested to determine whether they really are the prime factors of T (i.e., a set of true factors). If they are, the problem has been solved. If not, then process 200 moves on to the next bit length combination and repeats acts 205 to 213 (not always necessary in the case where bit length combinations were processed in parallel).

In the case of the integer 119, the factors produced are X=7 and Y=17. In this case, both factors are prime (confirming the hypothesis that the integer 119 is biprime). However, in some cases, if T is a general composite number or multi-prime, the factors themselves are then factored, if possible, to produce a set of prime factors for T. Thus, the method described for factoring T can be applied to either X or Y, or both. For example, the number 12 can be factored into 2 and 6 and the number 6, in turn, can be factored into 2 and 3. Therefore the set of prime factors for 12 is 2, 2, and 3. A number can be tested for primality in polynomial time.

FIG. 8A shows a quantum device 800 suitable for use in some embodiments of the present systems, methods and apparatus. Quantum device 800 includes a superconducting loop 803 interrupted by three Josephson junctions 801-1, 801-2 and 801-3. Current can flow around loop 803 in either a clockwise direction (802-0) or a counterclockwise direction (802-1), and in some embodiments, the direction of current may represent the state of quantum device 800. Unlike classical devices, current can flow in both directions of superconducting loop 803 at the same time, thus enabling the superposition property of qubits. Bias device 810 is located in proximity to quantum device 800 and inductively biases the magnetic flux through loop 803 of quantum device 800. By changing the flux through loop 803, the characteristics of quantum device 800 can be tuned.

Quantum device 800 may have fewer or more than three Josephson junctions. For example, quantum device 800 may have only a single Josephson junction, a device that is commonly known as an rf-SQUID (i.e. "superconducting quantum interference device"). Alternatively, quantum device 800 may have two Josephson junctions, a device commonly known as a dc-SQUID. See, for example, Kleiner et al., 2004, Proc. of the IEEE 92, pp. 1534-1548; and Gallop et al., 1976, Journal of Physics E: Scientific Instruments 9, pp. 417-429.

Fabrication of quantum device 800 and other embodiments of the present systems, methods and apparatus is well known in the art. For example, many of the processes for fabricating superconducting circuits are the same as or similar to those established for semiconductor-based circuits. Niobium (Nb) and aluminum (Al) are superconducting materials common to superconducting circuits, however, there are many other superconducting materials any of which can be used to construct the superconducting aspects of quantum device 800. Josephson junctions that include insulating gaps interrupting loop 803 can be formed using insulating materials such as aluminum oxide or silicon oxide to form the gaps.

The potential energy landscape 850 of quantum device 800 is shown in FIG. 8B. Energy landscape 850 includes two potential wells 860-0 and 860-1 separated by a tunneling barrier. The wells correspond to the directions of current flowing in quantum device 800. Current direction 802-0 corresponds to well 860-0 while current direction 802-1 corresponds to well 860-1 in FIGS. 8A and 8B. However, this choice is arbitrary. By tuning the magnetic flux through loop 803, the relative depth of the potential wells can be changed. Thus, with appropriate tuning, one well can be made much shallower than the other. This may be advantageous for initialization and measurement of the qubit.

While quantum device 800 shown in FIGS. 8A and 8B is a superconducting qubit, quantum device may be any other technology that supports quantum information processing and quantum computing, such as electrons on liquid helium, nuclear magnetic resonance qubits, quantum dots, donor atoms (spin or charges) in semiconducting substrates, linear and non-linear optical systems, cavity quantum electrodynamics, and ion and neutral atoms traps.

Where quantum device 800 is a superconducting qubit as shown in FIGS. 8A and 8B, the physical characteristics of quantum device 800 include capacitance (C), inductance (L), and critical current($I_C$), which are often converted into two values, the Josephson energy ($E_J$) and charging energy ($E_C$), and a dimensionless inductance ($\beta_L$). Those of skill in the art will appreciate that the relative values of these quantities will vary depending on the configuration of quantum device 800. For example, where quantum device 800 is a superconducting flux qubit or a flux qubit, the thermal energy ($k_B T$) of the qubit may be less than the Josephson energy of the qubit, the Josephson energy of the qubit may be greater than the charging energy of the qubit, or the Josephson energy of the qubit may be greater than the superconducting material energy gap of the materials of which the qubit is composed. Alternatively, where quantum device 800 is a superconducting charge qubit or a charge qubit, the thermal energy of the qubit may be less than the charging energy of the qubit, the charging energy of the qubit may be greater than the Josephson energy of the qubit, or the charging energy of the qubit may be greater than the superconducting material energy gap of the materials of which the qubit is composed. In still another alternative, where the quantum device is a hybrid qubit, the charging energy of the qubit may be about equal to the Josephson energy of the qubit. See, for example, U.S. Pat. No. 6,838,694 B2; and U.S. Patent Publication US 2005-0082519 (now U.S. Pat. No. 7,335,909) entitled "Superconducting Phase-Charge Qubits," each of which is hereby incorporated by reference in its entirety.

Figure 8C:
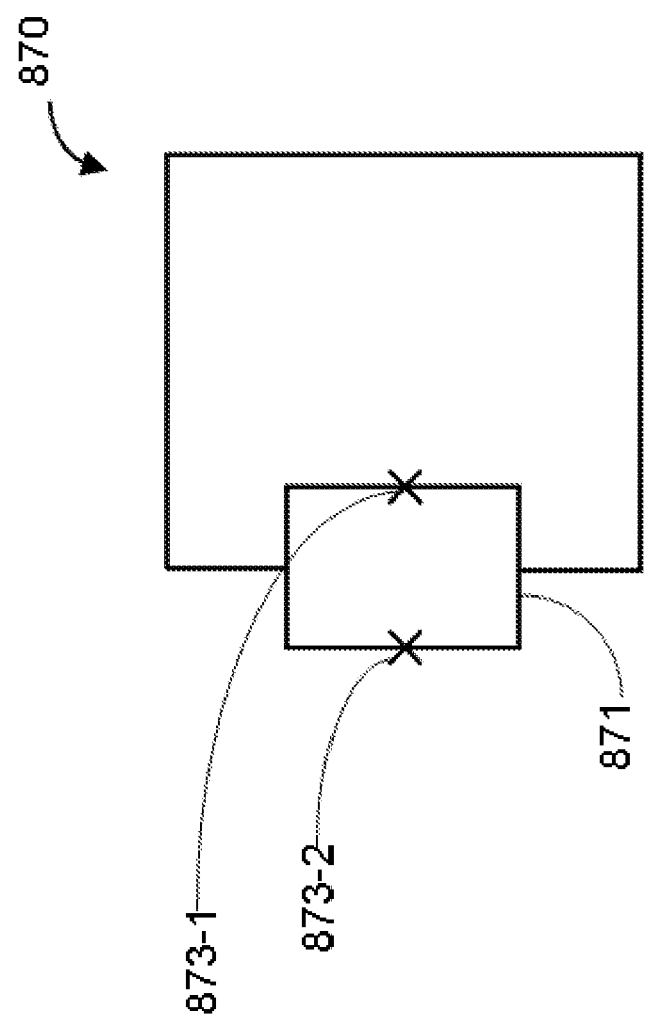
FIG. 8C is a schematic diagram showing an existing compound junction in which two Josephson junctions are found in a superconducting loop.

The charging and Josephson energies, as well as other characteristics of a Josephson junction, can be defined mathematically. The charging energy of a Josephson junction is $e^2/2C$ where e is the elementary charge and C is the capacitance of the Josephson junction. The Josephson energy of a Josephson junction is $(\hbar/2e)/_{C}$. If the qubit has a split or compound junction, the energy of the Josephson junction can be controlled by an external magnetic field that threads the compound junction. A compound junction includes two Josephson junctions in a small superconducting loop. For example, FIG. 8C illustrates a device 870 in which a compound junction having two Josephson junctions 873 are found in a small superconducting loop 871. The Josephson energy of the compound junction can be tuned from about zero to twice the Josephson energy of the constituent Josephson junctions 873. In mathematical terms, $$E_J = 2E_J^0 \left| \cos\left(\frac{\pi \Phi_X}{\Phi_0}\right) \right|$$

where $\Phi_X$ is the external flux applied to the compound Josephson junction, and $E_J^0$ is the Josephson energy of one of the Josephson junctions in the compound junction. The dimensionless inductance β of a qubit is $2\pi L I_c/\phi_0$, where $\phi_0$ is the flux quantum. In some cases, β may range from about 1.2 to about 1.8, while in other cases, β is tuned by varying the flux applied to a compound Josephson junction.

Again, those of skill in the art will appreciate that a wide variation of type of quantum device 800 may be employed in the present systems, methods and apparatus. For example, a qutrit may be used (i.e., a quantum three level system, having one more level compared to the quantum two level system of the qubit). Alternatively, the quantum device 800 may have or employ energy levels in excess of three. The quantum devices described herein can be improved with known technology. For instance, quantum device 800 may include a superconducting qubit in a gradiometric configuration, since gradiometric qubits are less sensitive to fluctuations of magnetic field that are homogenous across the qubit.

Figure 9B:
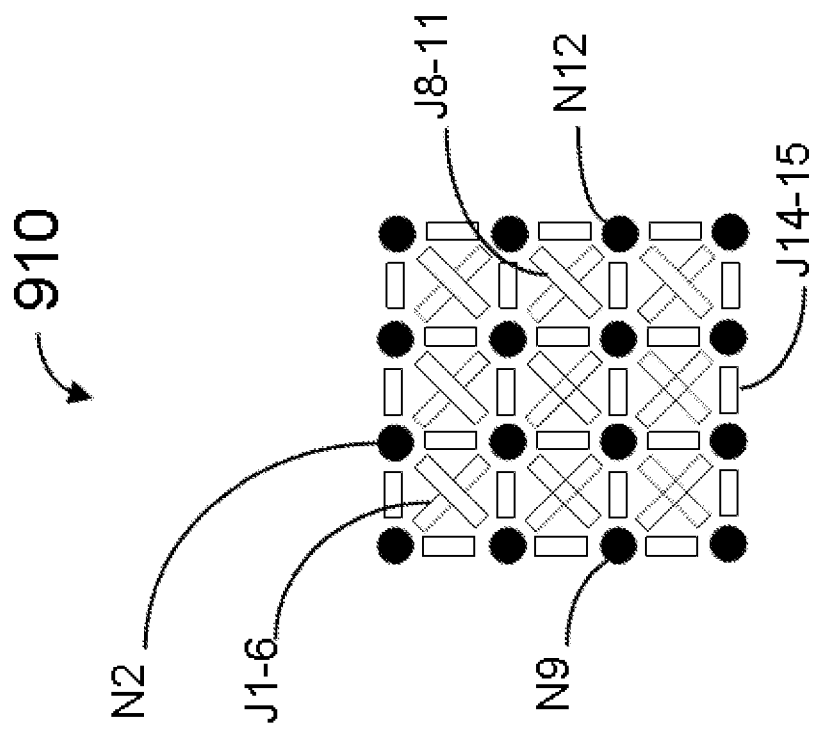
FIGS. 9A and 9B are schematic diagrams illustrating exemplary two-dimensional grids of quantum devices in accordance with aspects of the present systems, methods and apparatus.
Figure 9A:
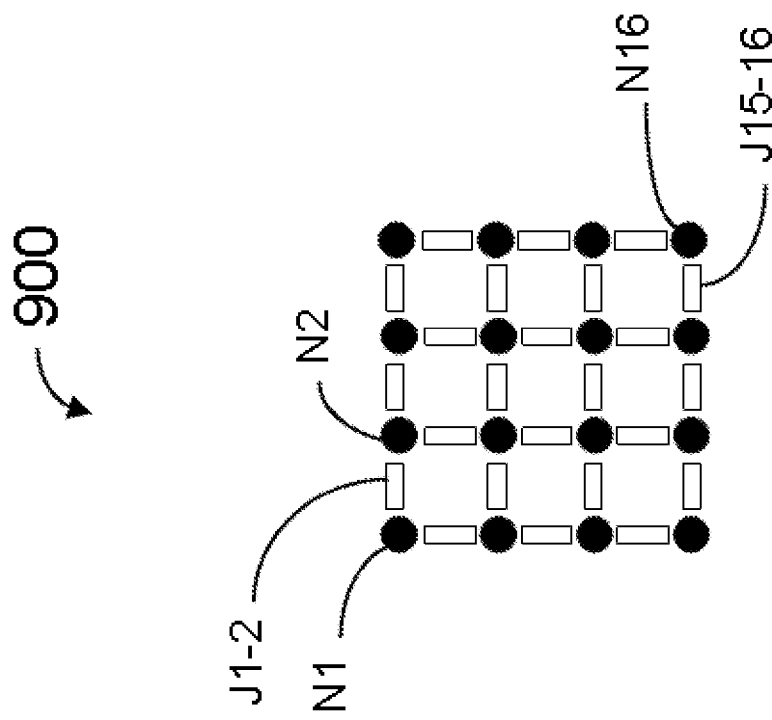

FIGS. 9A and 9B illustrate sets of quantum devices in accordance with aspects of the present systems, methods and apparatus. FIG. 9A shows a two-dimensional grid 900 of quantum devices N1 through N16 (only N1, N2 and N16 are labeled), each quantum device Nk being coupled together to its nearest neighbors via coupling devices Ji-k (only J1-2 and J15-16 are labeled). Quantum devices N may include, for example, the three junction qubit 800 of FIG. 8A, rf-SQUIDs, and dc-SQUIDs, while coupling devices J may include, for example, rf-SQUIDs and dc-SQUIDs. Those of skill in the art will appreciate that grid 900 may include any number of quantum devices Nk.

Coupling devices Ji-k may be tunable, meaning that the strength of the coupling between two quantum devices created by the coupling device can be adjusted. For example, the strength of the coupling may be adjustable (tunable) between about zero and a preset value, or the sign of the coupling may be changeable between ferromagnetic and anti-ferromagnetic. (Ferromagnetic coupling between two quantum devices means it is energetically more favorable for both of them to hold the same basis state (e.g. same direction of current flow), while anti-ferromagnetic coupling means it is energetically more favorable for the two devices to hold opposite basis states (e.g. opposing directions of current flow)). Where grid 900 includes both types of couplings, it may be used to simulate an Ising system, which can be useful for quantum computing, such as thermally-assisted adiabatic quantum computing. Examples of coupling devices include, but are not limited to, variable electrostatic transformers and rf-SQUIDs with $\beta_L<1$. See, for example, U.S. patent application Ser. No. 11/100,931 entitled "Variable Electrostatic Transformer," and U.S. patent application Ser. No. 11/247,857, (now U.S. Pat. No. 7,619,437) entitled "Coupling Schemes for Information Processing," each of which is hereby incorporated be reference in its entirety.

FIG. 9B illustrates a two-dimensional grid 910 of quantum devices N coupled by coupling devices J. In contrast to FIG. 9A, each quantum device N is coupled to both its nearest neighbors and its next-nearest neighbors. The next-nearest neighbor coupling is shown as diagonal blocks, such as couplings J1-6 and J8-11. The next nearest neighbor coupling shown in grid 910 may be beneficial for mapping certain problems onto grid 910. For example, some optimization problems that can be embedded on a planar grid can be embedded using fewer quantum devices when next-nearest neighbor coupling is available. Those of skill in the art will appreciate that grid 910 may be expanded or contracted to include any number of quantum devices. In addition, the connectivity between some or all of the quantum devices in grid 910 may be greater or lesser than that shown.

Figure 10:
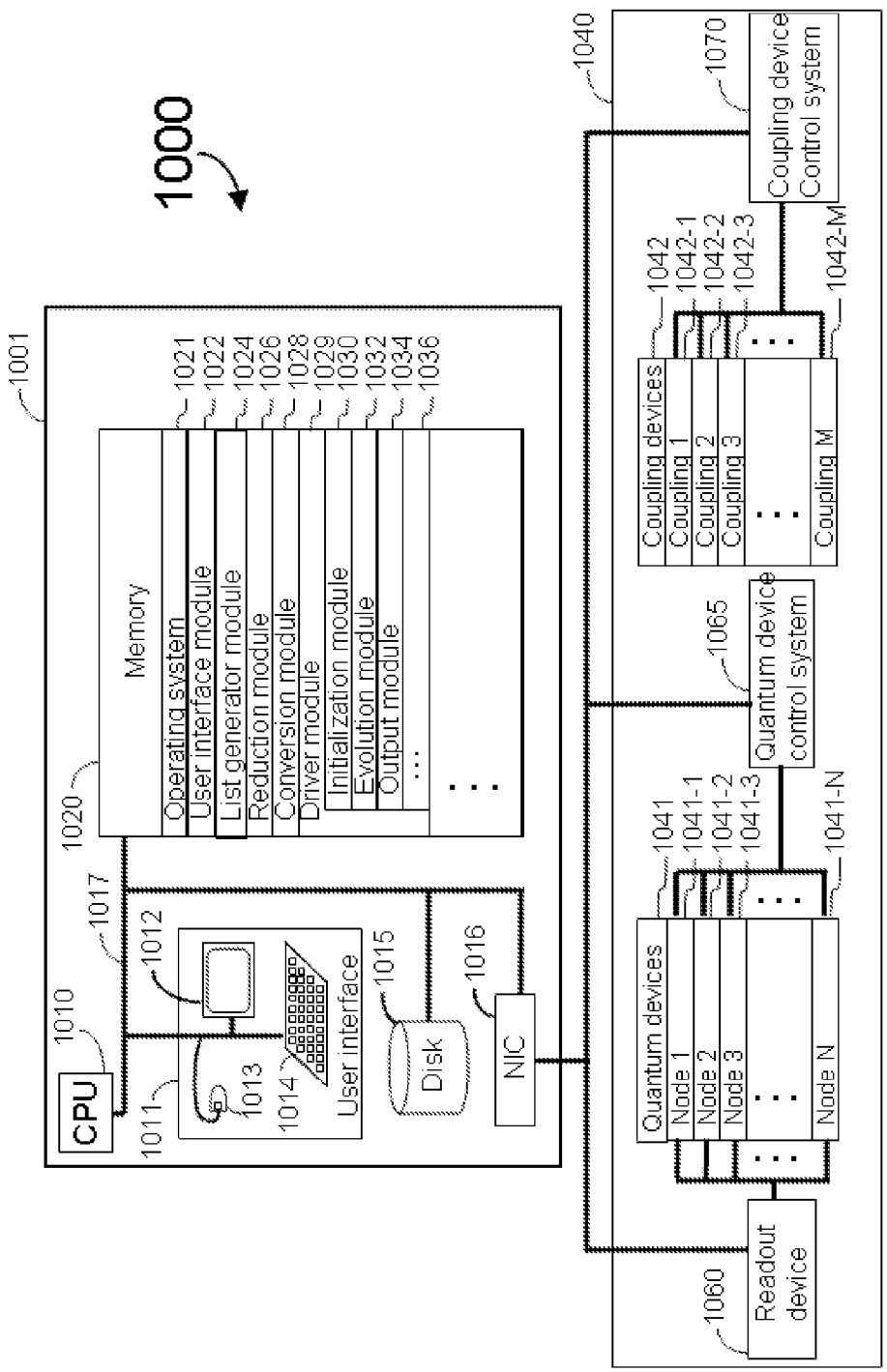
FIG. 10 is a block diagram of an embodiment of a computing system.

Factoring may be done through a combination of classical and analog computing devices, such as, for example, where a classical computing device handles the pre- and post-processing and a quantum computing device handles the optimization. FIG. 10 illustrates a system 1000 that may be operated in accordance with one embodiment of the present systems, methods and apparatus. System 1000 includes digital (binary, conventional, classical, etc.) interface computer 1001 configured to receive an input, such as the number to be factored.

Computer 1001 includes standard computer components including a central processing unit 1010, data storage media for storing program modules and data structures, such as high speed random access memory 1020 as well as non-volatile memory, such as disk storage 1015, user input/output subsystem 1011, a network interface card (NIC) 1016 and one or more busses 1017 that interconnect some or all of the aforementioned components. User input/output subsystem 1011 includes one or more user input/output components such as a display 1012, mouse 1013 and/or keyboard 1014.

System 1000 further includes a processor 1040, such as a quantum processor having a plurality of quantum devices 1041 and a plurality of coupling devices 1042, such as, for example, those described above in relation to FIGS. 9A and 9B. Processor 1040 is interchangeably referred to herein as a quantum processor, analog processor or processor.

System 1000 further includes a readout device 1060. In some embodiments, readout device 1060 may include a plurality of dc-SQUID magnetometers, each inductively connected to a different quantum device 1041. In such cases, NIC 1016 may receive a voltage or current from readout device 1060, as measured by each dc-SQUID magnetometer in readout device 1060. Processor 1040 further comprises a controller 1070 that includes a coupling control system for each coupling device 1042, each coupling control system in control device 1070 being capable of tuning the coupling strength of its corresponding coupling device 1042 through a range of values, such as between $-|J_c|$ to $+|J_c|$, where $|J_c|$ is a maximum coupling value. Processor 1040 further includes a quantum device control system 1065 that includes a control device capable of tuning characteristics (e.g. values of local bias $h_i$) of a corresponding quantum device 1041.

Memory 1020 may include an operating system 1021. Operating system 1021 includes procedures for handling various system services, such as file services, and for performing hardware-dependent tasks. The programs and data stored in system memory 1020 may further include a user interface module 1022 for defining or for executing a problem to be solved on processor 1040. For example, user interface module 1022 may allow a user to define a problem to be solved by setting the values of couplings $J_{ij}$ and the local bias $h_i$, adjusting run-time control parameters (such as evolution schedule), scheduling the computation, and acquiring the solution to the problem as an output. User interface module 1022 may include a graphical user interface (GUI) or it may simply receive a series of command line instructions that define a problem to be solved.

Memory 1020 may further include a list generator module 1024 that generates a list of possible factor bit lengths L. For example, list generator module 1024 may be used to trim and order the entries in list L, or to create a set of all possible factor bit lengths for a given T supplied by a user. List L can be trimmed by excluding the factor bit lengths for bits lengths for which all factors have been excluded. This division could be done by CPU 1010 or by another computer coupled to computer 1001 by a LAN, WAN, Internet, other forms of networks, and/or other forms of electronic communication (e.g., ethernet, parallel cable, or serial connection). Alternatively, list generator module 1024 may trim list L using information supplied by other modules.

Memory 1020 may include a reduction module 1026 for reducing the factor equations for a corresponding factor combination selected from the list of combinations L. For instance, the factor equations may be reduced by row reduction over binary or real values or by computing binary or integer solutions to a subset of equations. For example, methods used for solving Diophantine equations, such as computing least common multiples, and greatest common denominators may be implemented in reduction module 1026. Reduction module 1026 may also include routines for determining an optimal time to terminate the reduction of the factor equations, e.g. to balance the time complexity of reduction with the space complexity of embedding the optimization problem into processor 1040. Such optimization (determination of when to stop reduction) may be based on many factors, such as performance observed in solving prior factorization problems, heuristic approaches, and mathematical modeling.

Memory 1020 may further include a conversion module 1028 for the conversion of a factoring problem, as defined by a set of factor equations, to an optimization problem. For example, conversion module 1028 may convert the set of factor equations into an energy function (as described in reference to 207 of process 200 (FIG. 2)). Conversion module 1028 may also create a factor graph, including the appropriate edge and node weights, e.g., values of couplings and local fields, for the given (reduced) set of factor equations.

Conversion module 1028 may reduce quartic terms in an energy equation to quadratic terms. For example, conversion module 1028 may replace the quartic terms with product and slack variables. An example of a product variable is the replacement of $x_i y_j$ with $I_{ij}$, where $I_{ij} \leq x_i$, $I_{ij} \leq y_j$, and $x_i + y_j \leq I_{ij} + 1$. In some cases, the inequality constraint produced by introducing a product variable is converted to an equality constraint, which can be easier to map onto some processors. For example, the inequality constraint above can be turned into $x_i + y_j - 2I_{ij} - s_{ij} = 0$, where $s_{ij}$ is the slack variable. The equality constraint is constructed in a fashion such that, if $x_i$, $y_j$, and $I_{ij}$ satisfy the inequality, then $s_{ij}$ will assume a value that satisfies the equality.

Memory 1020 may further include a driver module 1029 for outputting signals to processor 1040. Driver module 1029 may include an initialization module 1030, evolution module 1032 and output module 1034. For example, initialization module 1030 may determine the appropriate values of coupling $J_{ij}$ for the coupling devices 1042 and values of local bias $h_i$ for the quantum devices 1041 of processor 1040, for a given problem, as defined by user interface module 1022. In some cases, initialization module 1030 may include instructions for converting aspects in the definition of the problem into physical values, such as coupling strength values and node bias values, which can be programmed into processor 1040. Initialization module 1030 then sends the appropriate signals along bus 1017, into NIC 1016 which, in turn, sends appropriate commands to quantum device control system 1065 and controller 1070.

Alternatively, evolution module 1032 may determine the appropriate values of coupling $J_{ij}$ for coupling devices 1042 and values of local bias $h_i$ for quantum devices 1041 of processor 1040 in order to fulfill some predetermined evolution, e.g., an annealing schedule. Evolution module 1032 then sends the appropriate signals along bus 1017, into NIC 1016, which then sends commands to quantum device control system 1065 and coupling device control system 1070. Output module 1034 is used for processing and providing the solution provided by processor 1040.

NIC 1016 may include hardware for interfacing with quantum devices 1041 and coupling devices 1042 of processor 1040, either directly or through readout device 1060, quantum device control system 1065, and/or coupling device control system 1070, or software and/or hardware that translates commands from driver module 1029 into signals (e.g., voltages, currents) that are directly applied to quantum devices 1041 and coupling devices 1042. NIC 1016 may include software and/or hardware that translates signals, representing a solution to a problem or some other form of feedback, from quantum devices 1041 and coupling devices 1042 such that it can be provided to output module 1034.

Memory 1020 may include a preprocessing module (not shown), including instructions for CPU 1010 to compute a combination of factor lengths and to derive a set of factor equations from the combination of factor lengths, to reduce the set of factor equations, and/or to convert the set of factor equations into an energy function and reduce the degree of the leading term in the energy function from quartic to quadratic, or cubic to linear. For example, the set of factor lengths may be computed for a biprime, such as a biprime obtained from a published public key for a public key encryption system. The preprocessing module may also include instructions for converting the energy function to a factor graph, e.g., as per 207 of process 200. Those of skill in the art will appreciate that any one of acts 201 through 207 and 213 may be performed by a computational device separate to but communicating with system 1000.

While a number of modules and data structures resident in memory 1020 of FIG. 10 have been described, it will be appreciated that at any given time during operation of system 1000, only a portion of these modules and/or data structures may in fact be resident in memory 1020. In other words, there is no requirement that all or a portion of the modules and/or data structures shown in FIG. 10 may be located in memory 1020. In fact, at any given time, all or a portion of the modules and/or data structures described above in reference to memory 1020 of FIG. 10 may, in fact, be stored elsewhere, such as in non-volatile storage 1015, or in one or more external computers; not shown in FIG. 10, that are addressable by computer 1001 across a network (e.g., a wide area network such as the Internet).

Furthermore, while the software instructions have been described above as a series of modules (1021, 1022, 1024, 1026, 1028, 1029, 1030, 1034, and 1036), it will be appreciated by those of skill in the art that the present systems, methods and apparatus are not limited to the aforementioned combination of software modules. The functions carried out by each of these modules described above may be located in any combination of software programs, including a single software program, or a plurality of software programs and there is no requirement that such programs be structured such that each of the aforementioned modules are present and exist as discrete portions of the one or more software programs. Such modules have been described simply as a way to best convey how one or more software programs, operating on computer 1001, would interface with processor 1040 in order to compute solutions to the various problem.

In another aspect of the present systems, methods and apparatus, a number is factored by running a multiplication circuit in reverse. Multiplication circuits, such as arithmetic logic units, are present in many different digital circuits and provide a regular circuit structure for handling bitwise arithmetic operations. See, for example, Jung et al., 2004, *Superconducting Science & Technology* 17, pp. 770-774.

Figure 11:
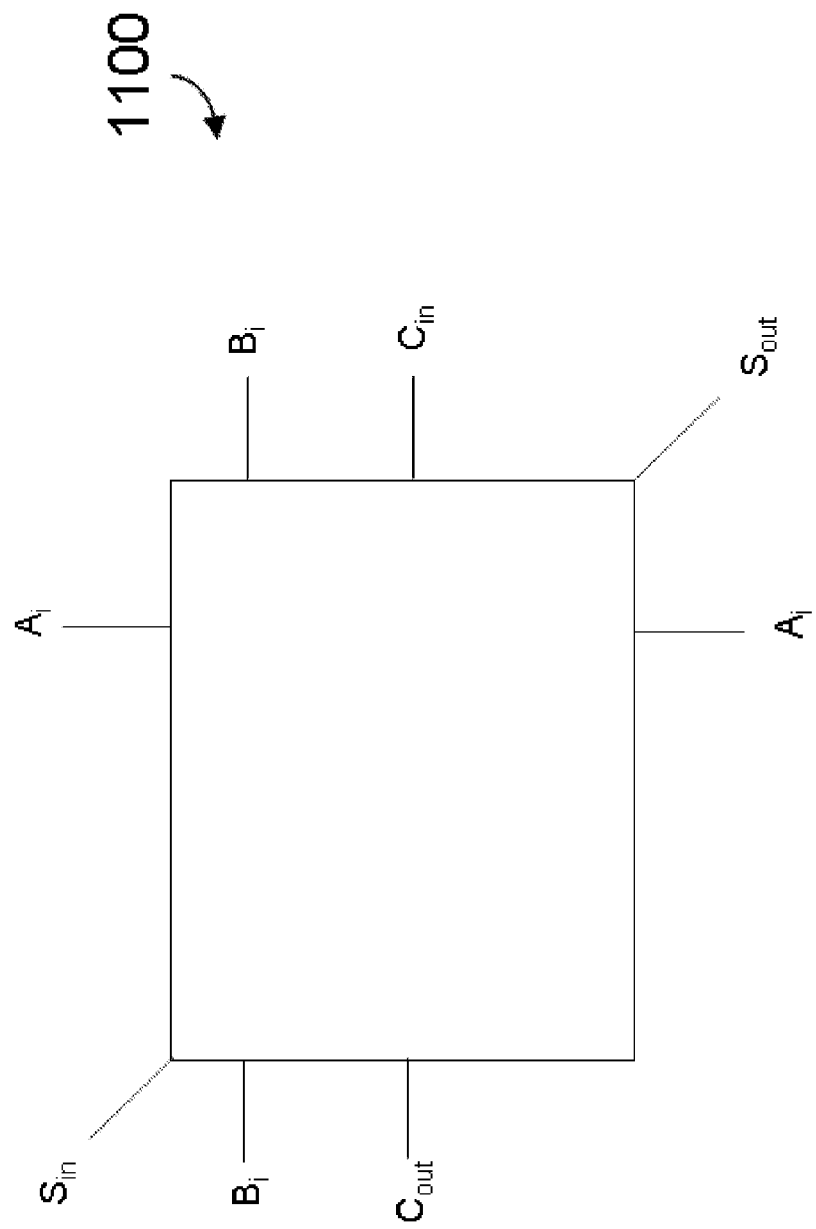
FIG. 11 is a schematic diagram of an embodiment of a bitwise multiplier.

FIG. 11 shows an embodiment of a bitwise multiplier 1100 in a multiplication circuit. The bitwise multiplier comprises 4 inputs ($A_i, B_i, S_{in}, C_{in}$) and 4 outputs ($A_i, B_i, S_{out}, C_{out}$). $A_i$ and $B_i$ are the two bits to be multiplied together, and are also propagated as outputs to other parts of the circuit. $S_{in}$ is the product of the multiplication of the next lowest significant bits, while $C_{in}$ is the carry-over from the multiplication of the next lowest significant bits. $S_{out}$ is the product of the bitwise multiplication of $A_i$ and $B_i$ and $C_{out}$ is the carry over from the multiplication of bits $A_i$ and $B_i$. The outputs are calculated as:

$$S_{out}=(A_i \lor B_i) \oplus S_{in} \oplus C_{in}$$

$$C_{out}=((A_i \lor B_i) \lor S_{in}) \land (C_{in} \lor (A_i \lor B_i)) \land (S_{in} \lor C_{in})$$

where $\lor$ is a logical OR, $\land$ is a logical AND, and $\oplus$ is a logical exclusive OR.

There is normally more than one bitwise multiplier in a multiplication circuit. The binary representation of the numbers to be multiplied are inputted to a chain of bitwise multipliers. The two lowest significant bits are multiplied first, and then the result and carry over are used as additional inputs for the multiplication of the next-highest significant bit.

Figure 12:
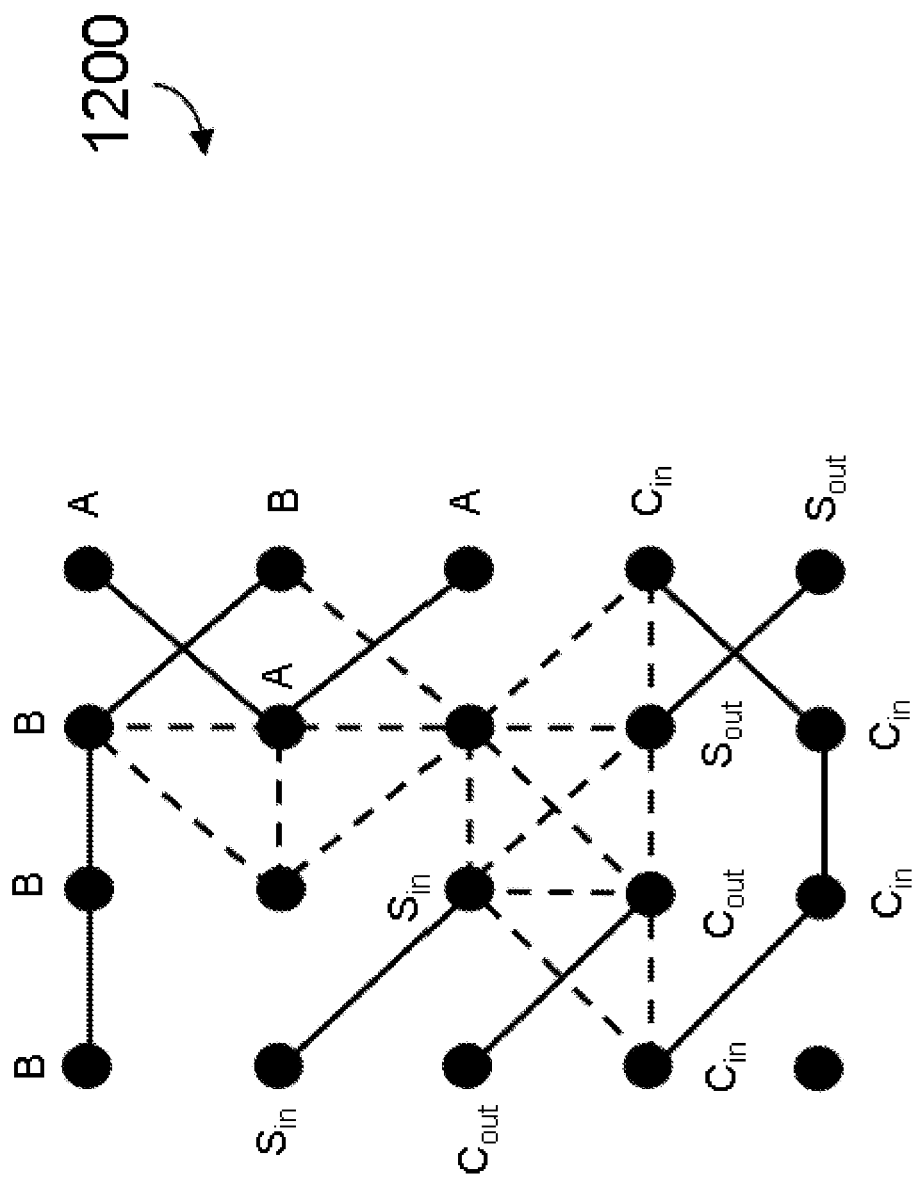
FIG. 12 is a schematic diagram of an embodiment of a bitwise multiplier constructed from qubits.

FIG. 12 illustrates an embodiment of an embedding 1200 of the bitwise multiplier circuit shown in FIG. 11 onto a lattice of quantum devices, such as grid 910 illustrated in FIG. 9B. The dark circles represent qubit nodes, with each qubit representing an input or an output of the bitwise multiplier ($A_i, B_i, S_{in}, C_{in}, A_i, B_i, S_{out}, C_{out}$). Lines, solid or dashed, connecting qubit nodes together represent coupling devices that provide coupling between two qubits. As can be seen, both nearest neighbor and next-nearest neighbor couplings are present. Coupling devices that do not provide any coupling are not shown in FIG. 12, but that does not mean they are not present. Solid lines represent ferromagnetic couplings between qubit nodes that represent the same input or output. Ferromagnetic coupling tends to force qubits to hold the same state, thus ensuring that all qubits representing a particular input or output has the same value.

Dashed lines represent couplings between qubits representing different inputs or outputs. They can either be ferromagnetic or anti-ferromagnetic and are chosen so they properly simulate the behavior of bitwise multiplier 1100.

Embeddings of bitwise multiplier 1100 onto a set of quantum devices are not unique. Embedding 1200 of FIG. 12 is one such embedding on a 5×4 lattice of qubits with associated coupling devices. However, those of skill in the art will appreciate that many variations of the embedding are possible, even within the same lattice. For example, fewer or more qubits and coupling devices may be used for various embeddings onto a given lattice.

Figure 13:
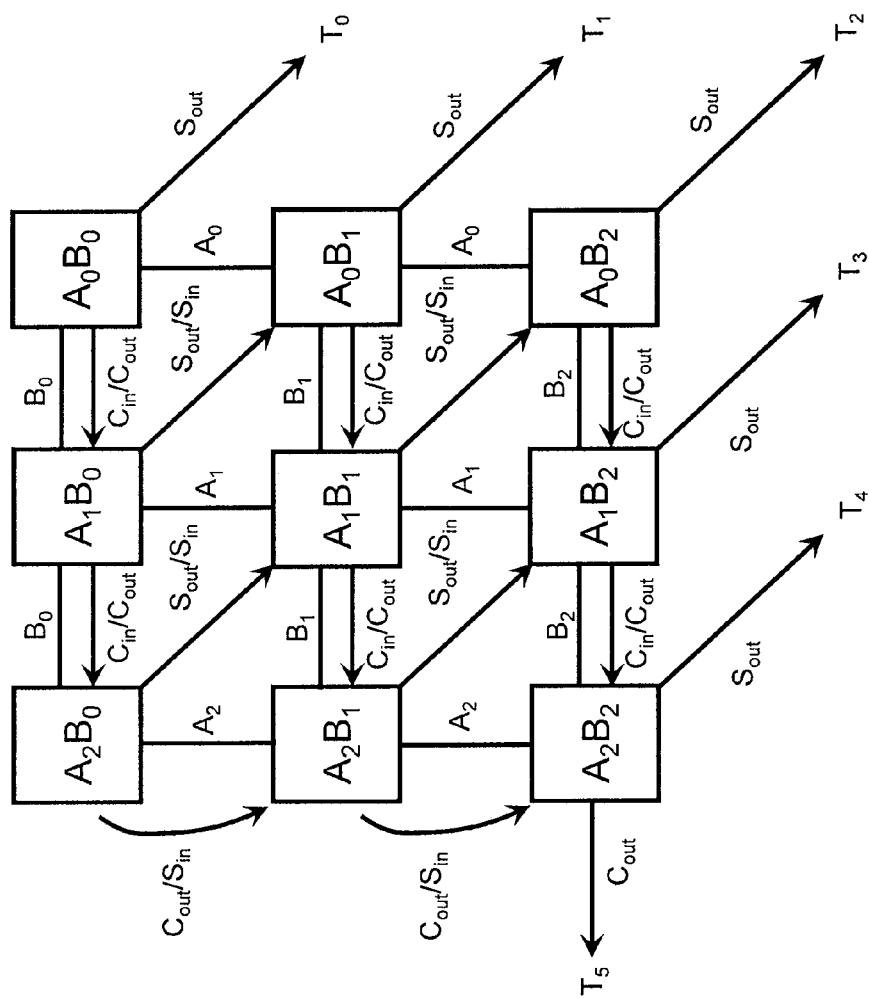
FIG. 13 is a schematic diagram of an embodiment of a multiplication circuit.

A multiplication circuit including bitwise multipliers is typically run in the normal way as to calculate the product of two numbers. However, it is possible using the present systems, methods and apparatus to run a multiplication circuit comprising qubits "backwards", starting from the product, in order to derive the multipliers. FIG. 13 shows a circuit 1300 of interconnected bitwise multipliers, each of which may, in some cases, be similar to the bitwise multiplier of FIG. 11. When connected as shown, circuit 1300 can perform a bitwise multiplication of two integers A and B whose binary representations are labeled $A_i$ and $B_j$, where i and j denote bit positions, with 0 being the lowest significant bit. The output of the product T, expressed in binary, is labeled $T_k$, where k denotes the bit position.

The bitwise multipliers of circuit 1300 may be composed of a plurality of qubits and couplings. When circuit 1300 is constructed from qubits instead of classical bits, the circuit can also be operated in such a way as to determine the multipliers of a product given the binary representation of the product, local bias values for one or more qubits, and one or more coupling values between qubits. For example, circuit 1300 may be embedded onto a set of quantum devices by using the embedding shown in FIG. 12 multiple times and coupling all the bitwise multipliers together as shown. That is, each bitwise multiplier of circuit 1300 may be embedded on a set of quantum devices like embedding 1200 or one of its variants. Then, coupling devices may be used to couple the bitwise multipliers together so that the total embedding behaves like circuit 1300.

Circuit 1300 can evolve from an initial state, where only the $T_k$ are known, to a final state where $A_i$ and $B_j$ are also known. In some cases, a positive local bias applied to a qubit in circuit 1300 corresponds to the bit value 1 and a negative local bias applied to a qubit corresponds to the bit value 0. In such cases, the appropriate local biases are applied to the qubits which represent the bits of product T. Ferromagnetic and anti-ferromagnetic couplings couple qubits together according to the setup of circuit 1300. An evolution of the circuit would then produce possible values for the factors A and B of the product. The answer may be checked to see if A and B are indeed factors of T.

The various embodiments described herein provide systems and methods for solving computational problems. These systems and methods introduce a technique whereby a logic circuit representation of a computational problem is encoded as a discrete optimization problem, such as a QUBO, and this discrete optimization problem is then solved using a computer processor, such as a quantum processor. In some embodiments, the quantum processor may be specifically adapted to facilitate solving such discrete optimization problems by enabling the simultaneous control of multiple annealing schedules.

Throughout this specification and the appended claims, reference is often made to a "logic circuit representation of a computational problem." As previously described, a logic circuit may incorporate a set of logical inputs, a set of logical outputs, and a set of logic gates (e.g., NAND gates, XOR gates, and the like) that transform the logical inputs to the logical outputs through a set of intermediate logical inputs and intermediate logical outputs. A complete logic circuit may include a representation of the input(s) to the computational problem, a representation of the output(s) of the computational problem, and a representation of the sequence of intermediate steps in between the input(s) and the output(s). Thus, for the purposes of the present systems and methods, the computational problem is defined by its input(s), its output(s), and the intermediate steps that transform the input(s) to the output(s) and a "logic circuit representation of the computational problem" accordingly may include all of these elements.

In some embodiments, the structure of a logic circuit stratifies into layers. For example, the logical input(s) may represent a first layer, each sequential logical (or arithmetic) operation may represent a respective additional layer, and the logical output(s) may represent another layer. As previously described, a logical operation may be executed by a single logic gate or by a combination of logic gates, depending on the specific logical operation being executed. Thus, a "layer" in a logic circuit may include a single logic gate or a combination of logic gates depending on the particular logic circuit being implemented.

Figure 14A:
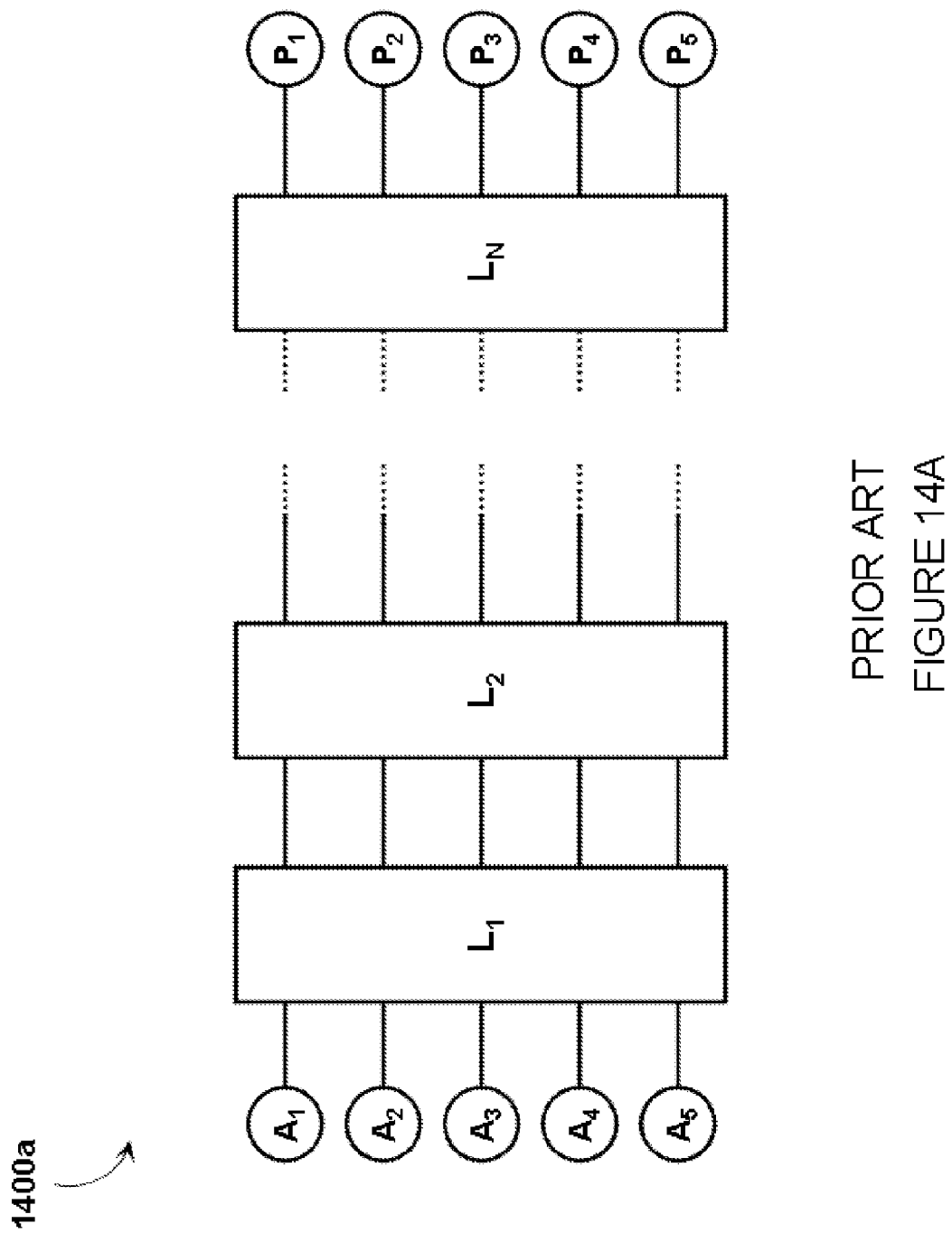
FIG. 14A is a functional diagram of an exemplary logic circuit.

FIG. 14A shows a functional diagram of an exemplary logic circuit 1400a. Logic circuit 1400a may embody a logic circuit representation of a computational problem and includes a set of five inputs $A_1$-$A_5$ that are transformed to a set of five outputs $P_1$-$P_5$ through a set of N layers $L_1$-$L_N$. Those of skill in the art will appreciate that alternative embodiments of logic circuits may include any number of inputs and any number of outputs (e.g., X inputs and Y outputs, where X may or may not be equal to Y) connected through any number of layers and/or logic gates. Furthermore, the number of outputs from any given layer may be different from the number of inputs to that layer, and while layers $L_1$-$L_N$ are all connected in series in logic circuit 1400a, alternative logic circuits may include layers and/or logic gates that are connected in parallel.

Logic circuit 1400a includes a set of five outputs $P_1$-$P_5$ which together may represent a solution to a computational problem. However, for some problems the desired output(s) may already be known, or be restricted to satisfy some known criteria. In such instances, the logic circuit may include an additional component which assesses whether the solution represented by the logic states $P_1$-$P_5$ is acceptable. The additional component may then provide a single output which is TRUE if the solution is acceptable and FALSE if the solution is not acceptable. This is an example of a Boolean circuit.

Figure 14B:
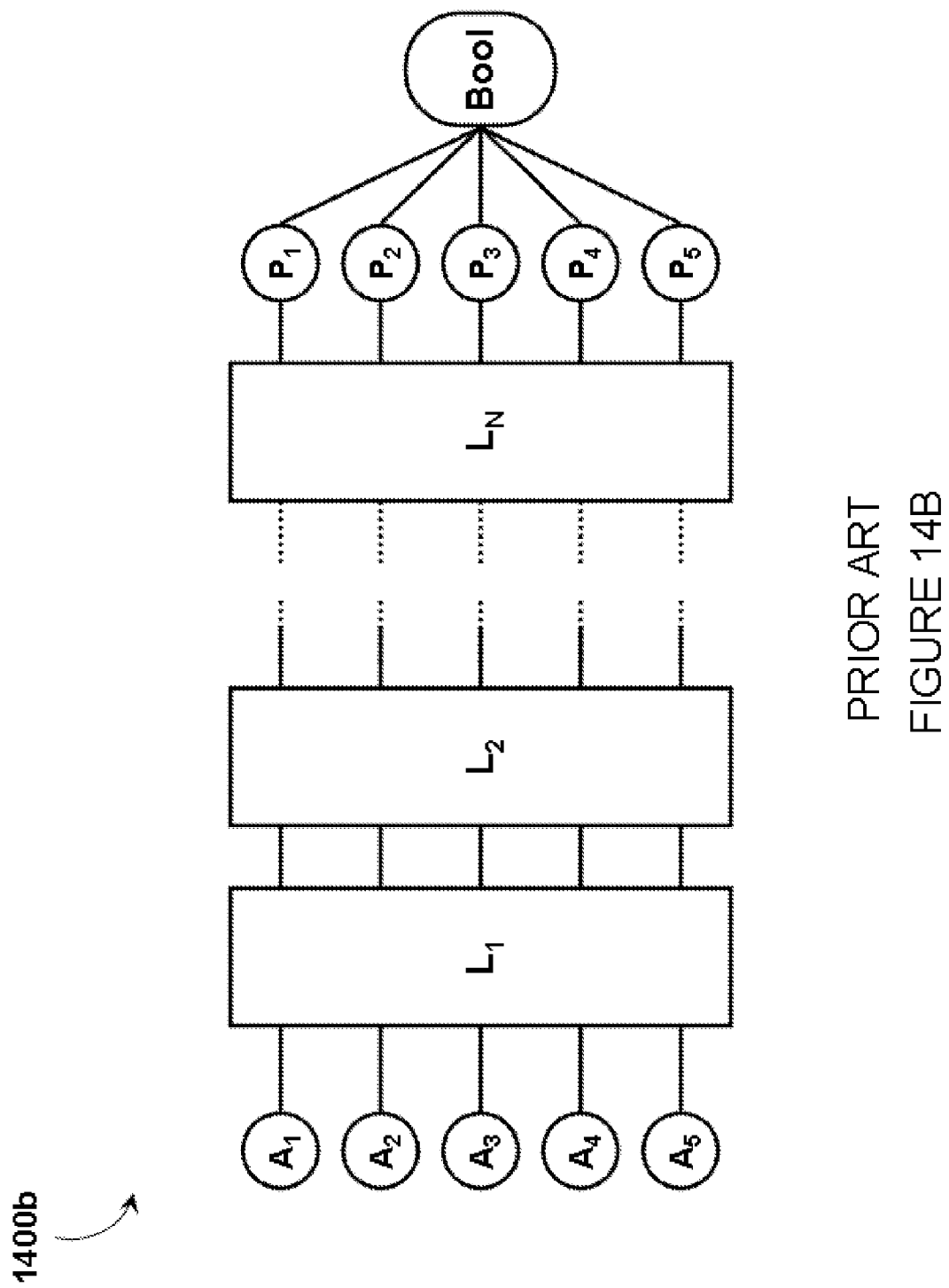
FIG. 14B is a functional diagram of an exemplary Boolean circuit.

FIG. 14B shows a functional diagram of an exemplary Boolean circuit 1400b. Boolean circuit 1400b is similar to logic circuit 1400a from FIG. 14A, except that Boolean circuit 1400b is adapted to provide a single Boolean output Bool from intermediate logical outputs $P_1$-$P_5$. If intermediate logical outputs $P_1$-$P_5$ represent an acceptable solution, then the single output Bool is TRUE; otherwise, the single output Bool is FALSE.

The present systems and methods introduce novel techniques for solving computational problems by encoding a logic circuit representation of the original computational problem as a discrete optimization problem. Solving the discrete optimization problem then effectively executes the logic circuit to solve the original computational problem. The methods described herein may be implemented using any form of computer processor; however, the discrete optimization problems that generally result from this approach are very hard and often cannot be solved using known classical solvers. These discrete optimization problems are particularly well-suited to be solved using a quantum processor, or more generally a computer processor that harnesses quantum effects to achieve computation. In some embodiments, the discrete optimization problem is cast as a QUBO problem (where energy minimization is sought) by configuring the qubits and couplers in a quantum processor (e.g., defining the problem Hamiltonian in an implementation of quantum annealing) such that there is a positive energy penalty introduced when a particular combination of intermediate input(s) and intermediate output(s) of a logic gate violates the truth table of the gate. For example, an AND gate having two intermediate inputs $x_1$ and $x_2$ and one intermediate output z may be represented by an objective function such as:

$$H_{AND}(x_1,x_2;z)=x_1x_2-2(x_1+x_2)z+3z$$

where the function is minimized (i.e., $H_{AND}$=0) when the parameters $x_1$, $x_2$, and z are set such that the truth table of the AND gate is obeyed and a positive energy penalty is introduced (e.g., H>0) when the truth table of the AND gate is violated. In the case of an AND gate, this means that $H_{AND}$(0,0,0)=$H_{AND}$(0,1,0)=$H_{AND}$(1,0,0)=$H_{AND}$(1,1,1)=0, and $H_{AND}(x_1,x_2;z)$>0 for all other combinations of $x_1$, $x_2$, and z. Similarly, the OR gate may, for example, be represented by an objective function such as:

$$H_{OR}(x_1,x_2;z)=H_{AND}(1-x_1,1-x_2;1-z)$$

and the NOT gate may, for example, be represented by an objective function such as:

$$H_{NOT}(x;z)=2xz-x-z+1$$

From the above, those of skill in the art will appreciate how a similar objective function may be defined for any logic gate. Thus, in some embodiments, the QUBO problem representing a logic circuit is essentially comprised of a plurality of miniature optimization problems, where each gate in the logic circuit corresponds to a particular miniature optimization problem. Each miniature optimization problem is minimized (i.e., solved) when the inputs $x_1$, $x_2$ and the output z are set such that the truth table of the particular gate to which the miniature optimization problem corresponds is obeyed. In some embodiments, the values of the inputs $x_1$, $x_2$ and the output z may each correspond to the value (i.e., state) of a respective qubit in a quantum processor.

Figure 15A:
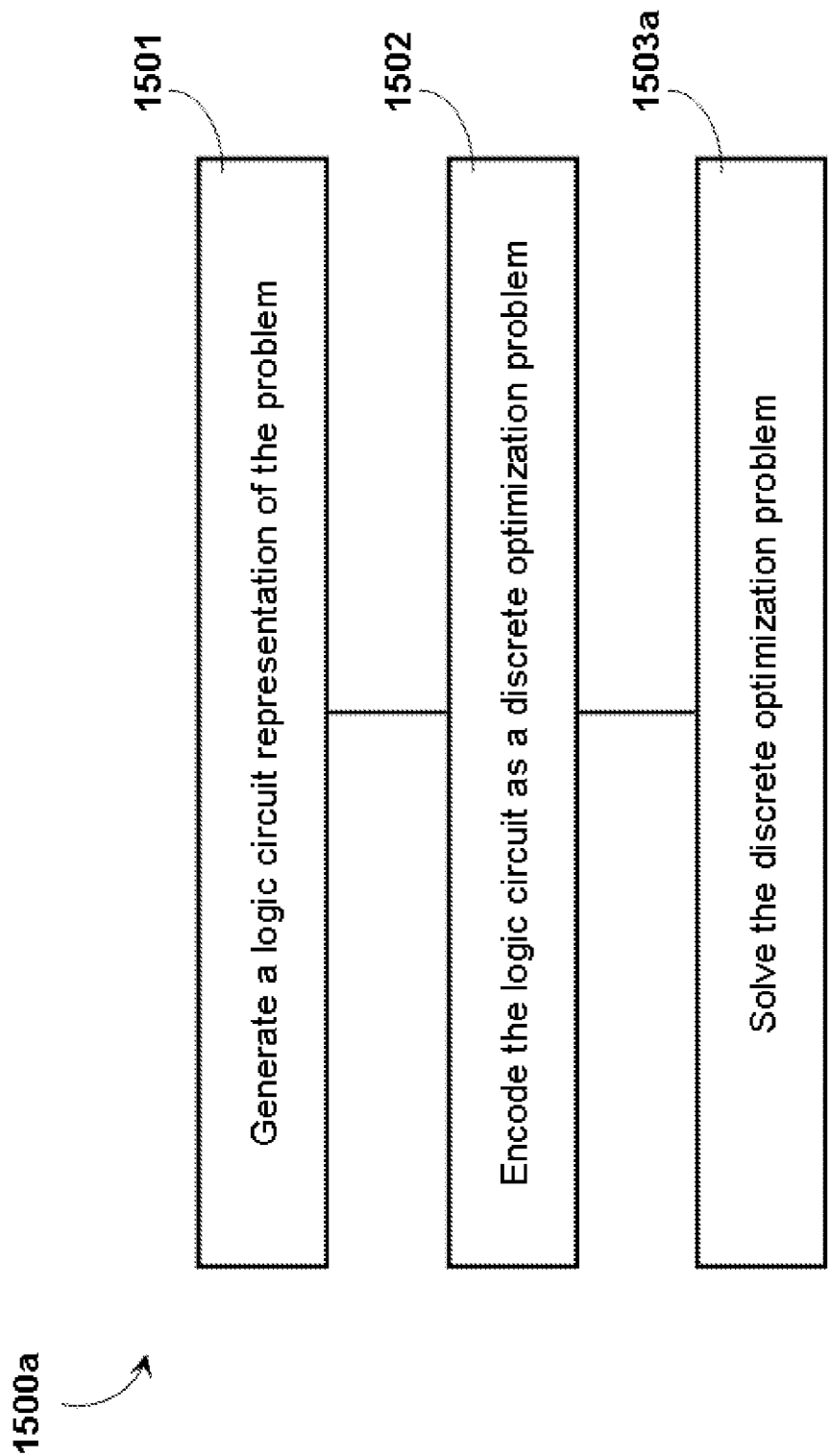
FIG. 15A is a flow-diagram of an embodiment of a method for solving a computational problem in accordance with the present systems and methods.

FIG. 15A shows a flow diagram of an embodiment of a method 1500a for solving a computational problem in accordance with the present systems and methods. Method 1500a includes three acts 1501-1503a, though those of skill in the art will appreciate that alternative embodiments may omit certain acts and/or include additional acts. At 1501, a logic circuit representation of the computational problem is generated. Exemplary logic circuit representations are described in FIGS. 14A and 14B and these may be generated using systems and methods that are known in the art. For example, a logic circuit representation of the computational problem may be generated using a classical digital computer processor. In this case, the logic circuit representation of the computational problem may be stored in at least one computer- or processor-readable storage medium, such as a computer-readable non-transitory storage medium or memory (e.g., volatile or non-volatile). For computational problems of the class NP, the logic circuit representation will typically be polynomially-sized. At 1502, the logic circuit representation of the computational problem is encoded as a discrete optimization problem. This encoding may be achieved, for example, using a classical digital computer processor. In this case, the discrete optimization problem may be stored in at least one computer- or processor-readable storage medium, such as a computer-readable non-transitory storage medium or memory (e.g., volatile or non-volatile). In some embodiments, the logic circuit may be encoded as an optimization objective, or a set of optimization objectives, so that bit strings which satisfy the logic circuit have energy of zero and all other bit strings have energy greater than zero. At 1503a, the discrete optimization problem is solved, thereby establishing a solution to the original computational problem. In some embodiments, the discrete optimization problem may be solved using a computer processor, such as a quantum processor. Solving the discrete optimization problem may then involve, for example, evolving the quantum processor to the configuration that minimizes the energy of the system in order to establish a bit string that satisfies the optimization objective(s).

In some embodiments, encoding the logic circuit as a discrete optimization problem at 1502 of method 1500a enables a particular approach to solving the discrete optimization problem at 1503a. This approach is described in FIG. 15B.

Figure 15B:
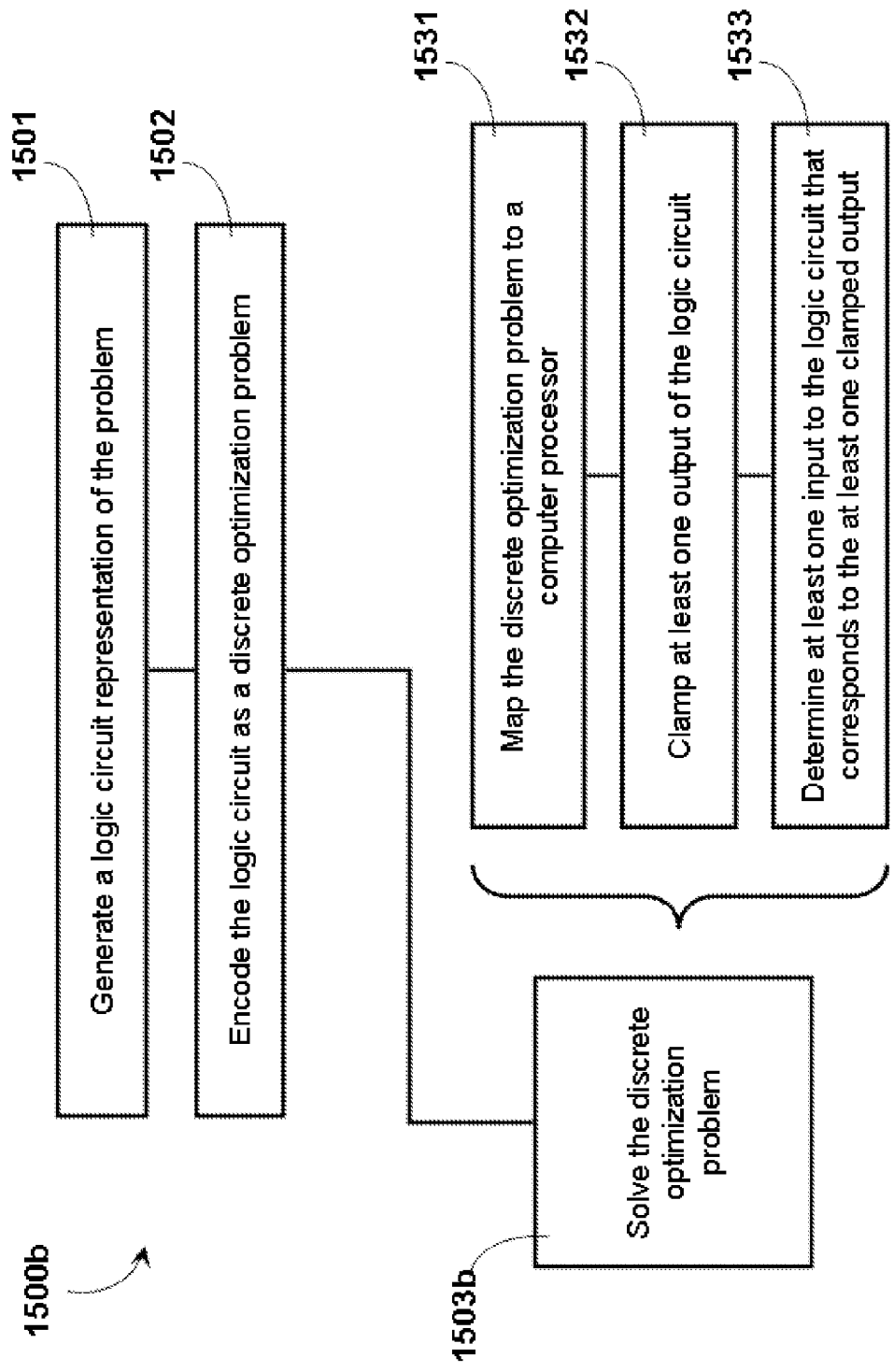
FIG. 15B is a flow-diagram of an embodiment of another method for solving a computational problem in accordance with the present systems and methods.

FIG. 15B shows a flow-diagram of an embodiment of a method 1500b for solving a computational problem in accordance with the present systems and methods. Method 1500b is similar to method 1500a from FIG. 15A and includes three main acts 1501-1503b. Acts 1501-1503b of method 1500b are the same, respectively, as acts 1501-1503a of method 1500a, except that in method 1500b act 1503b is further broken down to include three acts 1531-1533. That is, in some embodiments the act of solving the discrete optimization problem 1503b may itself include three acts 1531-1533. At 1531, the discrete optimization problem is mapped to a computer processor. In some embodiments, the computer processor may include a quantum processor and mapping the discrete optimization problem to the computer processor may include programming the elements (e.g., qubits and couplers) of the quantum processor. Mapping the discrete optimization problem to the computer processor may include the discrete optimization problem in at least one computer or processor-readable storage medium, such as a computer-readable non-transitory storage medium or memory (e.g., volatile or non-volatile). At 1532, at least one logical output is clamped. Throughout this specification and the appended claims, the term "clamped" is used to describe a variable that is held substantially fixed while the discrete optimization problem is solved, thereby forcing all of the other variables to adjust to accommodate the substantially fixed variable. Thus, to "clamp" an output means to program that output such that its state remains substantially fixed while the discrete optimization problem is solved. In the exemplary objective function defining the AND gate $H_{AND}(x_1, x_2; z)$ given above, clamping the output means substantially fixing the value of z. In an application of quantum annealing, the qubit corresponding to output z may be programmed to maintain a substantially fixed state while the qubits corresponding to inputs $x_1$ and $x_2$ may be evolved to determine respective states which minimize the objective function $H_{AND}$, where the objective function $H_{AND}$ is encoded, at least in part, by the programmable couplings between the qubits representing the $x_1$, $x_2$, and z variables. For act 1532, the at least one logical output that is clamped may be an output of the complete logic circuit representation, or it may be an intermediate logical output of a particular logical operation and/or a particular logic gate. At 1533, the discrete optimization problem is solved by determining at least one logical input to the logic circuit that corresponds to the at least one clamped output.

In traditional problem-solving methods, the inputs to the problem are effectively clamped because they generally remain fixed for a given problem instance while the corresponding outputs are determined. However, in some embodiments of the present systems and methods it is the outputs of the problem (or the intermediate output(s) of a particular logical operation and/or logic gate) that are clamped so that solving the discrete optimization problem involves determining the inputs that correspond to the clamped outputs. Thus, some embodiments of the present systems and methods describe problem-solving techniques in which a logic circuit representation of the problem is established and then the logic circuit is effectively executed in reverse, or in an undirected fashion, to determine which inputs correspond to a given set of outputs. This problem-solving approach is illustrated in FIGS. 16A and 16B.

Figure 16A:
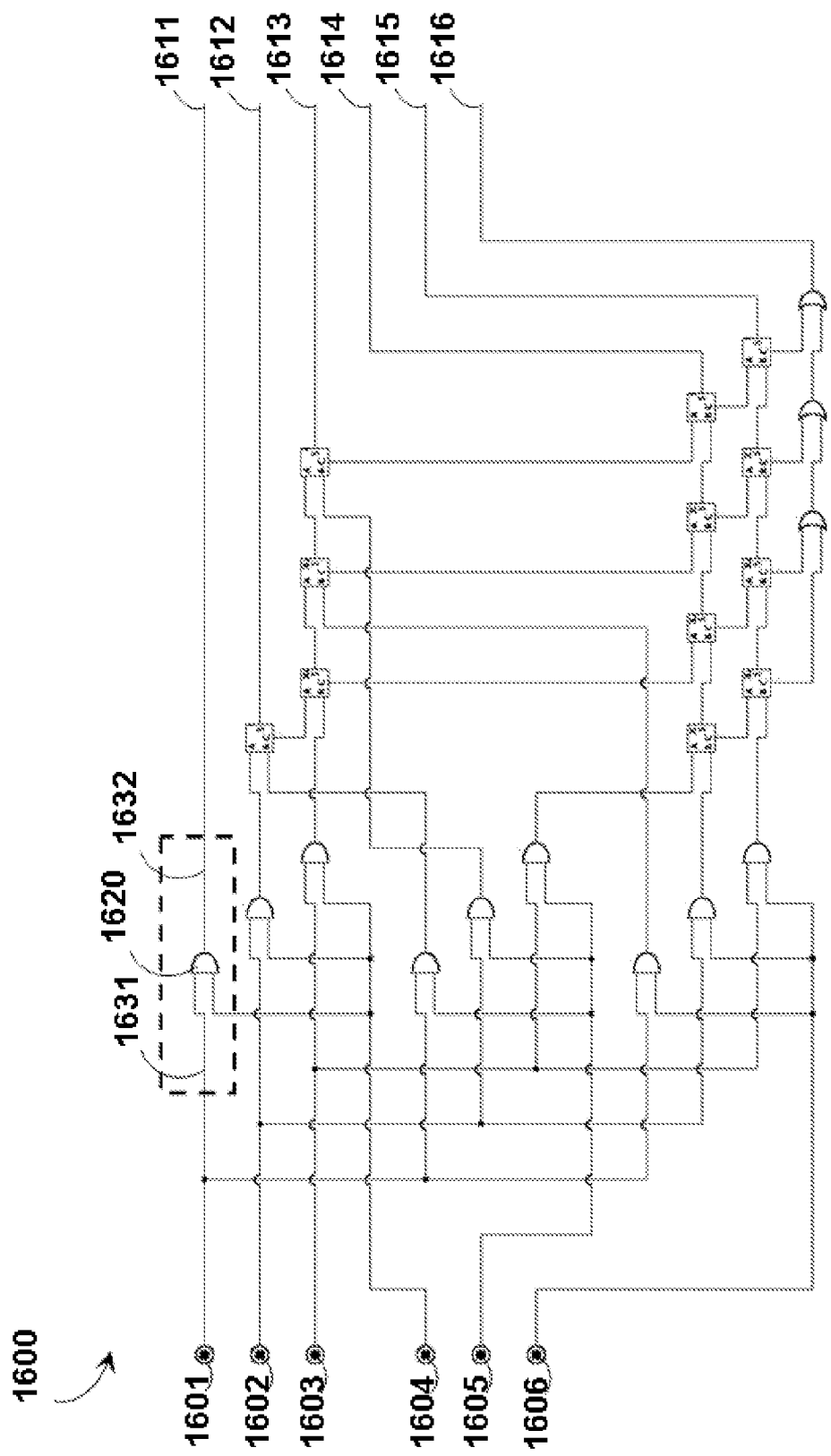
FIG. 16A is a schematic diagram of an embodiment of a logic circuit representation of a computational problem in accordance with the present systems and methods.

FIG. 16A is a schematic diagram of a logic circuit representation 1600 of a computational problem. Circuit 1600 includes a set of six logical inputs 1601-1606 and six logical outputs 1611-1616, though those of skill in the art will appreciate that an alternative logic circuit may incorporate any number of logical inputs and any number of logical outputs. Logical inputs 1601-1606 are transformed to logical outputs 1611-1616 through a plurality of logic gates 1620 (only one called out in the Figure to reduce clutter). Each logic gate 1620 has a corresponding set of at least one intermediate logical input 1631 (only one called out in the Figure) and at least one intermediate logical output 1632 (only one called out in the Figure). In some instances (as is the case for the specific logic gate labeled as 1620), an intermediate logical input (e.g., 1631) may correspond to an input (e.g., 1601) to the complete circuit 1600 and/or an intermediate logical output (e.g., 1632) may correspond to an output (e.g., 1611) from the complete circuit 1600. Circuit 1600 represents an embodiment of the general method 1500a described in FIG. 15A. In accordance with the present systems and methods, circuit 1600 may be mapped to a discrete optimization problem, such as a QUBO problem, which may then be stored and operated on in at least one computer or processor-readable storage medium, such as a computer-readable non-transitory storage medium or memory (e.g., volatile or non-volatile).

Figure 16B:
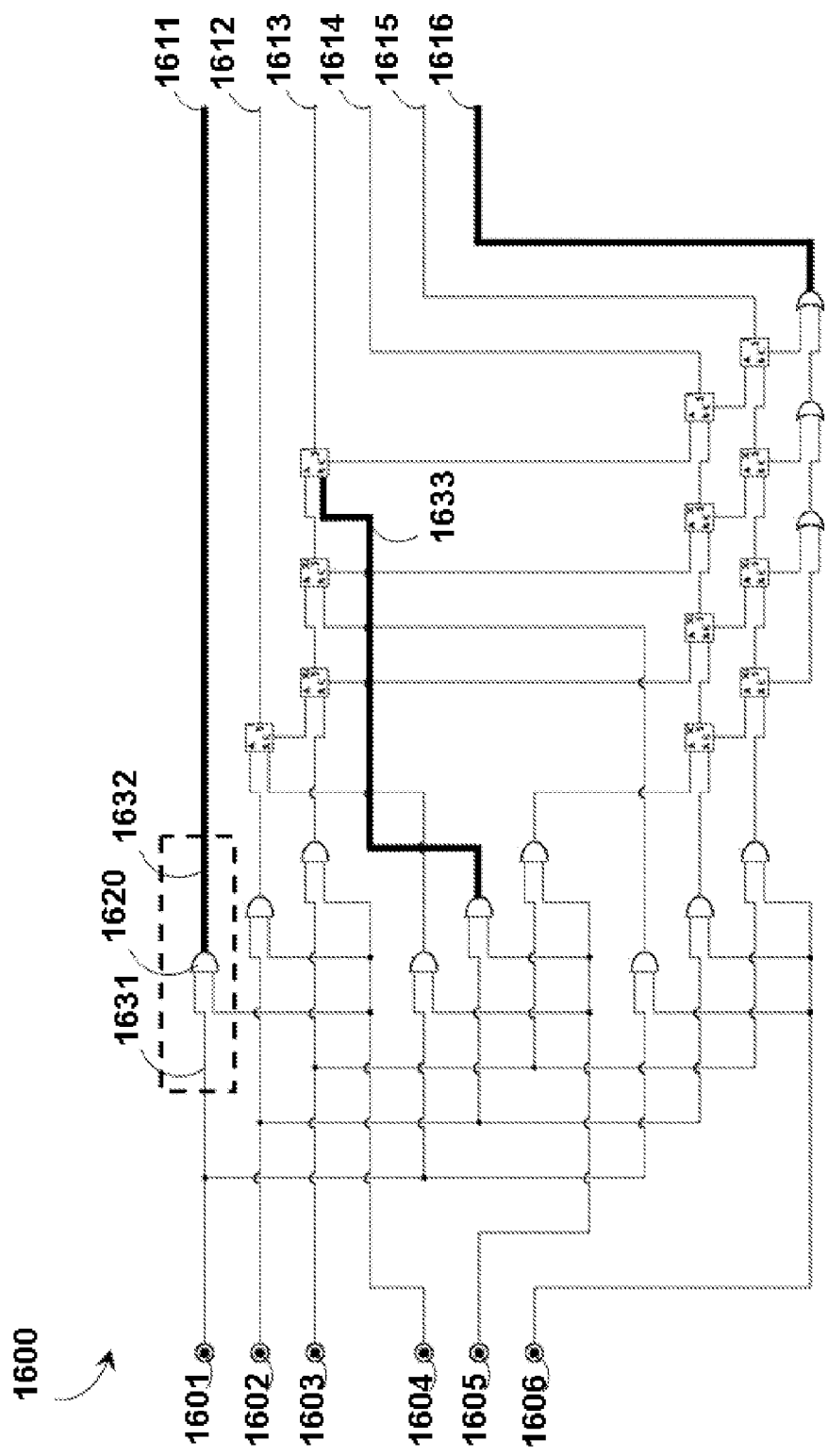
FIG. 16B is a schematic diagram of the same embodiment of a logic circuit representation as depicted in FIG. 16A, only FIG. 16B further illustrates the clamping of specific logical outputs in accordance with the present systems and methods.

FIG. 16B is a schematic diagram of the same logic circuit representation 1600 as depicted in FIG. 16A, only FIG. 16B further illustrates the clamping of specific logical outputs. In FIG. 16B, logical outputs 1611 and 1616, as well as intermediate logical output 1633, have all been clamped—meaning that each has been fixed in a specific state (i.e., either 1 or 0). This clamping is illustrated by thickening of the lines corresponding to outputs 1611, 1616, and 1633. Depending on the application, simultaneously clamped outputs (e.g., 1611, 1616, and 1633) may be clamped in the same state (e.g., 0) or they may each be clamped in any state (e.g., any combination of 0s and 1s). While FIG. 16A represents an embodiment of general method 1500a from FIG. 15A, FIG. 16B is an embodiment of method 1500b from FIG. 15B. Thus, in solving logic circuit 1600 with clamped variables 1611, 1616, and 1633 as illustrated in FIG. 16B, a configuration having a set of inputs 1601-1606 and remaining outputs 1612-1615 that correspond to the clamped variables 1611, 1616 and 1633 is determined. A particularly useful application of this technique is the case where the logic circuit representation of the computational problem is a Boolean circuit designed, for example, to verify a solution to the computational problem.

FIG. 17 shows a flow-diagram of an embodiment of a method 1700 for solving a computational problem in accordance with the present systems and methods. Method 1700 includes four acts 1701-1704, though those of skill in the art will appreciate that alternative embodiments may omit certain acts and/or include additional acts. At 1701, a Boolean circuit that verifies a solution to the computational problem is generated. A Boolean circuit typically has a single output that may be one of two states: either TRUE or FALSE. In some embodiments, the Boolean circuit may test the solution to the computational problem and output TRUE if the solution is acceptable or FALSE is the solution is not acceptable. The Boolean circuit may be generated, for example, using a classical digital computer processor. In this case, the Boolean circuit may be stored in at least one computer or processor-readable storage medium, such as a computer-readable non-transitory storage medium or memory (e.g., volatile or non-volatile). At 1702, the Boolean circuit is encoded as a discrete optimization problem in a manner similar to that described for act 1502 of methods 1500a and 1500b. At 1703, the output of the Boolean circuit is clamped. Depending on the nature of the problem, the output may be clamped as TRUE or it may be clamped as FALSE. In embodiments that are implemented on a quantum processor, this means that the qubit or qubits that represent the Boolean output are programmed in a substantially fixed state corresponding to either TRUE or FALSE. At 1704, the discrete optimization problem is solved to effectively execute the Boolean circuit in reverse and determine at least one input that corresponds to the clamped output. The Boolean circuit may be solved, for example, by an operation of a quantum processor. In this case, the Boolean circuit may be stored and operated on in at least one computer or processor-readable storage medium, such as a computer-readable non-transitory storage medium or memory (e.g., volatile or non-volatile).

An example of an application where it may be desirable to clamp the output of the Boolean circuit as TRUE is factoring. In this case, the Boolean circuit may represent a multiplication circuit corresponding to the factoring problem, and clamping the Boolean output as TRUE enables the inputs (e.g., factors) that correspond to the product to be determined. An example of an application where it may be desirable to clamp the output of the Boolean circuit as FALSE is software verification and validation (also known as software quality control). In this case, the code embodying a piece of software or program may be represented by a Boolean logic circuit, where the output of the circuit (and/or any particular intermediate logical operation and/or logic gate) will be TRUE if the code has no errors (i.e., "bugs"). Clamping the output of the circuit (or intermediate output of a particular logical operation and/or logic gate) as FALSE then determines which inputs, if any, may produce the FALSE output. If such inputs exist, they may be identified as bugs in the code. Those of skill in the art will appreciate that the code embodying a piece of software may typically be stored on a physical medium, such as at least one computer- or processor-readable storage medium and/or a non-transitory storage medium or memory (e.g., volatile or non-volatile).

As previously described, methods 1500a, 1500b, and 1700 are well-suited to be implemented using a quantum processor. Furthermore, these methods are particularly well-suited to be executed using an adiabatic quantum processor and/or a quantum processor that implements quantum annealing. Quantum annealing and/or adiabatic quantum computation may be implemented in a variety of different ways, but the end goal is generally the same: find a low-energy state, such as a ground state, of a system Hamiltonian where the system Hamiltonian encodes a computational problem and the low-energy state represents a solution to the computational problem. Approaches to meeting this goal generally involve evolving the elements of the quantum processor by the application of a dynamic annealing signal. Typically, a single global annealing signal line is coupled to all of the qubits in the quantum processor such that the same dynamic waveform is applied to every qubit. This ensures uniformed timing across the processor and also minimizes the number of physical lines required to evolve the system.

Figure 18:
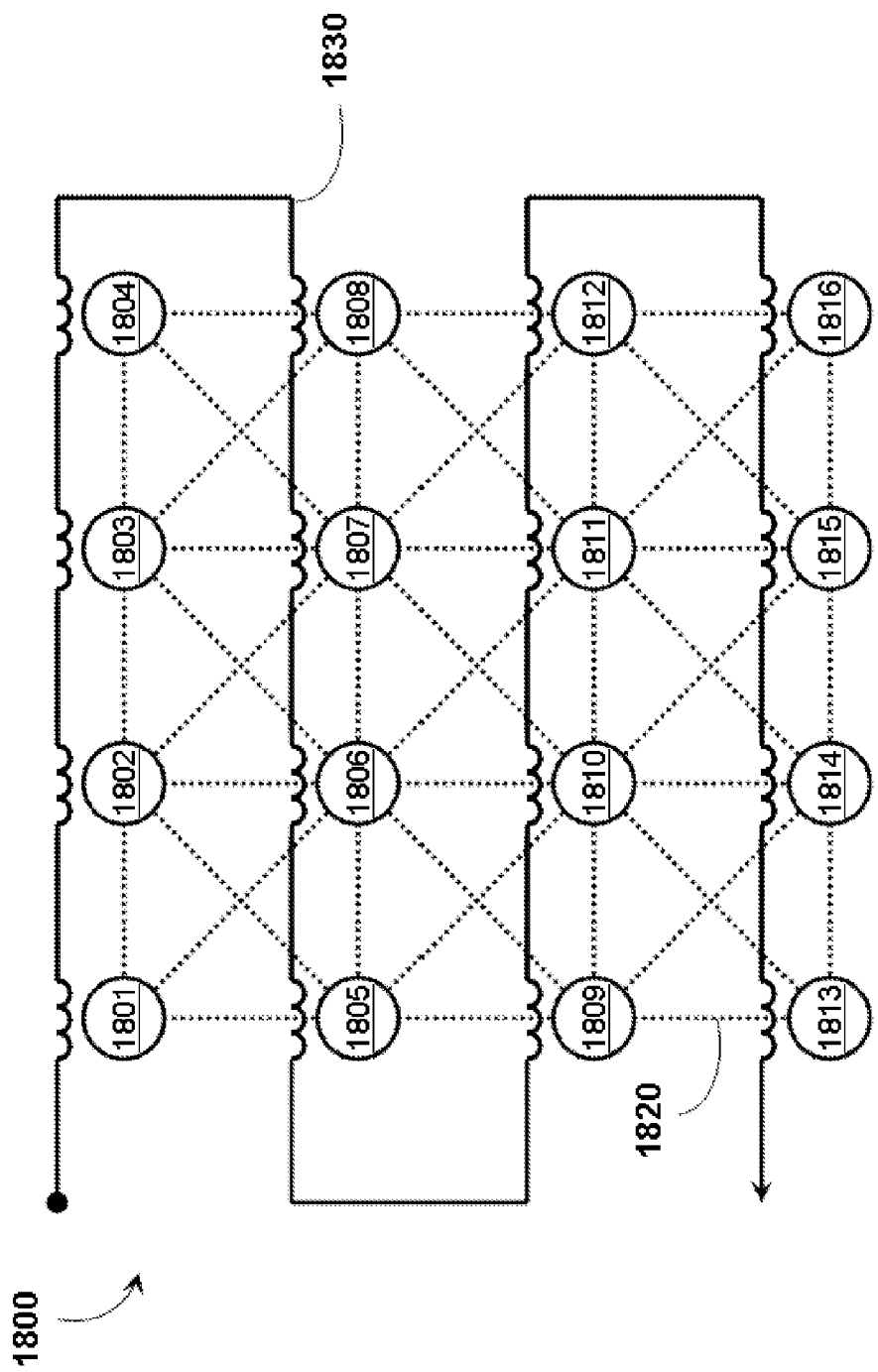
FIG. 18 is a schematic diagram of an embodiment of an exemplary quantum processor implementing a single global annealing signal line.

FIG. 18 shows a schematic diagram of an exemplary quantum processor 1800 implementing a single global annealing signal line 1830. Quantum processor 1800 includes sixteen qubits 1801-1816 and forty-two couplers 1820 (only one called out in the Figure) in a lattice architecture embodying nearest neighbor and next-nearest neighbor coupling. Global annealing signal line 1830 is used to couple the same dynamic annealing waveform to each of qubits 1801-1816. Those of skill in the art will appreciate that the number of qubits and couplers, as well as the nearest neighbor and next-nearest neighbor coupling architecture, in quantum processor 1800 are all used for illustrative purposes and that a quantum processor may implement any number of qubits and couplers arranged according to any coupling architecture. Qubits 1801-1816 and couplers 1820 are capable of storing and performing operations on computer-readable information; thus, for the purposes of the present systems and methods, a quantum processor (e.g., 1800) includes computer- or processor-readable storage media and/or non-transitory storage media or memory (e.g., volatile or non-volatile).

In some embodiments, the various methods described herein (e.g., methods 1500a, 1500b, and 1700) may be implemented on a quantum processor having a single global annealing signal line, such as quantum processor 1800. In other embodiments, however, the various methods described herein may benefit from a quantum processor that includes multiple annealing signal lines each capable of administering a unique dynamic waveform to a respective set of qubits in the processor.

Figure 19:
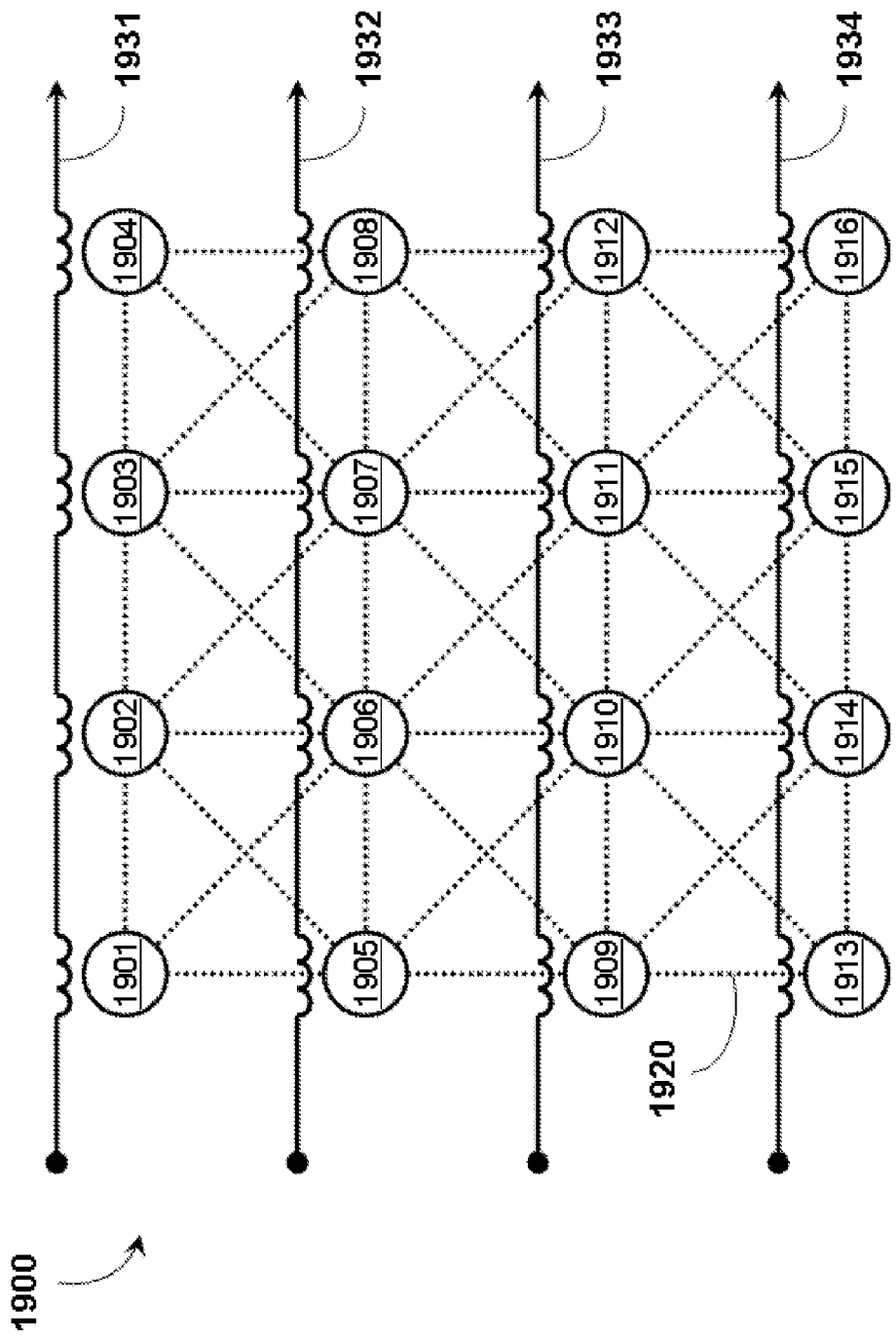
FIG. 19 is a schematic diagram of an embodiment of a quantum processor that incorporates multiple annealing signal lines in accordance with the present systems and methods.

FIG. 19 shows a schematic diagram of an embodiment of a quantum processor 1900 that incorporates multiple annealing signal lines 1931-1934. Quantum processor 1900 includes sixteen qubits 1901-1916 and forty-two couplers 1920 (only one called out in the Figure) in a lattice architecture embodying nearest neighbor and next-nearest neighbor coupling. The four global annealing signal lines 1931-1934 are each arranged to couple a unique dynamic annealing waveform to the qubits in a respective row. Those of skill in the art will appreciate that the number of qubits, couplers, and annealing signal lines, as well as the coupling architecture and the layout of the annealing signal lines in quantum processor 1900, are all used for illustrative purposes and that a quantum processor may implement any number of qubits, couplers, and annealing signal lines arranged according to any designer's preferences.

In embodiments in which the structure of a logic circuit (such as the logic circuit representations from methods 1500a, 1500b, and 1700) stratifies into layers (for example, with the logical input(s) representing a first layer, each sequential logical operation representing a respective additional layer, and the logical output(s) representing another layer), each layer may be embodied by a respective set of qubits in the quantum processor. For example, in quantum processor 1900 each row of qubits may be programmed to represent a respective layer of a logic circuit. That is, qubits 1901-1904 may be programmed to represent the inputs to a logic circuit, qubits 1905-1908 may be programmed to represent a first logical operation (executed by either one or a plurality of logic gates), qubits 1909-1912 may be programmed to represent a second logical operation (similarly executed by either one or a plurality of logic gates), and qubits 1913-1916 may be programmed to represent the outputs of the logic circuit. With various sets of qubits representing various layers of the problem, it can be advantageous to enable independent dynamic control of each respective set. For example, if a serial logic circuit (such as logic circuit 1400*a* from FIG. 14A) is mapped to quantum processor 1900, then the logical operation represented by qubits 1909-1912 may receive, as inputs, the outputs of the logical operation represented by qubits 1905-1908. It follows that the set of qubits 1909-1912 may advantageously be annealed after the set of qubits 1905-1908, and therefore a separate dynamic annealing signal line (i.e., lines 1933 and 1932, respectively) may be necessary to control each of the two sets of qubits.

Those of skill in the art will appreciate that the encoding of a logic circuit representation of a computational problem as a discrete optimization problem, and the subsequent mapping of the discrete optimization problem to a quantum processor, may result in any number of layers involving any number of qubits per layer. Furthermore, such a mapping may implement any scheme of inter-qubit coupling to enable any scheme of inter-layer coupling (i.e., coupling between the qubits of different layers) and intra-layer coupling (i.e., coupling between the qubits within a particular layer). The layout and number of elements presented in quantum processor 1900 are used for illustrative purposes only and are in no way intended to limit the present system and methods.

The concept of implementing multiple annealing signal lines has previously been introduced (to facilitate system calibration) in PCT Patent Application Serial No. PCT/US2009/044537 published as PCT Patent Publication 2009-143166, where at least two annealing signal lines are implemented in such a way that no two coupled qubits are both coupled to the same annealing signal line. Conversely, in the present systems and methods it is preferred if the set of qubits that are controlled by a given annealing signal line includes at least two coupled qubits, because the set of qubits that are controlled by a given annealing signal line may correspond to a particular layer of a logic circuit representation and thus there will likely be at least some coupling between the at least two qubits that are in the same layer. However, the implementation of the teachings of PCT Application Serial No. PCT/US2009/044537 published as PCT Patent Publication 2009-143166 does not necessarily exclude the present systems and methods. Since multiple annealing signal lines may be programmed to carry the same annealing signal, any set of qubits that are coupled to the same annealing signal line may similarly be coupled to a pair of interdigitated annealing signal lines.

The application of multiple independently-controlled dynamic annealing signals in accordance with the present systems and methods enables a vastly increased variety and complexity of annealing schedules. This is illustrated in FIGS. 20-22.

Figure 20:
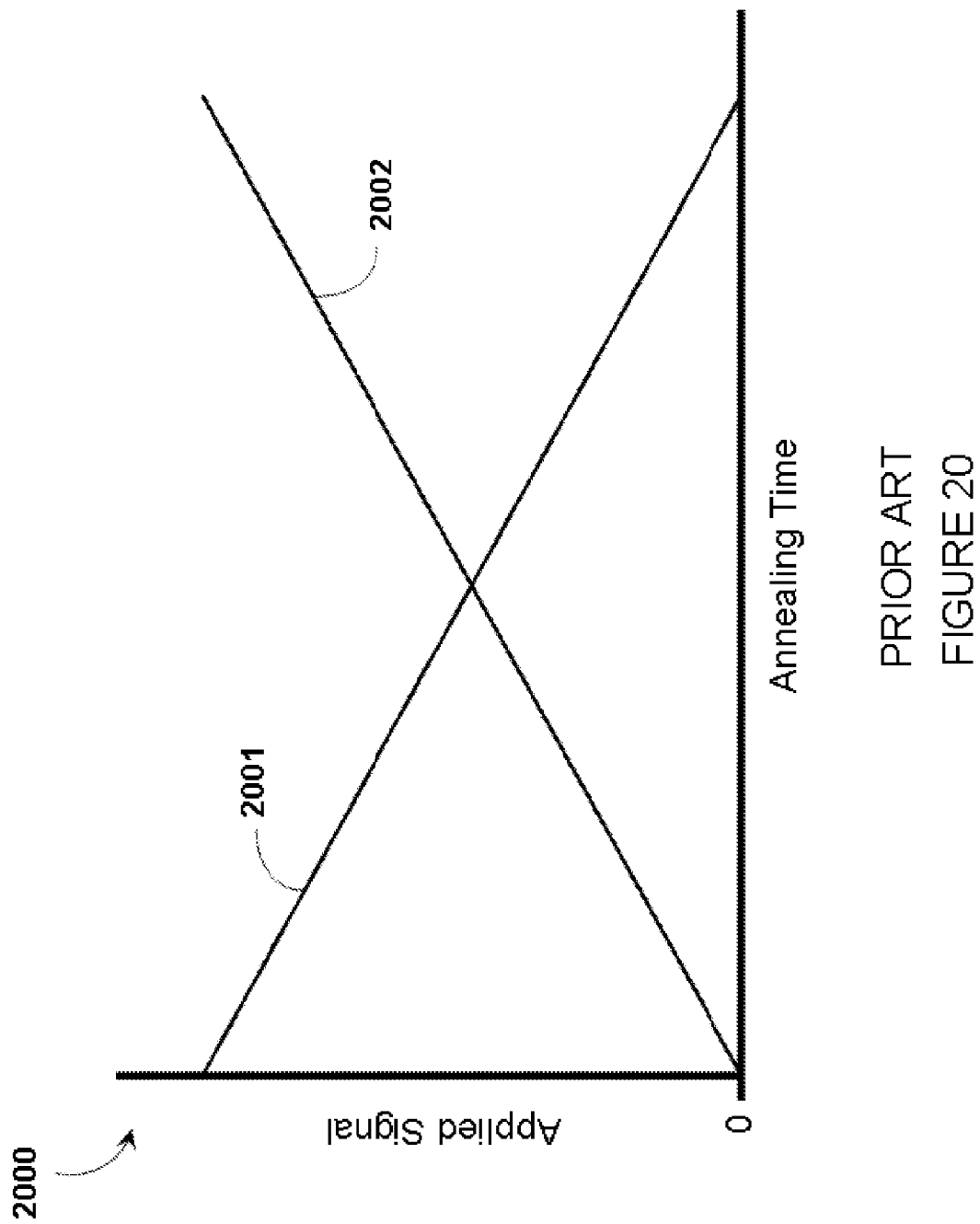
FIG. 20 is an approximate graph showing an exemplary annealing schedule for a system that implements a single global annealing signal line.

FIG. 20 is an approximate graph showing an exemplary annealing schedule 2000 for a system that implements a single global annealing signal line. The global annealing signal is represented by line 2001 and is typically applied to all qubits in the quantum processor. In this example, the global annealing signal 2001 starts at a maximum value and then gradually reduces to a minimum value (e.g., zero) by the end of the schedule. In conjunction with the annealing signal 2001, a set of control signals 2002 are typically applied to each qubit to contribute at least some of the terms of the problem Hamiltonian. These control signals typically begin at a minimum value (e.g., zero) and, as the annealing signal 2001 is ramped down, are typically ramped up to a maximum value by the end of the schedule. Annealing schedule 2000 is a common approach for systems that implement only a single global annealing signal line its versatility is limited by the fact that the same dynamic annealing waveform must be applied to all qubits.

Figure 21:
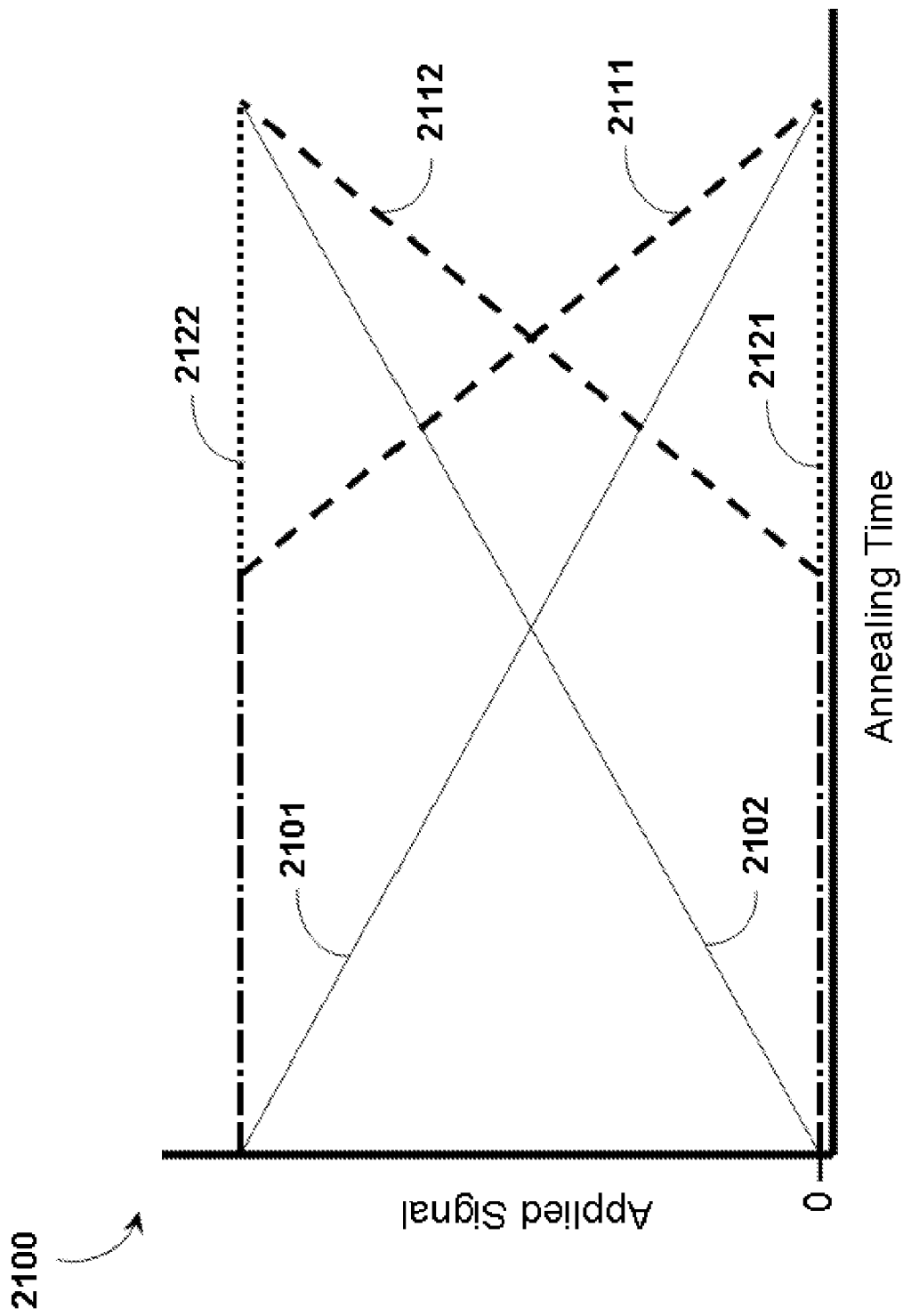
FIG. 21 is an approximate graph showing an exemplary annealing schedule for a system that implements multiple independently-controlled annealing signal lines in accordance with the present systems and methods.
Figure 22:
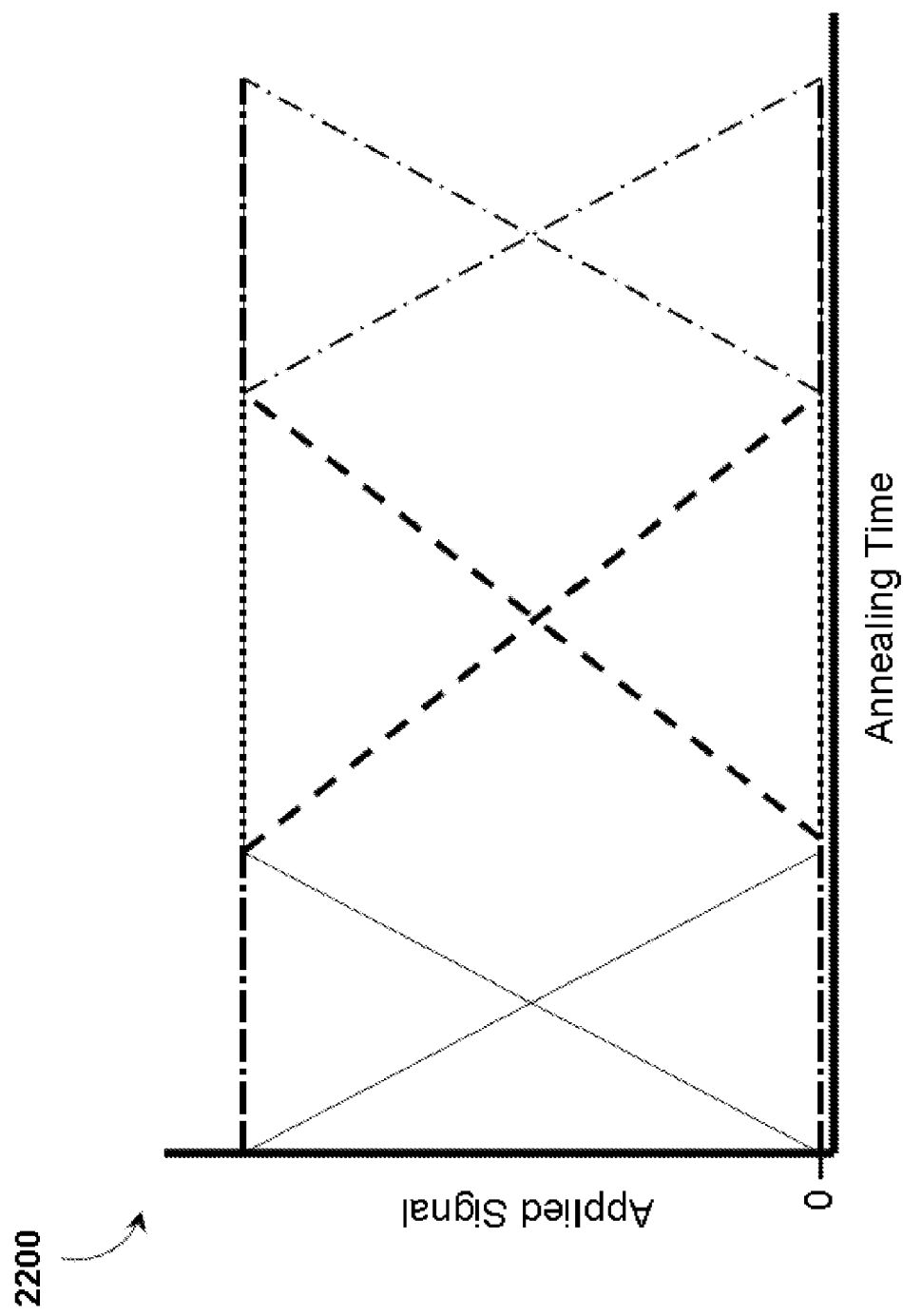
FIG. 22 is another approximate graph showing an exemplary annealing schedule for a system that implements multiple independently-controlled annealing signal lines in accordance with the present systems and methods.

Conversely, FIG. 21 is an approximate graph showing an exemplary annealing schedule 2100 for a system that implements multiple (e.g., three) independently-controlled annealing signal lines in accordance with the present systems and methods. The three independently-controlled annealing signal lines are represented by lines 2101, 2111 and 2121 and may each be used to anneal a respective one of three sets of qubits in a quantum processor. Unlike annealing schedule 2000 from FIG. 20, the applied annealing signals 2101, 2111, 2121 in schedule 2100 each evolve differently over the course of the schedule. This means that over the course of annealing schedule 2100 the three sets of qubits are each evolved in a different way. For example, qubits that are annealed by signal 2101 evolve steadily from a maximum annealing signal to a minimum annealing signal (e.g., zero) over the course of schedule 2100. However, qubits that are annealed by signal 2111 are initially exposed to stronger annealing signals for a longer period of time as signal 2111 does not begin to ramp down until long after signal 2101. Furthermore, qubits that are annealed by signal 2121 do not evolve at all because signal 2121 remains at zero throughout the duration of schedule 2100. Qubits that are annealed by signal 2121 represent "clamped" variables and may, in accordance with methods 1500*b* and 1700, correspond to at least one output of a logic circuit representation.

The additional signals in schedule 2100 (specifically, signals 2102, 2112, and 2122) represent control signals that are respectively applied to the three sets of qubits to contribute at least some of the terms of the problem Hamiltonian. Similar to annealing schedule 2000 from FIG. 20, in annealing schedule 2100 each control signal 2102, 2112, 2122 mirrors a respective annealing signal 2101, 2111, 2121. That is, signals 2101 and 2102 respectively provide annealing and control signals to a first set of qubits; signals 2111 and 2112 respectively provide annealing and control signals to a second set of qubits; and signals 2121 and 2122 respectively provide annealing and control signals to a third set of qubits. At the end of the schedule, all control signals are applied at maximum value. Because the states of the qubits that are controlled by signal 2122 are clamped in this example, signal 2122 is applied at maximum value throughout the duration of schedule 2100.

Annealing schedule 2100 is illustrated herein as an example only, while the present systems and methods provide the versatility to enable many variations of annealing schedules. For example, in some embodiments an annealing signal may evolve in a non-linear manner, at a faster or slower rate than illustrated, and may even oscillate if appropriate. Furthermore, in some embodiments an annealing signal may not be mirrored by a corresponding control signal, or a control signal that mirrors an annealing signal may evolve in a way that does not coincide with the evolution of the corresponding annealing signal. In some embodiments, some annealing signals may complete their evolution before and/or after other annealing signals.

For illustrative purposes, FIG. 22 provides an approximate graph showing an exemplary annealing schedule 2200 for a system that implements multiple independently-controlled annealing signal lines in accordance with the present systems and methods. In schedule 2200, each respective annealing signal line is paired with a respective control signal line, and the two lines that make up each respective pair are illustrated using a distinguishable line-style. Annealing schedule 2200 provides an example of a schedule in which multiple sets of qubits are effectively annealed in series, while the states of the qubits in one set remain clamped.

As illustrated in FIGS. 21 and 22, clamping the state of a qubit may be achieved by applying a static control signal to the qubit and no annealing signal. However, in practice a qubit that is coupled to other qubits in a quantum processor may be influenced by signals from those other qubits. For example, if a first qubit is coupled to a second qubit and an evolving annealing signal is applied to the second qubit then the first qubit may still effectively "see" a portion of that evolving annealing signal through the second qubit and be affected by it. In some embodiments, in order to achieve the desired clamping effect of applying a static control signal to a particular qubit as illustrated by line 2122 in FIG. 21, it may be necessary to actually evolve (e.g., vary in magnitude over time) the applied control signal in order to compensate for fluctuations induced by the evolving annealing signal that is applied to another qubit to which the particular qubit is coupled. Thus, "clamping" an output may be achieved by programming a corresponding qubit in a substantially fixed state, but this may necessitate the application of a dynamic clamping signal if the state of the clamped qubit is undesirably evolved by a coupling to an unclamped qubit.

In accordance with some embodiments of the present systems, methods and apparatus, solving a discrete optimization problem (such as a QUBO problem) and/or a constraint satisfaction problem includes an implementation of quantum annealing or adiabatic quantum computation. As previously discussed, a typical adiabatic evolution may be represented by equation 1:

$$H_e = (1-s)H_{In} + sH_f \quad (1)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to AQC, described, for example, in Amin, M.H.S., "Effect of local minima on quantum adiabatic optimization", PRL 100, 130503 (2008), is to start with an initial Hamiltonian of the form shown in equation 2:

$$H_{In} = -\frac{1}{2}\sum_{i=1}^{n} \Delta_i \sigma_i^x \quad (2)$$

where n represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{n} h_i \sigma_i^z + \sum_{i,j=1}^{n} J_{ij} \sigma_i^z \sigma_j^z\right] \quad (3)$$

where n represents the number of qubits, $\sigma_i^z$ is the Pauli z-matrix for the $i^{th}$ qubit, $h_i$ and $J_{ij}$ are dimensionless local fields coupled into each qubit, and $\varepsilon$ is some characteristic energy scale for $H_f$. Here, the $\sigma_i^z$ and $\sigma_i^z \sigma_j^z$ terms are examples of "diagonal" terms. Throughout this specification and the appended claims, the terms "final Hamiltonian" and "problem Hamiltonian" are used interchangeably. In various embodiments of the present systems and methods, a logic circuit representation is converted to a discrete optimization problem such as a QUBO, and the QUBO is mapped directly to the problem Hamiltonian in the processor hardware. Hamiltonians such as $H_{In}$ and $H_f$ in equations 2 and 3, respectively, may be physically realized in a variety of different ways. A particular example is realized by an implementation of superconducting qubits.

Figure 23:
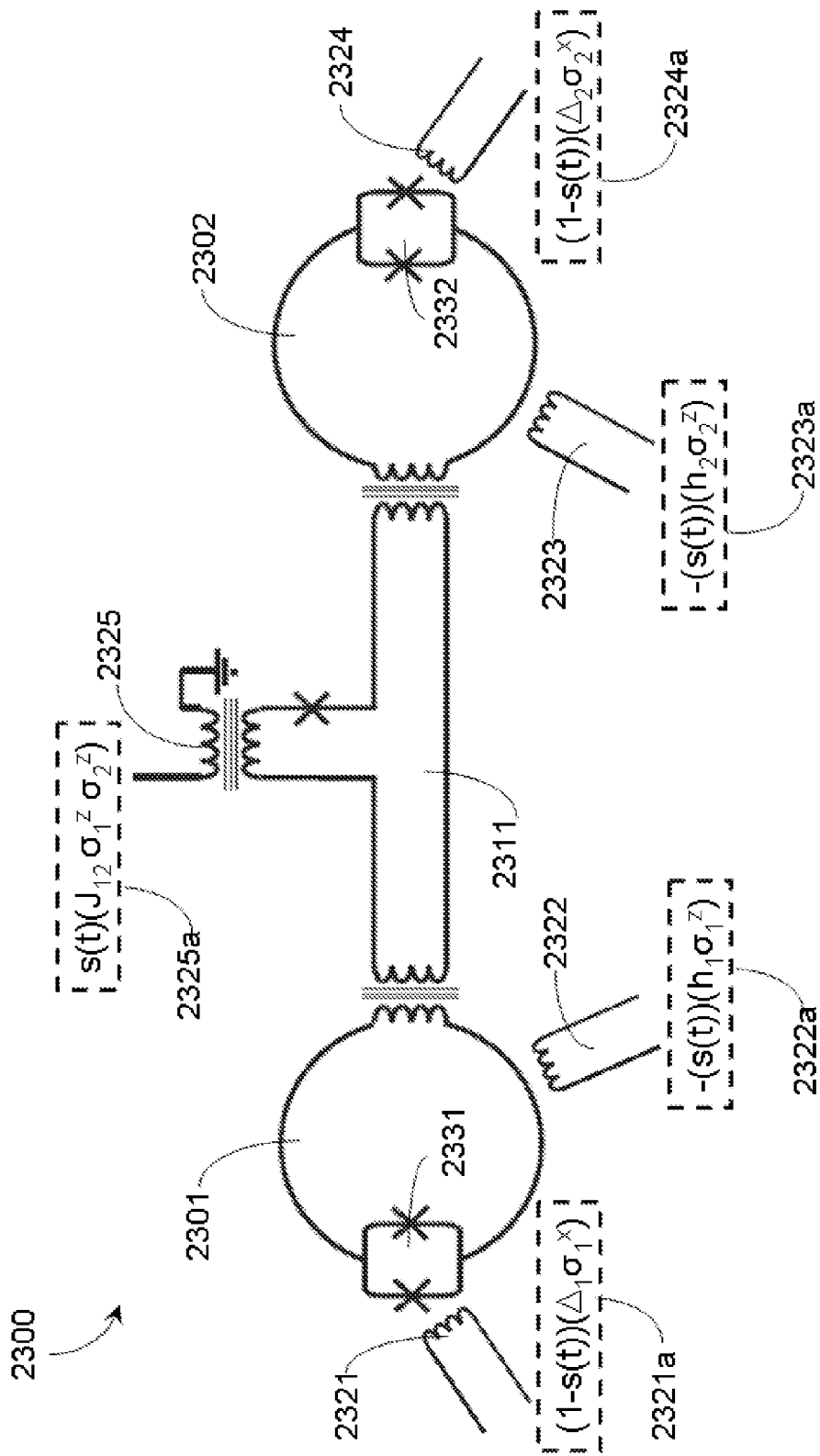
FIG. 23 is a schematic diagram of a portion of a superconducting quantum processor designed for adiabatic quantum computation (and/or quantum annealing).

FIG. 23 is a schematic diagram of a portion of a superconducting quantum processor 2300 designed for AQC (and/or quantum annealing). The portion of superconducting quantum processor 2300 shown in FIG. 23 includes two superconducting qubits 2301, 2302 and a tunable ZZ-coupler 2311 coupling information therebetween. While the portion of quantum processor 2300 shown in FIG. 23 includes only two qubits 2301, 2302 and one coupler 2311, those of skill in the art will appreciate that quantum processor 2300 may include any number of qubits and any number of coupling devices coupling information therebetween.

The portion of quantum processor 2300 shown in FIG. 23 may be implemented to physically realize AQC by initializing the system with the Hamiltonian described by equation 2 and evolving the system to the Hamiltonian described by equation 3 in accordance with the evolution described by equation 1. In various embodiments of the present systems and methods, determining a low energy state, such as the ground state, of the Hamiltonian described by equation 3 may map directly to a QUBO problem, where the QUBO problem encodes a logic circuit representation of a computational problem. This mapping between the QUBO and the problem Hamiltonian is achieved, at least in part, by the programmable assignments to the parameters in the Hamiltonian described by equation 3. Evolving the quantum processor 2300 to determine the ground state of the Hamiltonian described by equation 3 therefore solves the QUBO problem, which effectively executes the logic circuit representation of the computational problem. Quantum processor 2300 includes a plurality of programming interfaces 2321-2325 that are used to configure and control the state of quantum processor 2300. Each of programming interfaces 2321-2325 may be realized by a respective inductive coupling structure, as illustrated, that communicates with a programming system (not shown). Such a programming system may be separate from quantum processor 2300, or it may be included locally (i.e., on-chip with quantum processor 2300) as described in US Patent Publication 2008-0215850.

In the operation of quantum processor 2300, programming interfaces 2321 and 2324 may each be used to couple a flux signal into a respective compound Josephson junction 2331, 2332 of qubits 2301 and 2302, thereby realizing the $\Delta_i$ terms in the system Hamiltonian. This coupling provides the off-diagonal $\sigma^x$ terms of the Hamiltonian described by equation 2 and these flux signals are examples of "disordering signals." Similarly, programming interfaces 2322 and 2323 may each be used to couple a flux signal into a respective qubit loop of qubits 2301 and 2302, thereby realizing the $h_i$ terms in the system Hamiltonian. This coupling provides the diagonal $\sigma^z$ terms of equation 3. Furthermore, programming interface 2325 may be used to couple a flux signal into coupler 2311, thereby realizing the $J_{ij}$ terms in the system Hamiltonian. This coupling provides the diagonal $\sigma_i^z \sigma_j^z$ terms of equation 3. In FIG. 23, the contribution of each of programming interfaces 2321-2325 to the system Hamiltonian is indicated in boxes 2321a-2325a, respectively.

Throughout this specification and the appended claims, the term "quantum processor" is used to generally describe the collection of qubits (e.g., qubits 2301 and 2302) and couplers (e.g., coupler 2311). The qubits 2301 and 2302 and the couplers 2311 are referred to as the "computational elements" of the quantum processor 2300. In the context of a quantum processor, the term "programming subsystem" is used to generally describe the programming elements (e.g., programming interfaces 2322, 2323, and 2325) included in a quantum processor (e.g., processor 2300) and other associated control circuitry or instructions. As previously described, the programming elements of the operational subsystem may communicate with a programming system which may be separate from the quantum processor or included locally on the processor. Similarly, in the context of a quantum processor, the term "evolution subsystem" is used to generally describe the evolution elements 2321, 2324 used to evolve the computational elements of the quantum processor 2300. For example, the evolution subsystem may include annealing signal lines (1830, 1931-1934) and their corresponding interfaces (2321, 2324) to the qubits (2301, 2302).

As previously described, in some embodiments of the present systems and methods, a logic circuit representation of a computational problem may be encoded as a QUBO problem, where the QUBO problem may comprise a plurality of miniature optimization problems. In such embodiments, each miniature optimization problem may encode a particular logic gate in the logic circuit. Each gate in the logic circuit may be characterized by a respective objective function that is mapped to a respective subset of qubits (and associated coupling devices) in a quantum processor, where the objective function is minimized when the truth table of the gate is obeyed. The objective function representing a particular logic gate may be mapped to a subset of qubits and associated coupling devices by accordingly programming the values of the $h_i$ and $J_{ij}$ terms for those qubits and coupling devices. This particular approach to solving computational problems is summarized in method 2400.

Figure 24:
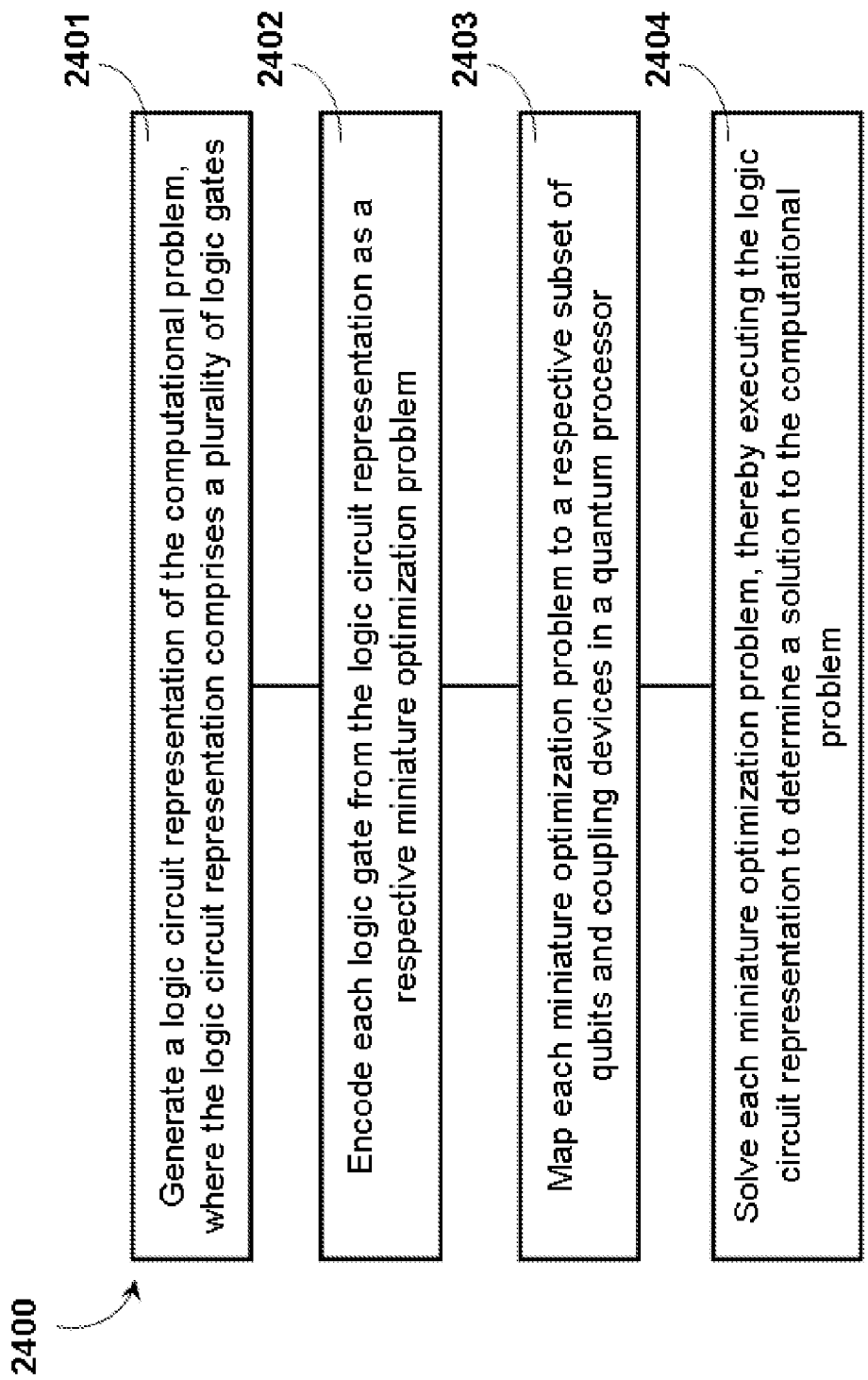
FIG. 24 is a flow-diagram of an embodiment of a method for solving a computational problem in accordance with the present systems and methods.

FIG. 24 shows a flow-diagram of an embodiment of a method 2400 for solving a computational problem in accordance with the present systems and methods. Method 2400 includes four acts 2401-2404, though those of skill in the art will appreciate that alternative embodiments may omit certain acts and/or include additional acts. At 2401, a logic circuit representation of the computational problem is generated, where the logic circuit representation comprises a plurality of logic gates. Exemplary logic circuit representations include those illustrated in FIGS. 14A, 14B, 16A, and 16B. The logic circuit representation of the computational problem may be generated by known techniques using, for example, a classical digital computer processor. At 2402, each logic gate from the logic circuit representation is encoded as a respective miniature optimization problem. In some embodiments, each logic gate may be encoded as a miniature optimization problem using, for example, a classical digital computer processor. Each respective miniature optimization problem may be characterized by a respective objective function that is minimized when the truth table of the corresponding logic gate is obeyed. Exemplary objective functions for the AND, OR, and NOT gates have been described, and from these a person of ordinary skill in the art will appreciate how similar objective functions for other logic gates may be formed. Furthermore, a person of ordinary skill in the art will appreciate that the exemplary objective functions for the AND, OR, and NOT gates provided herein are used for illustrative purposes only and alternative objective functions may be crafted that similarly represent the AND, OR, and NOT gates.

At 2403, each miniature optimization problem is mapped to a respective subset of qubits and coupling devices in a quantum processor. This mapping may be achieved, for example, by programming the $h_i$ and $J_{ij}$ parameters of a subset of qubits and coupling devices to realize the objective function that corresponds to the particular logic gate being mapped. In such a mapping, at least one respective qubit may correspond to each intermediate logic input of the logic gate, at least one respective qubit may correspond to each intermediate logic output of the logic gate, and the coupling devices therebetween (as well as, in some embodiments, additional qubits) may be programmed to provide the appropriate relations between the intermediate logic input(s) and intermediate logic output(s) in order to realize the objective function corresponding to the logic gate. At 2404, each miniature optimization problem is solved, which effectively executes the logic circuit representation to determine a solution to the computational problem. Solving each miniature optimization problem may involve, for example, evolving the quantum processor from an initial state represented by the Hamiltonian described by equation 2 to a final state represented by the Hamiltonian described by equation 3. The $h_i$ and $J_{ij}$ parameters in the Hamiltonian described by equation 3 may be programmed such that respective subsets of qubits and coupling devices in the quantum processor each encode an objective function corresponding to a respective logic gate (i.e., the mapping act 2403). Evolving the quantum processor from an initial state to a final state may then involve minimizing each objective function to assign values to the intermediate logic input(s) and intermediate logic output(s) of each logic gate. In some embodiments, solving each miniature optimization problem may involve clamping at least one intermediate logic input and/or at least one intermediate logic output as described, for example, in act 1532 of method 1500b.

In many applications, the logic circuit representation of the computational problem includes many (e.g., 10s, 100s, 1000s, etc.) of logic gates, thus solving the computational problem by method 2400 may require solving a large number of inter-dependent miniature optimization problems, where each miniature optimization problem corresponds to a particular logic gate in the logic circuit representation. The miniature optimization problems are inter-dependent because the intermediate output(s) of a first logic gate may correspond to the intermediate input(s) of a second logic gate. The combination of all of the miniature optimization problems may be described as a single discrete optimization problem, such as a QUBO. Thus, method 2400 represents a specific implementation of methods 1500a, 1500b, and/or 1700 where the discrete optimization problem is a set of inter-dependent miniature optimization problems. In some embodiments, multiple logic gates may be combined into a single miniature optimization problem. For example, a miniature optimization problem may, in some embodiments, encode all or a portion of a complete logical operation that comprises multiple logic gates. Those of skill in the art will appreciate that the specific mapping between logic gates and miniature optimization problems is highly instance-dependent, where it may be advantageous for some applications to implement a respective miniature optimization problem corresponding to each individual logic gate, while it may be advantageous for other applications to implement miniature optimization problems that each encode multiple (i.e., two or more) logic gates. In applications where multiple logic gates are encoded as a single miniature optimization problem, the miniature optimization problem effectively encodes an "intermediate logic circuit" and the objective function of the miniature optimization problem may exhibit a minimum value when the truth table of the miniature logic circuit is obeyed.

Throughout this specification and the appended claims, the term "miniature optimization problem" (and variations thereof) is frequently used. Unless the specific context requires otherwise, the term "miniature" here is intended to denote an optimization problem that represents a portion or component of a larger problem and comprises fewer variables and/or parameters than the larger problem. For example, an optimization problem that encodes the operation of an individual gate is a "miniature" optimization problem when that gate is part of a logic circuit representation of a larger computational problem.

The methods described herein (e.g., methods 1500a, 1500b, 1700, and 2400) may be implemented using many different forms of processor systems. For example, many of the acts in each of methods 1500a, 1500b, 1700, and 2400 may, in some embodiments, be performed using the same computer processor, such as a classical digital computer processor. However, in some embodiments it may be advantageous to implement a processor system that includes at least two processing subsystems, each specialized to perform a particular subset of the acts in methods 1500a, 1500b, 1700, and 2400.

In some embodiments of the present systems and methods, a processor system may include a first processing subsystem operated to perform the generating of logic (e.g., Boolean) circuit representations (e.g., acts 1501, 1701, and 2401) and the encoding of these logic circuit representations as discrete optimization problems (e.g., acts 1502, 1702, and 2402). For example, the first processing subsystem may perform acts 1501 and 1502 of methods 1500a and 1500b and/or acts 1701 and 1702 of method 1700, and/or acts 2401 and 2402 of method 2400. The first processing subsystem may include a classical digital computer processor including a computer- or processor-readable storage medium, such as a non-transitory storage medium or memory (e.g., volatile or non-volatile).

In some embodiments of the present systems and methods, a processor system may include a second processing subsystem operated to perform the solving of discrete optimization problems (e.g., act 1503a of method 1500a; acts 1503b, 1531-1533 of method 1500b; acts 1703-1704 of method 1700; and/or acts 2403-2404 of method 2400). In various embodiments, the second processing subsystem may be the same physical system as the first processing subsystem, or it may include a second classical digital computer processor, or it may include a quantum processor such as a superconducting quantum processor. In any case, the second processing subsystem may include a plurality of computational elements (e.g., qubits and couplers in the case of a quantum processor). The second processing subsystem may also include a programming subsystem for mapping the discrete optimization problem (which, in some embodiments, may comprise a plurality of miniature optimization problems) to the plurality of computational elements by programming the computational elements. In some embodiments, programming the computational elements includes clamping at least one logical output of the logic circuit representation of the computational problem (or at least one intermediate logical output of a particular logic gate). The second processing subsystem may also include an evolution subsystem for evolving the computational elements of the second processing subsystem. In some embodiments, evolving the computational elements of the second processing subsystem includes determining at least one logical input that corresponds to the at least one clamped logical output.

Figure 25:
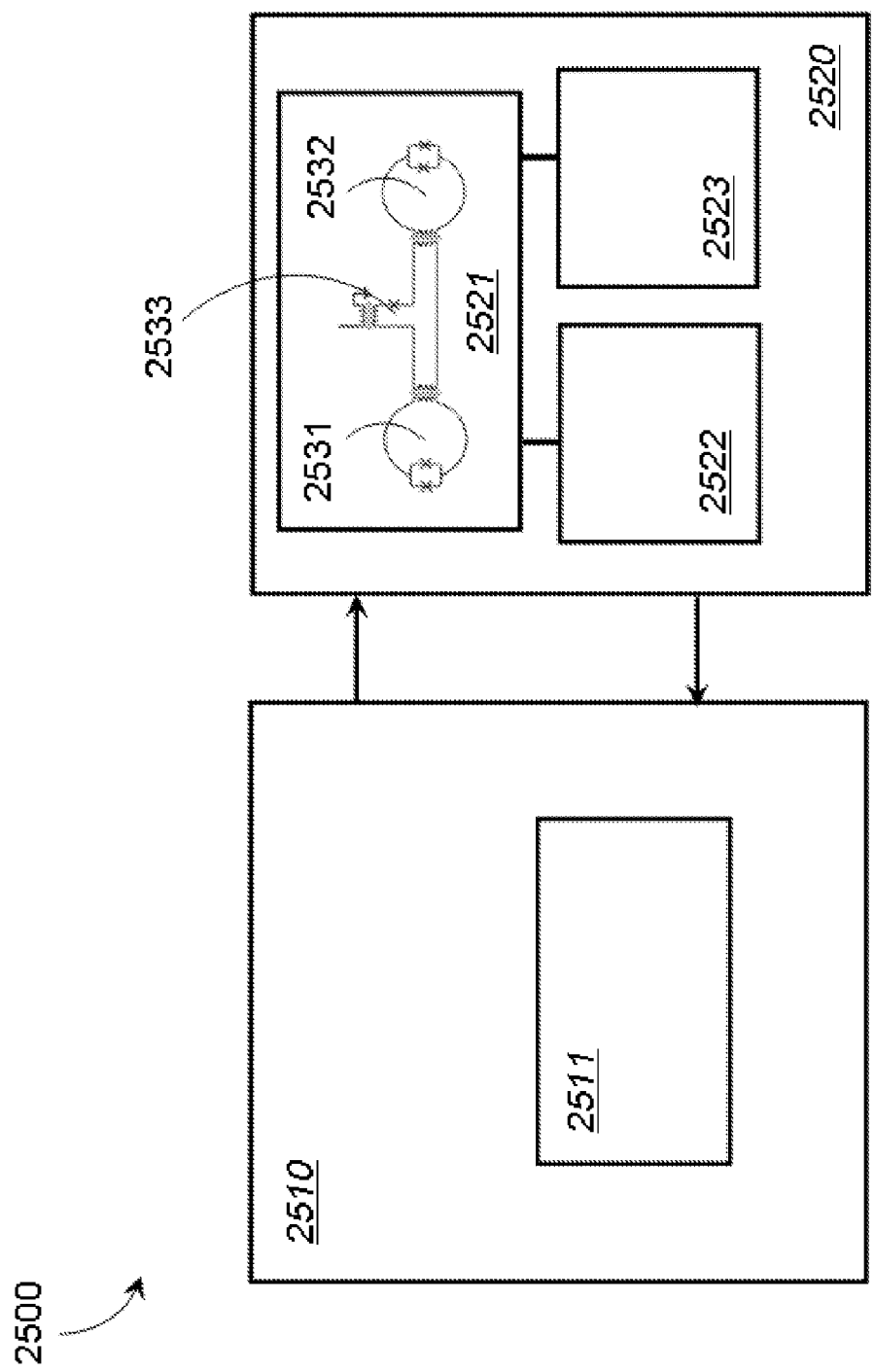
FIG. 25 is a schematic diagram of an embodiment of a processor system in accordance with the present systems and methods.

FIG. 25 is a schematic diagram of an embodiment of a processor system 2500 in accordance with the present systems and methods. Processor system 2500 includes a first processing subsystem 2510 in communication with a second processing subsystem 2520. First processing subsystem 2510 includes a computer-readable storage medium 2511 for storing and operating on at least one of a computational problem, a logic circuit representation of the computational problem, a discrete optimization problem encoding the logic circuit representation of the computational problem, and a set of miniature optimization problems each encoding a respective logic gate in the logic circuit representation of the computational problem. Second processing subsystem 2520 includes a plurality of computational elements 2521, a programming subsystem 2522, and an evolution subsystem 2523. In the illustrated embodiment, second processing subsystem 2520 includes a quantum processor; therefore, computational elements 2521 include at least two qubits 2531, 2532 and at least one coupler 2533. To reduce clutter, the interactions between computational elements 2521 and programming subsystem 2522, as well as the interactions between computational elements 2521 and evolution subsystem 2523, are not shown in FIG. 25, though those of skill in the art will appreciate that these interactions may be similar to those described in FIG. 23.

In some embodiments, the present systems and methods may be applied to solve a factoring problem, such as the problem of factoring an N-bit integer p as a product of a pair of integers a and b. Using the systems and methods described herein, this problem may be solved by representing a, b, and p in binary, constructing the logic circuit which performs the multiplication of a and b, and requiring that the circuit output give the binary representation of p. In some embodiments, the circuit can be run in "reverse" (inferring unknown inputs from known outputs) by encoding the circuit as an optimization problem and clamping the output p. By construction, input/output bit strings which satisfy the circuit may have known energy, and all other bit strings may produce an energy that is greater than the known energy. By fixing the output(s) and minimizing the resultant optimization problem, the inputs giving the desired output(s) can be obtained. The optimization problem may be crafted to be realizable using a quantum processor designed to implement adiabatic quantum computation and/or quantum annealing. In some embodiments, the optimization problem may comprise a set of inter-dependent miniature optimization problems, where each miniature optimization problem corresponds to a respective logic gate in the logic circuit representation of the factoring problem.

The product of two 4-bit integers may be, schematically, formed from the multiplication table 2600 given in FIG. 26. Any output bit $p_i$ may be formed as the sum of appropriate products of the bits of a and b. For example, the first output bit may be given by:

$$p_0 = a_0 b_0$$

This imposes a constraint between inputs $a_0$, $b_0$ and the output $p_0$. Extensionally, this constraint may be given by the table 2700a in FIG. 27, which lists the allowed combinations of inputs and outputs. This constraint is indicated as $C_\wedge(a_0, b_0, p_0)$ so that $C_\wedge(a, b, p)$ is true for a, b, p satisfying the constraint and false otherwise. The next bit in FIG. 26 is given by:

$$p_1 = (a_1 b_0 + a_0 b_1) \bmod 2 \equiv (t + t') \bmod 2,$$

where $C_\wedge(a_1; b_0; t)$ and $C_\wedge(a_0; b_1; t')$. However, because $t+t'$ can be as large as 2, the carry bit that may be passed on to the next larger bit (in this case $p_2$) should be considered. Indicating the carry bit by c, the allowed inputs t, t' and outputs p, c may be defined extensionally through the table 2700b in FIG. 27. This constraint, denoted $C_{2A}(t; t'; p; c)$, enforces $t+t'=p+2c$. $C_{2A}(t; t'; p; c)$ is the half-adder of classical digital logic. The bit $p_1$ may then be defined by:

$$C_{2A}(t,t',p_1,c) \wedge C_\wedge(a_1,b_0,t) \wedge C_\wedge(a_0,b_1,t').$$

Figure 27:
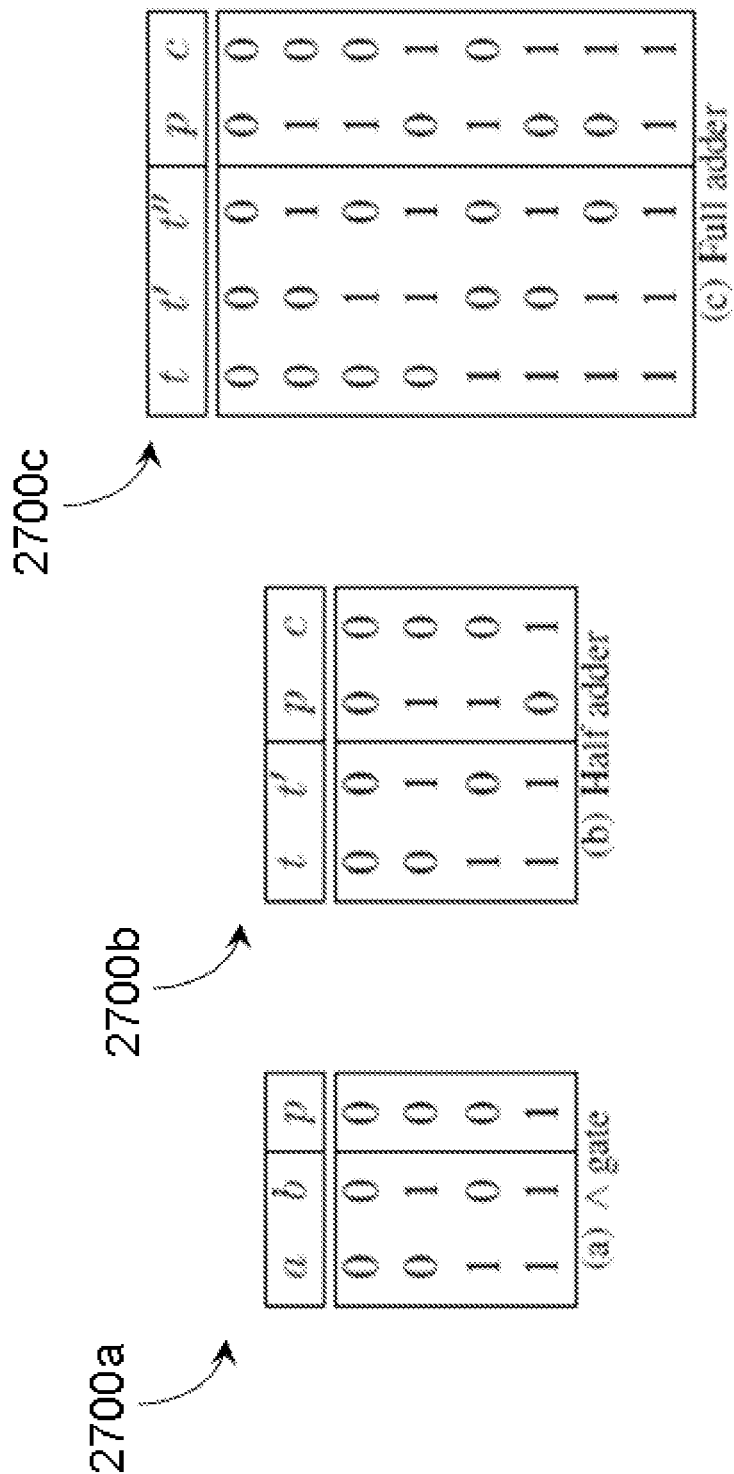
FIG. 27 shows respective truth tables for the and gate, half adder, and full adder.

To proceed to higher order bits, in some embodiments it may be convenient to define the full adder constraint $C_{3A}(t; t'; t''; p; c)$ which realizes the constraint of table 2700c in FIG. 27. This constraint is true if $t+t'+t''=p+2c$. If c is the carry from $p_1$, then $p_2$ and its associated carries may be determined by adding the contributions:

$$t+t'+t''+c$$

where $C_\wedge(a_2,b_0,t) \wedge C_\wedge(a_1,b_1,t') \wedge C_\wedge(a_0,b_2,t'')$. This sum can be evaluated using full- and half-adders by introducing an intermediate result r:

$$C_{3A}(t,t',t'',r,c') \wedge C_{2A}(r,c,p_2,c'')$$

where $r=t+t'+t''$ mod 2. This conjunction of constraints enforces $t+t'+t''+c=p_2+2(c'+c'')$. The carries $c'$ and $c''$ may then be passed to the summation determining $p_3$. Continuing in this manner for all other bits, a conjunction of constraints relating all input bits a and b to all output bits p, and to all necessary intermediate bits (such as r, $c'$, and $c''$ above), can be derived.

In some embodiments, a further simplification may be made which allows elimination of most $C^\wedge$ constraints. As shorthand the following constraints may be defined:

$$\overline{C}_{2A}(a,b,t,p,c) = \exists r\ C_\wedge(a,b,r) \wedge C_{2A}(r,t,p,c)\ (ab+t=p+2c)$$

$$\overline{C}_{3A}(a,b,t,t',p,c) = \exists r\ C_\wedge(a,b,r) \wedge C_{3A}(r,t,t',p,c)\ (ab+t+t'=p+2c)$$

These constraints build the necessary $^\wedge$ constraints into the adders with r representing $a^\wedge b$. An advantage of representing multiplication as constraint satisfaction is that it allows variables to be bound to particular values, and the values (if any) of the remaining variables which satisfy the constraints may be determined. In this way, multiplication can be run in "reverse" to infer inputs from outputs.

Having reduced factoring to constraint satisfaction, constraint satisfaction may be reduced to optimization which may then be minimized using quantum annealing and/or adiabatic quantum computation.

Consider a constraint $C(x)$ defined over a set of Boolean variables x. $C(x)$ may be represented by a penalty function $P(x)$, mapping bitstrings to the reals, defined so that:

$$P(x) = \begin{cases} o & \text{if } C(x) \\ \geq o+1 & \text{if } \neg C(x). \end{cases}$$

The objective P encodes the feasible x as global minima having energy o, and all other infeasible x as having an energy at least $o+1$. In embodiments where the quantum processor can only realize up-to-quadratic functions of Boolean variables, $P(x)$ may be implemented as an up-to-quadratic function of x. In some embodiments, all the constraints $C_\wedge$, $C_{2A}$, $\overline{C}_{2A}$, $C_{3A}$, and $\overline{C}_{3A}$ may be realized as quadratic penalties $P_\wedge$, $P_{2A}$, $\overline{P}_{2A}$, $P_{3A}$, and $\overline{P}_{3A}$ as follow:

$$\overline{P}_{2A}(a,b,t,p,c) = [a\ b\ t\ p\ c] \begin{bmatrix} 0 & 1 & 2 & -2 & -4 \\ 0 & 0 & 2 & -2 & -4 \\ 0 & 0 & 1 & -4 & -6 \\ 0 & 0 & 0 & 3 & 6 \\ 0 & 0 & 0 & 0 & 8 \end{bmatrix} \begin{bmatrix} a \\ b \\ t \\ p \\ c \end{bmatrix}$$

$$P_{3A}(t,t',t'',p,c) = [t\ t'\ t''\ p\ c] \begin{bmatrix} 1 & 2 & 2 & -2 & -4 \\ 0 & 1 & 2 & -2 & -4 \\ 0 & 0 & 1 & -2 & -4 \\ 0 & 0 & 0 & 1 & 4 \\ 0 & 0 & 0 & 0 & 4 \end{bmatrix} \begin{bmatrix} t \\ t' \\ t'' \\ p \\ c \end{bmatrix}$$

$$\overline{P}_{3A}(a,b,t,t',p,c) = [a\ b\ t\ t'\ p\ c] \begin{bmatrix} 0 & 1 & 2 & 2 & -2 & -4 \\ 0 & 0 & 2 & 2 & -2 & -4 \\ 0 & 0 & 1 & 4 & -4 & -8 \\ 0 & 0 & 0 & 1 & -4 & -8 \\ 0 & 0 & 0 & 0 & 3 & 8 \\ 0 & 0 & 0 & 0 & 0 & 10 \end{bmatrix} \begin{bmatrix} a \\ b \\ t \\ t' \\ p \\ c \end{bmatrix}$$

$$P_\wedge(a,b,p) = [a\ b\ p] \begin{bmatrix} 0 & 1 & -2 \\ 0 & 0 & -2 \\ 0 & 0 & 3 \end{bmatrix} \begin{bmatrix} a \\ b \\ p \end{bmatrix}$$

$$P_{2A}(t,t',p,c) = [t\ t'\ p\ c] \begin{bmatrix} 1 & 2 & -2 & -4 \\ 0 & 1 & -2 & -4 \\ 0 & 0 & 1 & 4 \\ 0 & 0 & 0 & 4 \end{bmatrix} \begin{bmatrix} t \\ t' \\ p \\ c \end{bmatrix}.$$

All penalties may have minimum value $o=0$. The conjunction of constraints $C(x) \wedge C'(x)$ may be realized by the addition of penalty functions, i.e., $P_{C \wedge C'}(x) = P_C(x) + P_{C'}(x)$. Thus, the associated penalties may be added to represent the constraint network representing a multiplication circuit.

Figure 28:
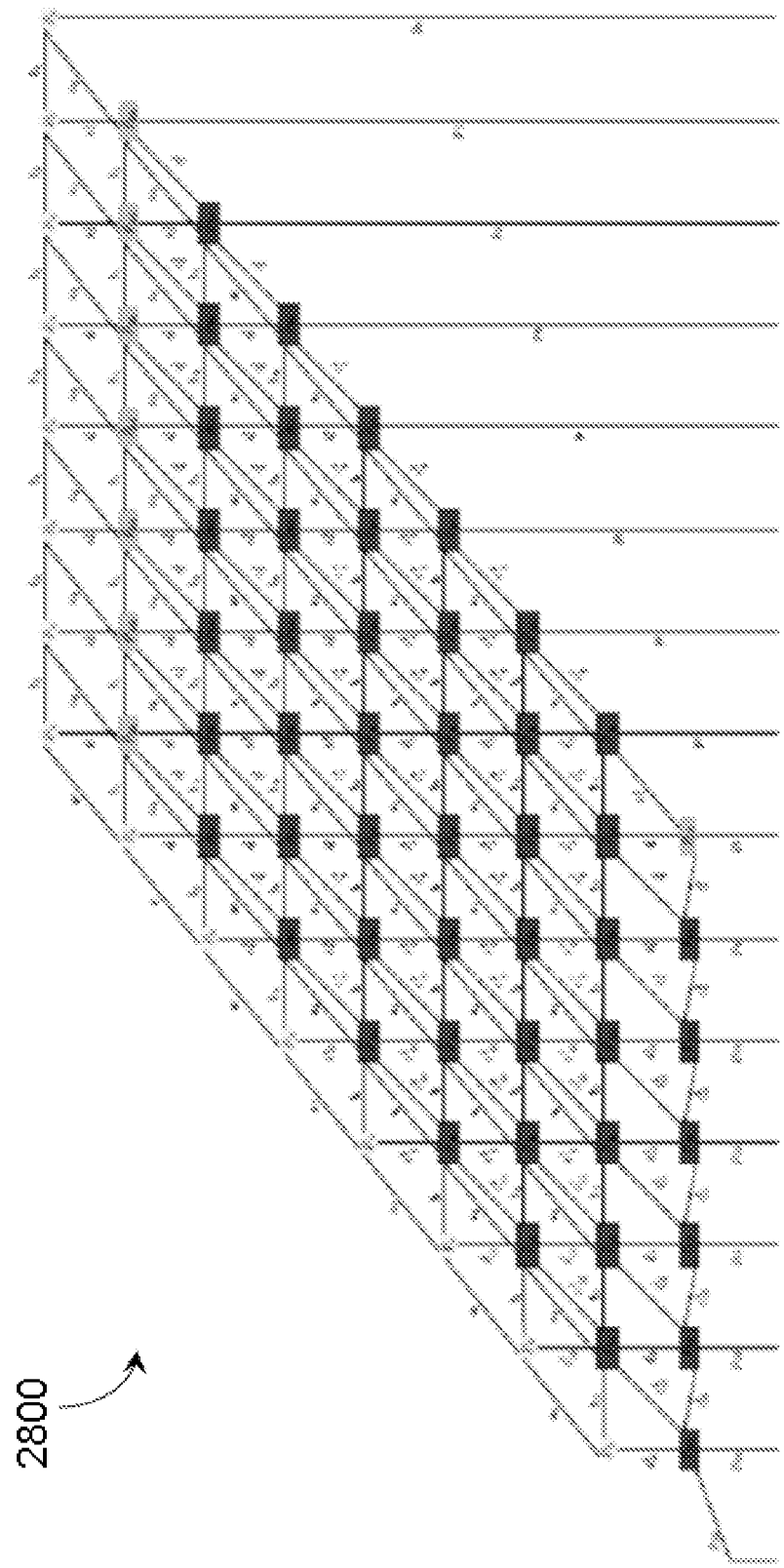
FIG. 28 is a schematic diagram showing a constraint network representing the multiplication of two 8-bit numbers.

A constraint/optimization network 2800 representing the multiplication of two 8-bit numbers is shown in FIG. 28. Optimization variables are represented as edges in the Figure. In addition to the $2N=16$ variables representing a and b there are a number of intermediate variables. The $s^i_j$ variables represent the partial sums needed to evaluate the output $p_j$. There are $N(N-1)$ partial sum variables. The $c^i_j$ variables represent the carries from the output $p_j$. There are $N-2+(N-1)^2$ carry variables. Lastly, there are the 2N variables representing the product p. The total variable count is therefore $(2N+4)(N-1)+3$.

The boxes of network 2800 in FIG. 28 represent the quadratic contributions. In some embodiments, complete connectivity is advantageous locally for the variables (edges) entering the box. $P_\wedge$ requires $K_3$, $P_{2A}$ requires $K_4$, $\overline{P}_{2A}$ requires $K_5$, $P_{3A}$ requires $K_5$, and $\overline{P}_{3A}$ requires $K_6$. $K_n$ is the fully connected graph on n vertices.

The objective function encoding the multiplication of two N-bit numbers can be used to factor the 2N-bit number represented by $(p_{2N-1}; p_{2N-2}; \ldots; p_0)$. Factoring odd integers is the focus, because if p is not odd then it can be repeatedly divide by 2 until it is odd. If p is odd then the multiplicands are odd so that $a_0 = b_0 = 1$. These variables are thus eliminated from consideration. Since the p values are known they may be eliminated as well. The p variables are eliminated by specializing the constraints in which they appear. Consequently, the specialized constraints (which are still quadratic) may be defined as:

$$P_{2A}^0(t,t',c) = P_{2A}(t,t',t''\!,p\!=\!0,c)\ P_{2A}^1(t,t',c) = P_{2A}(t,t',p\!=\!1,c)$$

$$P_{3A}^0(t,t',c) = P_{3A}(t,t',t''\!,p\!=\!0,c)\ P_{3A}^1(t,t',t''\!,c) = P_{3A}(t,t',t''\!,p\!=\!1,c)$$

This reduces the total variable count to $(2N+1)(N-1)-1$. Eliminating these variables leaves the optimization network 2900 defined in FIG. 29. The $P_{3A}^{P14,P15}$ constraint in the lower left corner corresponds to the constraint $P_{3A}(a,b,t,t', p=p_{14},c=p_{15})$.

Figure 29:
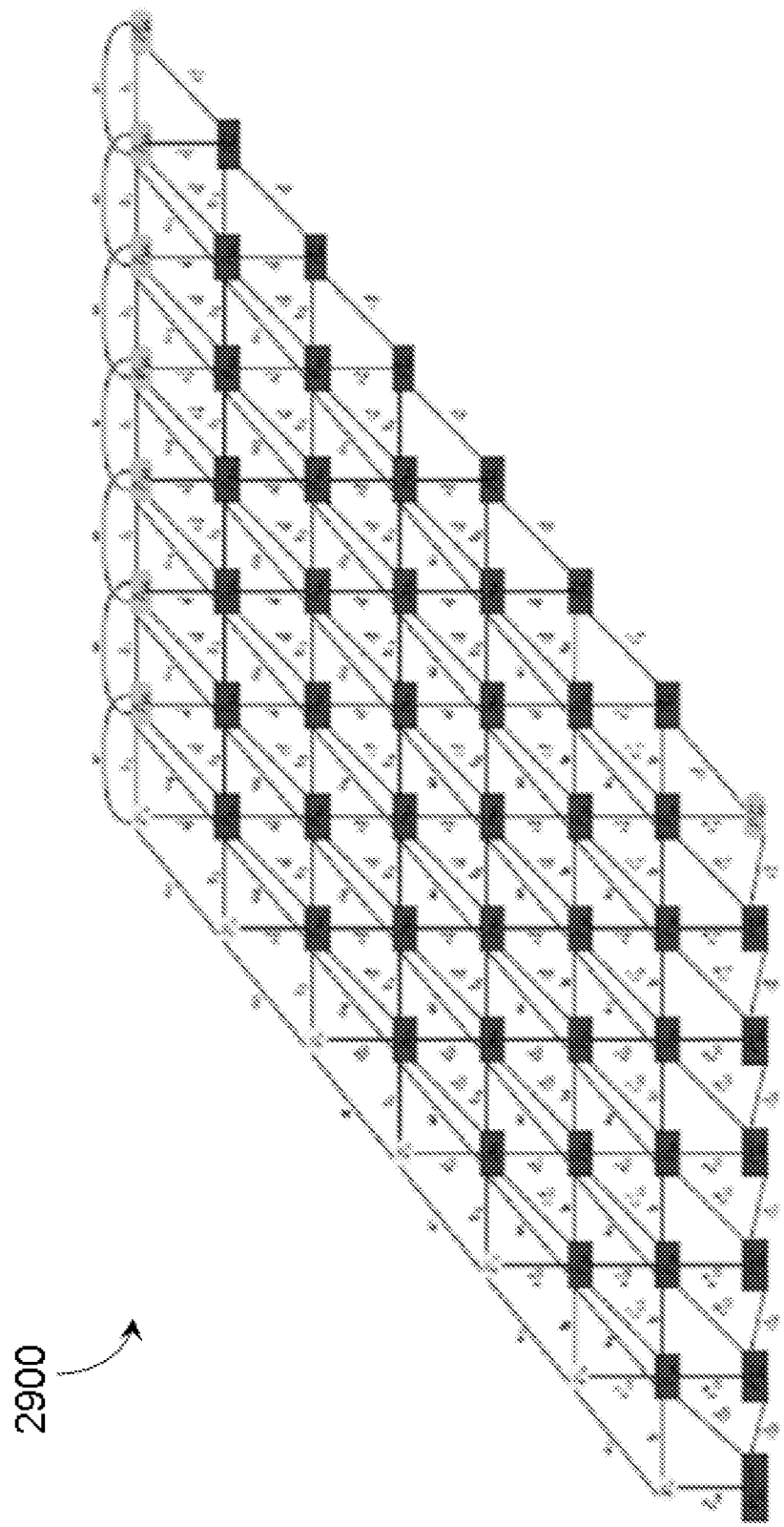
FIG. 29 is a schematic diagram showing an optimization network representing the multiplication of two odd 8-bit numbers.

In accordance with the present systems and methods, two technical considerations may require a refinement of network 2900 from FIG. 29 for hardware implementation. Firstly, any individual input bit (either $a_i$ or $b_j$) appears in many constraints and interacts with O(N) other bits. Physically, this variable may be represented in hardware as an extended element (much as it appears in FIG. 29 as the extended dark line). However, there is typically a maximum length to the extended element, and a maximum number of connections the element may support. Secondly, the precision to which distinct values in the penalty functions may be specified is typically limited, and it may be necessary to have fewer distinct weights appearing in the quadratic penalty functions.

Figure 31:
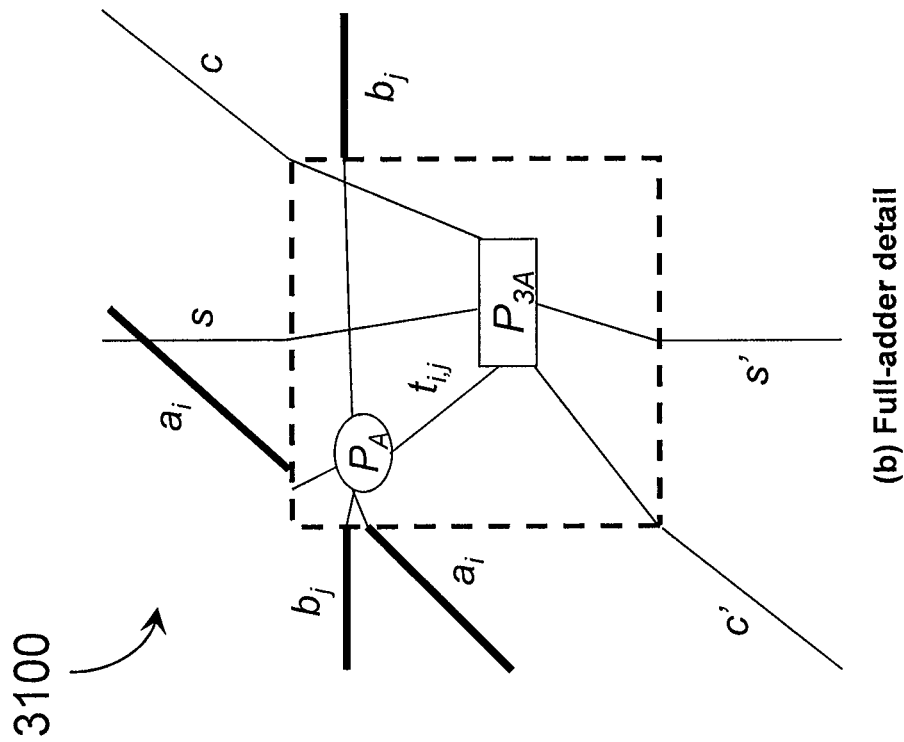
FIG. 31 is a schematic diagram showing detail of a disaggregated full adder located at the intersection of two variables.
Figure 30:
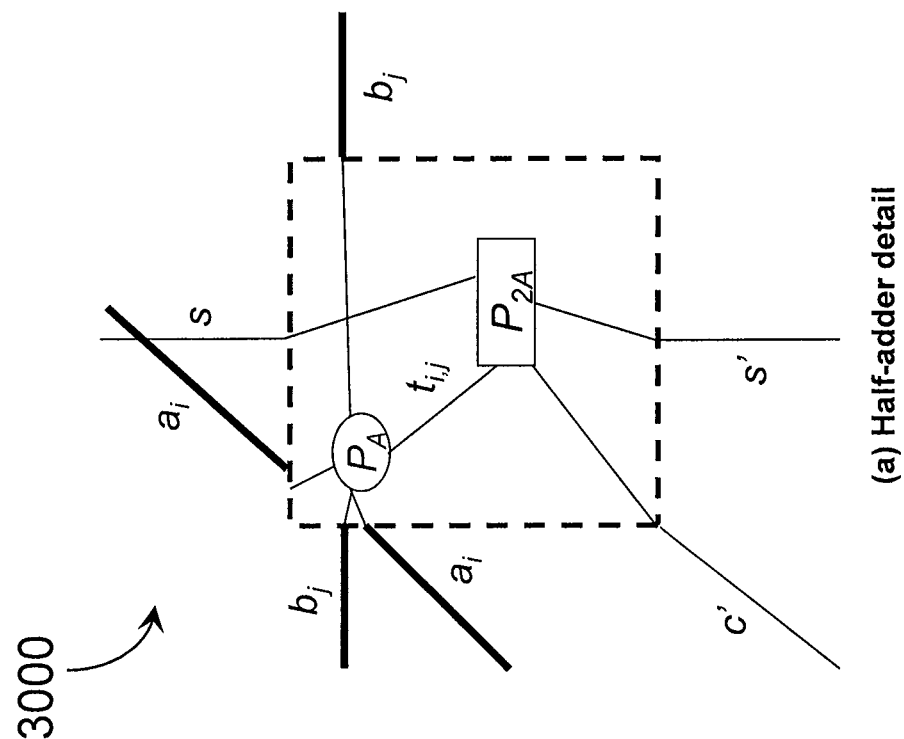
FIG. 30 is a schematic diagram showing detail of a disaggregated half adder located at the intersection of two variables.

Both these considerations can be addressed by, for example, disaggregating the $\overline{P}$ constraints, and breaking them into their constituent components $P_{2A}$ or $P_{3A}$ and $P_\wedge$. The optimization network in this case may be obtained from FIG. 29 by replacing each $\overline{P}_{2A}$ and $\overline{P}_{3A}$ element with element 3000 from FIG. 30 and element 3100 from FIG. 31, respectively. This requires the addition of $(N-2)(N-1)$ variables $t_{ij}$ representing the products $a_i b_j$ for $1 \leq i$; $j \leq N$. This brings the total variable count to $(3N+1)(N-1)-1$. Therefore, in some embodiments, to factor a 16-bit number may require N=8 and 174 variables. Without the $\overline{P}$ constraints the required values are $\{-4;-2; 0; 1; 2; 3; 4\}$.

Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other problem-solving systems devices, and methods, not necessarily the exemplary problem-solving systems devices, and methods generally described above.

For instance, the foregoing detailed description has set forth various embodiments of the systems, devices, and/or methods via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments.

All commonly assigned U.S. patents, U.S. patent application publications, U.S. patent applications, foreign patents, foreign patent applications and non-patent publications referred to in this specification including, but not limited to: US Patent Publication No. 2007-0080341; U.S. Provisional Patent Application No. 60/698,362, filed Jul. 11, 2005 and entitled "Factoring On An Optimization Type Quantum Computer;" PCT Patent Application Serial No. PCT/US2010/038867 filed Jun. 16, 2010; U.S. Provisional Patent Application Ser. No. 61/187,987, filed Jun. 17, 2009 and entitled "Systems and Methods for Solving Computational Problems;" U.S. Provisional Patent Application Ser. No. 61/238,043, filed Aug. 28, 2009 and entitled "Systems and Methods for Solving Factoring Problems;" U.S. Provisional Patent Application Ser. No. 61/330,789, filed May 3, 2010 and entitled "Systems and Methods for Solving Computational Problems;" U.S. Pat. No. 6,838,694; U.S. Pat. No. 7,335,909; U.S. Pat. No. 7,533,068, US Patent Publication 2008-0176750, US Patent Publication 2009-0121215, PCT Patent Publication 2009-120638; U.S. Pat. No. 7,135,701; US Patent Publication Nos. 2005-0256007 (now U.S. Pat. No. 7,418,283); US Patent Publication No. 2005-0250651, US Patent Publication 2005-0224784 (now U.S. Pat. No. 7,135,701); U.S. patent application Ser. No. 11/100,931; U.S. patent application Ser. No. 11/247,857 (now. U.S. Pat. No. 7,619,437); PCT Patent Publication 2009-143166; and US Patent Publication 2008-0215850 are incorporated herein by reference, in their entirety and for all purposes. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the invention to the specific embodiments disclosed in the specification and the claims, but should be construed to include all possible embodiments along with the full scope of equivalents to which such claims are entitled. Accordingly, the scope of the invention shall only be construed and defined by the scope of the appended claims.

We claim:

1. A method of solving a problem, the method comprising:
generating a logic circuit representation of the problem using a computer processor;
encoding the logic circuit representation as a discrete optimization problem using the computer processor; and
solving the discrete optimization problem using a quantum processor, wherein solving the discrete optimization problem using a quantum processor includes configuring the quantum processor to clamp at least one output of the logic circuit representation and operating the quantum processor to determine at least one input to the logic circuit representation that corresponds to the at least one clamped output.

2. The method of claim 1 wherein the computer processor includes a classical digital computer processor, generating a logic circuit representation includes generating a logic circuit representation using the classical digital computer processor, and encoding the logic circuit representation includes encoding the logic circuit representation using the classical digital computer processor.

3. The method of claim 1, further comprising:
mapping the discrete optimization problem from the computer processor to the quantum processor.

4. The method of claim 1 wherein solving the discrete optimization problem includes operating the quantum processor to perform at least one of an adiabatic quantum computation and an implementation of quantum annealing.

5. The method of claim 1 wherein generating a logic circuit representation includes generating a Boolean logic circuit representation using the computer processor.

6. The method of claim 1 wherein solving the discrete optimization problem includes solving a quadratic unconstrained binary optimization problem using the quantum processor.

7. The method of claim 1 wherein the problem is a factoring problem.

8. The method of claim 7 wherein the logic circuit representation of the factoring problem includes a constraint satisfaction problem.

9. A processor system for solving a computational problem, the processor system comprising:
a first processing subsystem that generates a logic circuit representation of the computational problem, wherein the logic circuit representation includes at least one logical input, at least one logical output, and at least one logical operation that includes at least one logic gate, and for encoding the logic circuit representation as a discrete optimization problem; and
a quantum processor that solves the discrete optimization problem, wherein solving the discrete optimization problem includes configuring the quantum processor to clamp at least one output of the logic circuit representation and operating the quantum processor to determine at least one input to the logic circuit representation that corresponds to the at least one clamped output, the quantum processor comprising:
a plurality of computational elements including at least two qubits and at least one coupler;
a programming subsystem that maps the discrete optimization problem to the plurality of computational elements by programming the computational elements of the quantum processor; and
an evolution subsystem that evolves the computational elements of the quantum processor.

10. The processor system of claim 9 wherein the first processing subsystem includes a classical digital computer processor and wherein at least one of the computational problem, the logic circuit representation of the computational problem, and the discrete optimization problem is stored in a computer-readable storage medium in the classical digital computer processor.

11. The processor system of claim 9 wherein the quantum processor includes a superconducting quantum processor, the at least two qubits include superconducting qubits, and the at least one coupler includes a superconducting coupler.

* * * * *